(12) United States Patent
Khojastepour et al.

(10) Patent No.: US 9,723,566 B2
(45) Date of Patent: Aug. 1, 2017

(54) INTERFERENCE CANCELLATION

(71) Applicant: NEC Laboratories America, Inc., Princeton, NJ (US)

(72) Inventors: Mohammad Khojastepour, Lawrenceville, NJ (US); Karthikeyan Sundaresan, Howell, NJ (US); Eugene Chai, Princeton, NJ (US); Sampath Rangarajan, Bridgewater, NJ (US)

(73) Assignee: NEC Corporation, Tokyo (JP)

( * ) Notice: Subject to any disclaimer, the term of this patent is extended or adjusted under 35 U.S.C. 154(b) by 230 days.

(21) Appl. No.: 14/818,427

(22) Filed: Aug. 5, 2015

(65) Prior Publication Data

US 2015/0381334 A1     Dec. 31, 2015

Related U.S. Application Data

(62) Division of application No. 14/560,723, filed on Dec. 4, 2014.

(Continued)

(51) Int. Cl.
    *H04W 52/14*     (2009.01)
    *H04B 7/0413*     (2017.01)
    (Continued)

(52) U.S. Cl.
    CPC .......... *H04W 52/14* (2013.01); *H04B 7/0413* (2013.01); *H04B 7/0421* (2013.01);
    (Continued)

(58) Field of Classification Search
    CPC ............... H04W 52/14; H04W 52/241; H04W 72/0406; H04W 72/082; H04L 5/0048;
    (Continued)

(56) References Cited

U.S. PATENT DOCUMENTS

2012/0077485 A1*   3/2012   Shin ...................... H04B 7/0617
                                                             455/422.1
2012/0281780 A1*   11/2012   Huang ................. H04B 7/0452
                                                             375/267

(Continued)

OTHER PUBLICATIONS

Kumar et al., "Bringing Cross-Layer MIMO to Today's Wireless LANs", SIGCoMM '13, Aug. 12-16, 2013, Hong Kong, China; ACM, 2013.*

(Continued)

*Primary Examiner* — Asad Nawaz
*Assistant Examiner* — Saad A Waqas
(74) *Attorney, Agent, or Firm* — Joseph Kolodka

(57) ABSTRACT

A method implemented in a wireless communications system including a first uplink (UL) client device, a second UL client device, a first downlink (DL) client device, and an access point (AP) is disclosed. The method comprises the following steps in this order: a) determining interference alignment (IA) solution between the first and second UL client devices and the first device; and b) determining, according to the IA solution, receive filter $U_O$ for the AP and precoder $V_O$ for the AP to improve a UL stream rate and a DL stream rate. Other methods, systems, and apparatuses also are disclosed.

15 Claims, 31 Drawing Sheets

Related U.S. Application Data

(60) Provisional application No. 61/949,613, filed on Mar. 7, 2014, provisional application No. 61/911,627, filed on Dec. 4, 2013.

(51) Int. Cl.

| | | |
|---|---|---|
| *H04B 7/0456* | (2017.01) | |
| *H04B 15/00* | (2006.01) | |
| *H04L 5/16* | (2006.01) | |
| *H04W 72/04* | (2009.01) | |
| *H04W 72/08* | (2009.01) | |
| *H04B 7/04* | (2017.01) | |
| *H04L 5/00* | (2006.01) | |
| *H04W 52/24* | (2009.01) | |
| *H04B 17/345* | (2015.01) | |
| *H04B 7/022* | (2017.01) | |
| *H04B 7/06* | (2006.01) | |

(52) U.S. Cl.
CPC .......... *H04B 7/0456* (2013.01); *H04B 15/00* (2013.01); *H04L 5/0048* (2013.01); *H04L 5/16* (2013.01); *H04W 72/0406* (2013.01); *H04W 72/082* (2013.01); *H04B 7/022* (2013.01); *H04B 7/0619* (2013.01); *H04B 17/345* (2015.01); *H04W 52/241* (2013.01)

(58) Field of Classification Search
CPC ......... H04L 5/16; H04B 7/022; H04B 7/0413; H04B 7/0421; H04B 7/0456; H04B 7/0619
See application file for complete search history.

(56) References Cited

U.S. PATENT DOCUMENTS

| | | | | |
|---|---|---|---|---|
| 2013/0114468 A1* | 5/2013 | Hui | ...................... | H01Q 3/2611 370/277 |
| 2013/0322301 A1* | 12/2013 | Ghauri | .................. | H04W 16/14 370/280 |
| 2014/0098900 A1* | 4/2014 | Bayesteh | ............. | H04B 7/0452 375/267 |
| 2014/0349581 A1* | 11/2014 | Oh | .................... | H04L 25/03343 455/63.1 |
| 2014/0376655 A1* | 12/2014 | Ruan | ........................ | H04L 1/06 375/267 |
| 2015/0071368 A1* | 3/2015 | Lau | ...................... | H04B 7/0417 375/267 |
| 2015/0139347 A1* | 5/2015 | Murch | ................. | H04B 7/0452 375/267 |
| 2015/0195047 A1* | 7/2015 | Bahl | ..................... | H04B 7/0452 375/267 |
| 2015/0215016 A1* | 7/2015 | Hunukumbure | ...... | H04L 5/0023 370/280 |
| 2015/0358057 A1* | 12/2015 | Lindqvist | .............. | H04B 7/024 370/329 |

OTHER PUBLICATIONS

Santamaria et al. "Maximum Sum-Rate Interference Alignment Algorithms for MIMO Channels", IEEE Globecom, pp. 1-6, Dec. 2010.*

E. Aryafar, A. Khojastepour, K. Sundaresan, S. Rangarajan, and M. Chiang. MIDU: Enabling mimo full-duplex. In Proceedings of ACM MobiCom, Sep. 2012.

O. E. Ayach, S. W. Peters, and R. W. Heath. The practical challenges of interference alignment. In IEEE Wireless Communications Magazine, Feb. 2013.

J. Bai and A. Sabharwal. Distributed full-duplex via wireless side channels: Bounds and protocols. Arxiv, abs/1212.5300, 2012.

D. Bharadia, E. McMilin, and S. Katti. Full-duplex radios. In Proceedings of ACM SIGCOMM, Aug. 2013.

G. Bresler, D. Cartwright, and D. Tse. Interference alignment for the mimo interference channel. arxiv, arXiv:1303.5678, 2013.

V. Cadambe and S. A. Jafar. Interference alignment and degrees of freedom of the k user interference channel. Transactions on Information Theory, 54(8):3425-3441, Aug. 2008.

J. Choi, M. Jain, K. Srinivasan, P. Levis, and S. Katti. Achieving single channel, full duplex wireless communication. In Proceedings of ACM MobiCom, Sep. 2010.

M. Duarte, C. Dick, and A. Sabharwal. Experiment-driven characterization of full-duplex wireless systems. IEEE Transactions on Wireless Communications, Sep. 2012.

M. Duarte and A. Sabharwal. Full-duplex wireless communications using off-the-shelf radios: Feasibility and first results. In Asilomar Conference on Signals, Systems and Computers, Nov. 2010.

E. Everett M. Duarte, C. Dick, and A. Sabharwal. Empowering full-duplex wireless communication by exploiting directional diversity. In Asilomar Conference on Signals, Systems, and Computers, Nov. 2011.

S. Gollakota, S. Perli, and D. Katabi. Interference alignment and cancellation. In Proceedings of ACM SIGCOMM, Barcelona, Spain, Aug. 2009.

M. Jain, T.M. Kim, D. Bharadia, S. Seth, K. Srinivasan, P. Levis, S. Katti, and P. Sinha. Practical, real-time, full duplex wireless. In Proceedings of ACM MobiCom, Sep. 2011.

S. W. Jeon and M. Gatspar. A survey on interference networks: Interference alignment and neutralization. Journal of Entropy, 14(10):1842-1863, 2012.

K. Lin, S. Gollakota, and D. Katabi. Random access heterogeneous mimo networks. In Proceedings of ACM SIGCOMM, Aug. 2011.

K. Miller, A. Sanne, K. Srinivasan, and S. Vishwanath. Enabling real-time interference alignment: Promises and challenges. In ACM MobiHoc, Jun. 2012.

B. Radunovic, D. Gunawardena, P. Key, A. Proutiere, N. Singh, V. Balan, and G. Dejean. Rethinking indoor wireless mesh design: Low power low frequency, full-duplex. Technical Report, MSR-TR-2009-27.

A. Sahai, S. Diggavi, and A. Sabharwal. On degrees of freedom of full-duplex uplink-downlink channel. In IEEE Information Theory Workshop, 2013.

D. Tse and P. Viswanath. Fundamentals of Wireless Communication. Cambridge University Press, 2005.

C M. Yetis, T. Guo, S. A. Jafar, and A. H. Kayran. Feasibility conditions for interference alignment. In IEEE Globecom, 2009.

W. Zhou, K. Srinivasan, and P. Sinha. Rctc: Rapid transmission coordination in full-duplex wireless networks. In IEEE ICNP, Oct. 2013.

* cited by examiner

INTERFERENCE CANCELLATION

RELATED APPLICATION INFORMATION

This application is a division of co-pending patent application Ser. No. 14/560,723, entitled 'DEGREES OF FREEDOM IN MULTICELL WIRELESS SYSTEMS WITH FULL-DUPLEX BASE STATIONS USING INTERFERENCE ALIGNMENT AND METHODS FOR ENABLING FULL-DUPLEX WITH HALF DUPLEX CLIENTS' and filed on Dec. 4, 2014, which is incorporated herein by reference and in turn claims priority to provisional application Ser. No. 61/949,613 filed on Mar. 7, 2014, which is incorporated herein by reference, and provisional application Ser. No. 61/911,627 filed on Dec. 4, 2013, which is also incorporated herein by reference.

BACKGROUND

Technical Field

The present invention relates to strategies for enabling full duplex wireless systems. More particularly, the present disclosure is related to using interference alignment for enabling duplex wireless systems and/or enabling full duplex wireless systems using half duplex clients.

Description of the Related Art

In order to increase the spectral efficiency in wireless communication systems, several improvements have been performed in the past decades. Besides having better coding and modulation schemes, using feedback, and multiuser interference cancellation, the most notable strategy has been the use of multiple antenna systems. Multiple input multiple output (MIMO) systems can generate a more reliable channel through diversity in transmitting the signal in multiple channels between the transmit and receive antennas, where each channel goes through a different path and potentially has independent fading or moderate to low correlation to other signal paths. The use of MIMO has shown to increase the capacity as well, where multiple signal streams are transmitted in different spatial dimension of the channel. Nonetheless, increasing the number of antennas results in more complicated demodulation, and decoding scheme that is very hard to achieve the optimal performance in practical systems. Hence, the practical use of multi stream transmission is limited to maximum of two streams in current standards (for example release 12 LTE and all prior releases). More transmit and receive antennas can be used for precoding or beam forming, e.g., up to 4 antennas in release 9 LTE and 8 antennas in release 11 LTE. Yet, increasing the number of antennas increases the hardware complexity and cost, and each antenna requires a separate transmit and receive RF chains.

REFERENCES

[1] E. Aryafar, A. Khojastepour, K. Sundaresan, S. Rangarajan, and M. Chiang. MIDU: Enabling mimo full-duplex. In *Proceedings of ACM MobiCom*, September 2012.

[2] O. E. Ayach, S. W. Peters, and R. W. Heath. The practical challenges of interference alignment. In *IEEE Wireless Communications Magazine*, February 2013.

[3] J. Bai and A. Sabharwal. Distributed full-duplex via wireless side channels: Bounds and protocols. *Arxiv*, abs/1212.5300, 2012.

[4] D. Bharadia, E. McMilin, and S. Katti. Full-duplex radios. In *Proceedings of ACM SIGCOMM*, August 2013.

[5] G. Bresler, D. Cartwright, and D. Tse. Interference alignment for the mimo interference channel. *arxiv*, arXiv:1303.5678, 2013.

[6] V. Cadambe and S. A. Jafar. Interference alignment and degrees of freedom of the k user interference channel. *Transactions on Information Theory*, 54(8):3425-3441, August 2008.

[7] J. Choi, M. Jain, K. Srinivasan, P. Levis, and S. Katti. Achieving single channel, full duplex wireless communication. In *Proceedings of ACM MobiCom*, September 2010.

[8] M. Duarte, C. Dick, and A. Sabharwal. Experiment-driven characterization of full-duplex wireless systems. *IEEE Transactions on Wireless Communications*, September 2012.

[9] M. Duarte and A. Sabharwal. Full-duplex wireless communications using off-the-shelf radios: Feasibility and first results. In *Asilomar Conference on Signals, Systems and Computers*, November 2010.

[10] E. Everett, M. Duarte, C. Dick, and A. Sabharwal. Empowering full-duplex wireless communication by exploiting directional diversity. In *Asilomar Conference on Signals, Systems, and Computers*, November 2011.

[11] S. Gollakota, S. Perli, and D. Katabi. Interference alignment and cancellation. In *Proceedings of ACM SIGCOMM*, Barcelona, Spain, August 2009.

[12] M. Jain, T. M. Kim, D. Bharadia, S. Seth, K. Srinivasan, P. Levis, S. Katti, and P. Sinha. Practical, real-time, full duplex wireless. In *Proceedings of ACM MobiCom*, September 2011.

[13] S. W. Jeon and M. Gatspar. A survey on interference networks: Interference alignment and neutralization. *Journal of Entropy*, 14(10):1842-1863, 2012.

[14] K. Lin, S. Gollakota, and D. Katabi. Random access heterogeneous mimo networks. In *Proceedings of ACM SIGCOMM*, August 2011.

[15] K. Miller, A. Sanne, K. Srinivasan, and S. Vishwanath. Enabling real-time interference alignment: Promises and challenges. In *ACM MobiHoc*, June 2012.

[16] B. Radunovic, D. Gunawardena, P. Key, A. Proutiere, N. Singh, V. Balan, and G. Dejean. Rethinking indoor wireless mesh design: Low power low frequency, full-duplex. Technical Report, MSR-TR-2009-27.

[17] A. Sahai, S. Diggavi, and A. Sabharwal. On degrees of freedom of full-duplex uplink-downlink channel. In *IEEE Information Theory Workshop*, 2013.

[18] D. Tse and P. Viswanath. *Fundamentals of Wireless Communication*. Cambridge University Press, 2005.

[19] C. M. Yetis, T. Guo, S. A. Jafar, and A. H. Kayran. Feasibility conditions for interference alignment. In *IEEE Globecom*, 2009.

[20] W. Zhou, K. Srinivasan, and P. Sinha. Rctc: Rapid concurrent transmission coordination in full-duplex wireless networks. In *IEEE ICNP*, October 2013.

SUMMARY

The present disclosure is directed to increasing spectral efficiency in wireless communication systems. In one embodiment, an interface alignment system for communication structures is provided that includes a single cell channel comprising an access point node and a full bipartite interference channel (FBIC) configuration of a plurality of receiving nodes and a plurality of transmitting nodes, wherein each receiving node sees an interfering signal from all transmitting nodes. The access point to the single cell channel provides a single node having downlink channels to all receiving nodes in the FBIC configuration, and all of the uplink channels from the FBIC channel are to the single node that provides the access point to the single cell channel.

In another aspect of the present disclosure, a method of full-duplex communication in a wireless network is provided that may include simultaneous transmission to a plurality of receiving users and simultaneously receiving from a plurality of transmitting users in full duplex, wherein the transmission of the transmitting users are aligned at the receiving users. In some embodiments, the plurality of transmitting users and the plurality of receiving users are half duplex. Each user may be equipped with multiple antenna and alignment of interfering signal of the transmitting users at the receiving users can be performed in spatial domain. Linear precoding or filtering may also be used at the transmitters or the receivers to mitigate the interference. In some embodiments, the plurality of transmitting users and receiving users may be composed of two transmitting users and two receiving users that are active. The alignment that is performed by at least one of communication nodes may be in a distributed manner. The control signal may be communicated between the users directly.

In yet another aspect of the present disclosure, a computer program product is provided that includes a computer readable storage medium having computer readable program code embodied therein for performing a method of full-duplex communication in wireless network. The method may include simultaneous transmission to a plurality of receiving users and simultaneously receiving from a plurality of transmitting users in full duplex, wherein the transmission of the transmitting users are aligned at the plurality of receiving users. In some embodiments, the plurality of transmitting users and the plurality of receiving users may be half duplex.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiment 1

Figure 1:
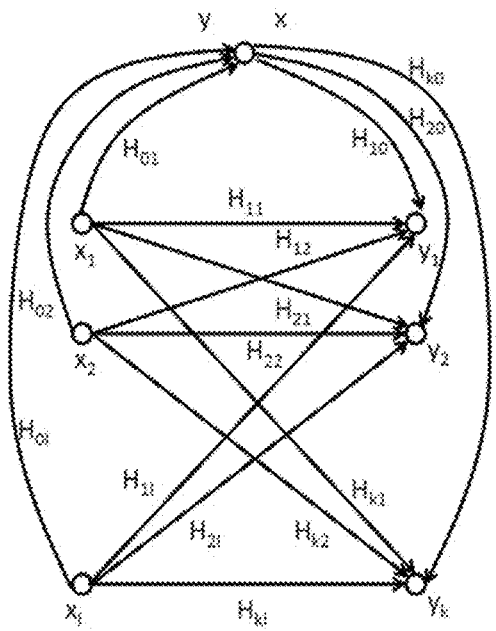
FIG. 1 is a schematic of a single cell channel, in accordance with one embodiment of the present disclosure.

One of the main challenges in deployment of full duplex systems in a network is the scaling of the promised doubling of the spectral efficiency by the full duplex operation when multi-user communication and multiple antenna systems are considered. In one aspect, the methods, systems and computer program products disclosed herein address a practical way of solving this challenge in a wireless system consisting of a single cell or multiple cells with a full duplex access points. Interface alignment is proposed where all the uplink nodes attempt to align their interferences only on a subset of resolvable degrees of freedom of each downlink user.

Further, enabling wireless full-duplex (from an access point (AP)) with multiple half duplex (HD) clients is key to widespread adoption to full-duplex (FD) commercial networks. However, enabling FD in such networks is fundamentally challenged by a new form of uplink-downlink interference (UDI) that arises between HD clients operating simultaneously in the uplink and downlink directions of the full-duplex network. In this context, it is shown that spatial interference alignment (IA) between clients is an effective and scalable technique to address the uplink-downlink interference (UDI), and hence enable full duplex (FD) in these networks, especially in the presence of multiple input multiple output (MIMO) scenarios. In some embodiments, the methods, systems and computer program products that are disclosed herein provide full-duplex without strings (FDoS). In some embodiments, the methods, systems and computer program products build the theory of applying spatial interference alignment (IA) to full duplex methods in general and present elegant, implementation friendly constructions for generating feasible interface alignment (IA) solutions that leverage the structure of interference specific to these networks. In the process, the full-duplex without strings (FDoS) system shows that four half duplex (HD) clients are both necessary and sufficient to eliminate UDI through IA and enable 2N streams at an N transceiver access point (AP). FDoS systems also enable an efficient media access control (MAC) design at the AP to handle clients with heterogeneous antenna capabilities, maximize the throughput of the enabled streams in the full duplex (FD) session, as well as reduce the overhead incurred in FDoS by half by facilitating a distributed implementation. One key feature of the disclosed methods and system is to realize full duplex communication between multiple users that are in the same interference domain. This feature allows the gain of full duplex technology to scale with the increasing number of users.

It should be understood that embodiments described herein may be entirely hardware or may include both hardware and software elements, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor, e.g., a hardware processor, coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

The use of full duplex systems can potentially revolutionize the hard threshold on spectral efficiency where in theory the spectral efficiency of a single link can be doubled in comparison to half duplex (HD) systems. A "duplex communication system" is a point-to-point system composed of two connected parties or devices that can communicate with one another in both directions. There are two types of duplex communication systems: full-duplex and half-duplex. In a full duplex system, both parties can communicate to the other simultaneously. In a half-duplex system, in contrast, each party can communicate to the other, but not simultaneously; the communication is one direction at a time. Recent work on FD wireless systems has considered the use of multiple antennas for cancellation of the self interference (SI), however the number of RF chains would not increase for the additional antennas used for the purpose of SI cancellation. The comparison of a multiple antenna system working in HD or FD shows the benefit of either technology in different scenarios considering their algorithmic and hardware complexity. One issue is finding ways to enable FD without sacrificing MIMO performance. Another important problem is enabling multi user communications in FD systems that seem to be a bottleneck in achieving the promised 2 times spectral efficiency for single link FD system. The main issue is that when multiple users are communicating with a single node (base-station or access point), their uplink signal causes interference to the downlink signal transmitted from the access point which are now both in the same frequency band. Therefore, the main problem is to address the uplink interference in the downlink transmissions. This issue has been noticed and formalized be several prior works. A prior art in addressing the uplink interference in downlink transmission uses a different frequency band that is not used by the base station to share the uplink interference signal between the users. This solution relies on availability of a different frequency band and the assumption that this band cannot or may not be used by the access point.

In some embodiments, the methods, systems and computer program products disclosed herein address the self interference by interference alignment and cancellation. In some embodiments, the methods, systems and computer program products disclosed herein propose a scheme that requires less signaling between the users and access point, which can be done in the same frequency band that is used by the access point. In some embodiments, the channel state information between the users is used by the methods disclosed herein in a central entity, e.g., the access point, to compute a set of precoders to be used by the users and access point with the goal of eliminating or reducing interference of the uplink users on the downlink transmission. In some embodiments, each involved uplink user sacrifices part of its degrees of freedom (the number of independent streams that could be transmitted in the uplink) in order to align its interference with other involved uplink users on the downlink users leaving the downlink users with some degrees of freedom (the number of independent streams that can be received by a downlink user).

Figure 5:
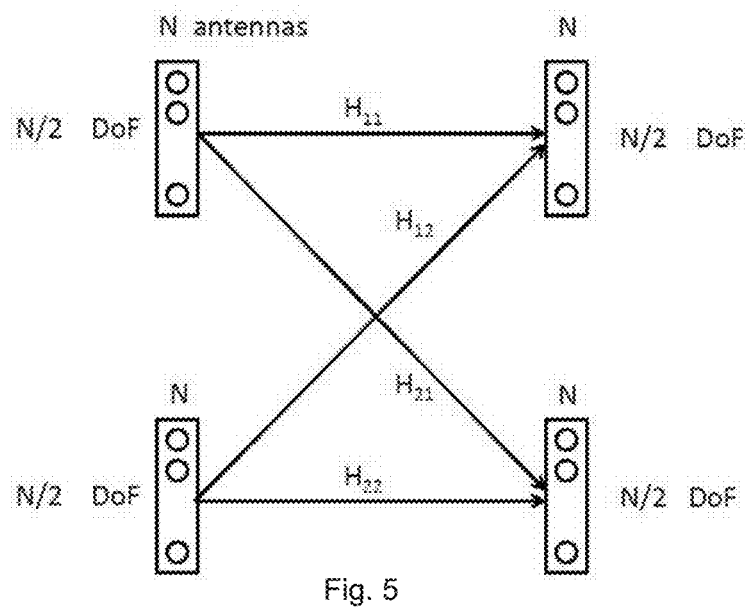
FIG. 5 is a schematic depicting the degrees of freedom available in one embodiment of a symmetric 2,2 FBIC.

In some embodiments, constructing a full duplex node can be more efficient and can be easier for the access points and it is desirable to have half duplex clients for the sake of simplicity, power consumption, as well as better handling of the mobility. In one example, the methods, systems and computer program products disclosed herein present a scheme in which four users are picked from the pool of users. For the sake of simplicity, it is assumed that each user and the access point have N antennas. The case of users and access points with different number of antennas can be handled similarly. For example, it can be scheduled that two users are in the uplink and two users are in the downlink. By using interference alignment two uplink users only use N/2 out of their N degrees of freedom to transmit data in the uplink to the access point, while by using a linear precoding, they align the interference that they cause to the two downlink users in only N/2 dimensions such that each downlink user is left with N/2 degrees of freedom to receive streams from the access points, as depicted in FIG. 5. FIG. 5 depicts the degrees of freedom available in one embodiment of a symmetric 2,2 FBIC. As a result the total of 2N degrees of freedom can be used to transmit 2N streams, where N degrees of freedom are used in the uplink and N degrees of freedom are used in the downlink. It is noted that in prior art systems using MU-MIMO (multi-user MIMO), only N degrees of freedom can be achieved in either downlink or uplink. Even if interference cancellation or interference alignment is used in conjunction with MU-MIMO, the maximum degrees of freedom would remain as N. Hence, the use of full-duplex access point can in fact double the spectral efficiency in a single cell by using intelligent interference alignment technique.

The methods, systems and computer program products employ a revolutionary fact that doubling the number of possible transmit and receive streams is possible. More particularly, in the high signal to noise ratio (SNR) regime, the scaling of a total transmit and receive information by a full duplex access point in a single cell is twice as much as that of a half-duplex access point in a single cell. The methods, structures and systems disclosed herein characterize the achievable and maximum possible scaling factor in multi-cell systems.

Although the focus of the methods, systems and computer program produces may be on the degrees of freedom achievable through transmit and receive precoder (filter) design, the actual design of the precoders may be considered in terms of other system measures, such as the received signal power RSSI, signal to noise ratio, or a capacity measure. For simplicity of the discussion and without loss of generality, the precoders may be considered to be semi-orthogonal matrices, which means they are formed by selecting rows or columns of a unitary matrix. However, in other embodiments, given a total dimension of a precoder, the precoder does not have to be a semi-unitary matrix. In other words, the rows or columns of the precoding matrices might not be orthogonal. The latter condition would allow for the design of more efficient filters that can achieve, e.g., better capacity or throughput in low or mid range of signal to noise ratio. Nonetheless, all such precoders would follow the same degree of freedom at high SNR and have the same scalability factor. In some embodiments, it is possible to perform the interference alignment in distributed form, in which each node performs the calculation of the precoders individually or based on some feedback from other nodes.

In some embodiments, the methods, systems and computer program products employs a channel model that considers a communication channel consisting of L transmitting nodes which have intended signal for a single node called access point or base station and K receiving nodes that receive signal from the same access point. A memory less channel is considered to be present between all pair of the nodes that can be accessed simultaneously and the transmission is received by a single node from all transmitting point that are active simultaneously. This means that part of the channel may be used by considering some of the transmit signals to be zero, for example, when the access point works in half duplex mode it can either transmit to all or a subset of receiving nodes and the access point will not receive any signal from the transmitting point. However, in the same scenario, if the transmitting node beside the access point start a simultaneous transmission with the access point it would cause an interference with the potential receiving points. A half duplex access point can also receive from all or a subset of transmitting points when it has stopped transmission to the receiving nodes. The transmitting node may also be called the uplink nodes or uplink users and the channel between these nodes and the access point is also called uplink channel. Similarly, the receiving node may also be called downlink nodes or downlink users and the channel between them and the access point is called downlink channel.

A full duplex access point can transmit in the downlink while it receives in the uplink. However, the situation where a full duplex access point is used is very different from the case where a half duplex access point is deployed. In the latter case, the uplink channel is used separately from the downlink channel, hence, there is no interference in on the downlink users from the uplink transmission. However, in the former case, where a full duplex access point is used, the possibility of using the full potential of the downlink and uplink channel simultaneously is limited by the fact that the downlink users are suffered from the interference caused by the uplink transmissions.

The following description provides some embodiments of how the methods, systems and computer program products disclosed herein address an interference management technique in a single or multiple cells where the communication channel in each cell is defined by the channel model presented in this section.

Figure 2:
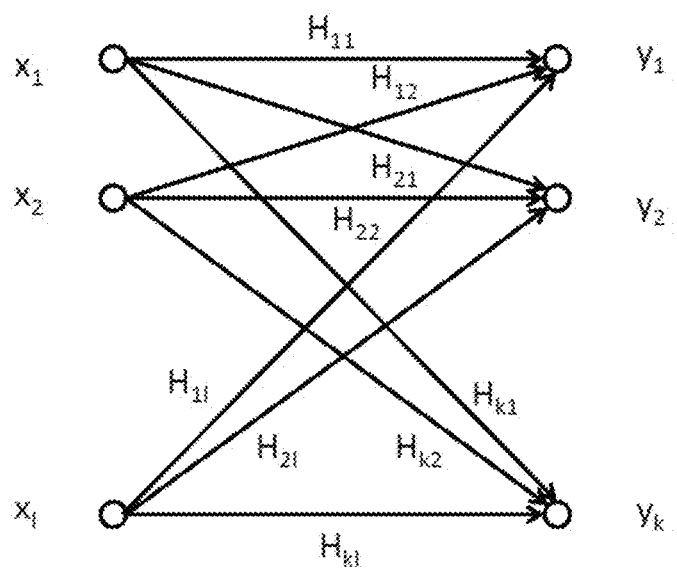
FIG. 2 is a schematic of a full bipartite interference channel (FBIC), in accordance with one embodiment of the present disclosure.

As it is illustrated in the schematic of the single cell channel (SCC) that is depicted in FIG. 1, the channel $H_{11}$, $H_{12}$, $H_{21}$, $H_{22}$, $H_{1j}$, $H_{2j}$, $H_{k1}$, $H_{k2}$, is composed of a full bipartite graph between the uplink nodes and downlink nodes, as well as a multiple access channel $H_{0j}$, $H_{02}$, $H_{01}$ from all the uplink nodes $x_1$, $x_1$, $x_2$, to the access point y, x, and a broadcast channel $H_{0j}$, $H_{02}$, $H_{01}$ from the access point y,x to all downlink nodes $y_1$, $y_2$. Since the interference management is the crucial part of enabling full duplex communication in a single cell, we concentrate on the possible degrees of freedom that are achievable in the full bipartite interference channel (FBIC) between uplink and downlink nodes, which is illustrated in FIG. 2. Considering only the FBIC (FIG. 2), the received signal at each downlink node j, j=1, 2, . . . , K is given by:

$$y_j = \Sigma_{i=1}^{L} H_{ji} X_i + Z_j \quad \text{Equation (1)}$$

where $y_j$ is a vector of size $N_{r,j}$, $X_i$ is the vector of transmit signal of size $N_{t,i}$, and $H_{ji}$ represent the channel between the transmitter I and the receiver j that is a matrix of size $N_{r,j} \times N_{t,i}$ with entries that are independent and identically distributed (i.i.d.) circularly symmetric complex numbers with mean zero and variance $\sigma^2$. The total received signal in the original single cell channel (SCC) illustrated in FIG. 1 with transmission from the access point is given by:

$$y_j + H_{j0} x_0 \quad \text{Equation (2)}$$

where $y_0$ is the transmitted vector from the access point and $H_{j0}$ is the channel from the access point to the receiver j. The received signal at the access point is given by:

$$y_0 = \Sigma_{i=1}^{L} H_{0i} X_{0i} \quad \text{Equation (3)}$$

where $y_0$ is a vector of size $N_{r,0}$ and $H_{0i}$ represent the channel between the transmitter i and the access point. The noise at each receiver is represented by $z_j$ (subscript zero means the access point) that is a vector of zero mean unit variance circularly symmetric complex white Gaussian noise.

Interference Alignment in FBIC

In order to maximize the uplink and downlink throughput, the interference received at the downlink users from the uplink nodes have to be mitigated. Different approaches for interference alignment exist that could include symbol level interference alignment, e.g., by using lattice codes, or by using linear precoding to mitigate interference in time domain, subcarrier domain, space domain (for multiple antenna systems) or a combination of the three. The interference management in time domain might need the use of channel extension, and assumption of having time varying channel. There are several practical consideration with channel extension in time domain. For example, the channel has to be time varying with a rate that we get enough random channel realization in order to perform linear precoding and possible interference alignment that is effective, while the assumption of knowing the channel at the transmitter forces a slow variation in the channel so that the channel can be estimated and more importantly to have small channel estimation overhead in comparison to the time that the channel estimates are valid to be used for the actual data transmission.

The interference alignment in the subcarrier domain may be done similarly as the one in the space domain. Therefore, it is possible to consider subcarriers as different antennas and convert the system to a multiple antenna system with a larger number of antennas. It is noted that this transformation might change the channel properties, e.g., it might introduce a correlation between the channel coefficients.

Figure 3:
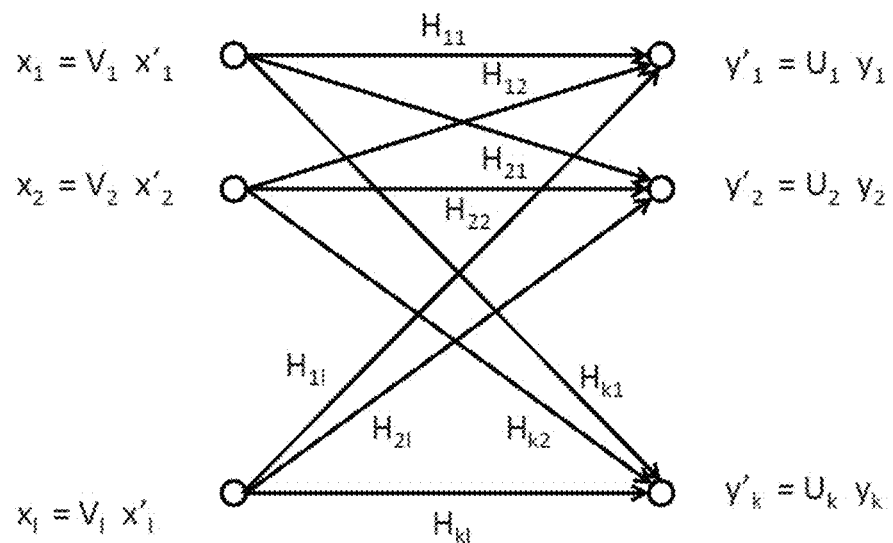
FIG. 3 is a schematic of a full bipartite interference channel (FBIC) including transmit and receive precoding filters and interpretation of channel reduction, in accordance with one embodiment of the present disclosure.

For practical reason, we focus on the interference alignment in space domain where the channel coefficients are fixed. We consider a fixed precoder per block or multiple block of transmission within the channel coherence time where the channel coefficients are approximately constant. As shown in FIG. 3, a transmit precoding matrix $V_i$, $i=1, 2, \ldots, L$ is considered at each transmission node and a receiver filter or a receive precoding matrix $U_j$, $j=1, 2, \ldots, K$ at each receiving node. FIG. 3 depicts full bipartite interference channel (FBIC) depicting transmit and receive precoding filters and interpretation of channel reduction. The transmit precoding matrices V are of dimensions $N_{t,i} \times d_{t,i}$ where $d_{t,i} \leq N_{t,i}$ and receive filters $U_j$ are of dimension $d_{r,j} \times N_{r,j}$. It is noted that the precoding matrices $V_i$ and $U_j$ are both required to be full rank, and for simplicity are considered to be semi-orthogonal matrices, which means that the rows of $U_j$ (the columns of $V_i$) are orthonormal (mutually orthogonal and have unit norm). The alignment condition is then given by:

$$U_j H_{ij} V_j = 0 \; \forall i=1,2,\ldots,L, \text{ and } j=1,2,\ldots,K \quad \text{Equation (4)}$$

It is noted that the alignment conditions may be written in terms of rows of $U_i = [u_i^1 u_i^2 \ldots u_i^{d_{r,i}}]$ and columns of $V_j = [v_j^1 v_j^2 \ldots v_j^{d_{t,j}}]$. Under these circumstances, all vectors $u_i^a$ and $v_j^b$ for a given i and j and for all indices a and b satisfy the same equation:

$$u_i^a H_{ij} v_j^b = 0 \quad \text{Equation (5)}$$

In some embodiments, the above condition provides two conditions that can be necessary. First, the degrees of freedom of a receiving node j that is the number of independent vectors cannot be more than the dimension of the vector space that contains this vector, hence $d_{t,j} \leq N_{t,j}$. Similarly, for $u_i^a$ we have $d_{r,i} \leq Nr, I$ that can be the second necessary condition. There are two more conditions that can be deduced from Equation (5). In some embodiments, a third necessary condition may be given by $d_{r,i} + d_{t,j} \leq \max N_{r,i}, N_{t,j}$. This is true due to the fact that if $N_{r,i} \geq N_{t,j}$ for a given i and j all vectors $H_{ij} v_j^b$ have to be linearly independent since $H_{ij}$ is generic and furthermore they are orthogonal to all $u_i^a$, which means that the total number of such vectors are less than the dimension of the vector $u_i^a$ that is $N_{r,i}$.

In some embodiments, the fourth necessary condition may be obtained by counting the number of scalar variables and scalar equations or constraint that the variable have to satisfy. The intuition obtained from the linear algebra is that a system of linear equation most likely does not have a solution if the number of variables are less than the number of constraint is the coefficients of the equations are generic. In some embodiments, it is possible to consider a set of constraints that are not linearly independent, e.g., if the coefficients are not generic, which means that the system might have a solution when there are artificially more constraints than the variables but in fact the number of algebraically independent constraints are in fact lower than the number of variables.

The number of variables in a subset of equations S between the transmit and receiving node pair (i, j) is given by $\Sigma_{i:(i,j) \in I} d_{t,i}(N_{t,i} - d_{t,i}) + \Sigma_{i:(i,j) \in I} d_{t,i}(N_{r,i} - d_{r,i})$ where:

$$S \subseteq M = \{(i,j), 1 \leq i \leq L, 1 \leq j \leq K\} \quad \text{Equation (6)}$$

The number of scalar equation in the same set is given by $E_{i:(i,j) \in I} d_{t,i} d_{r,j}$. Therefore, the fourth necessary condition can be provided by:

$$\Sigma_{i:(i,j) \in I} d_{t,i}(N_{t,i} - d_{t,i}) + \Sigma_{j:(i,j) \in I} d_{r,i}(N_{r,i} - d_{r,i}) \geq$$
$$\Sigma_{i,j:(i,j) \in I} d_{t,i} d_{r,j} \forall I \subseteq \mathcal{M} \quad \text{Equation (7)}$$

In the case that multiple cells are deployed, the coordination between the access point can be key. For example, considering a traditional half duplex system with multiple cells. The interference caused by the users or access point in one cell will affect the users and the access point in the other cell, hence the achievable throughput in adjacent cell can drop. However, the coordination between the access point can potentially make the system to work as a multiple antenna system, where the antennas are distributed in different locations. The level of coordination between the access point, however, is a function of available backhaul (its capacity and its latency) between the access points. The Coordinated Multi-Point (CoMP) transmission and reception has been one of the study items in recent standards. The downlink CoMP is usually easier to implement due to the fact that all precoding calculations and encoding process may be performed at a central location, and then forwarded to the access points that are involved in transmission. On the other hand, realization of uplink CoMP with processing in a central location may require transmission of the received signals in the backhaul. Since the computed signals in downlink CoMP are in digital form it is usually much easier to be sent in the backhaul while the dimension of the uplink received signals even after analog-to-digital conversion are much larger than the signals that need to be transmitted to enable downlink CoMP. Therefore, it might be desirable to also consider systems that deploy downlink CoMP, but not the uplink CoMP. In some embodiments of the systems, methods and computer program products disclosed herein, it is assumed that full downlink and uplink CoMP is deployed by base stations in either scenario of systems with half duplex access points or full duplex access points.

The full bipartite interference channel (FBIC) that has been described above with reference to FIGS. 1, 2, 3 and 5 is distinguishable from typical interference channels. The channels may seem to have similarities at a first glance. Both channels are multi-user channel, there are a set of transmitters and another set of nodes that are receivers. Each receiver sees multiple interfering signals. However, there the number of transmitting nodes and receiving nodes in a conventional, i.e., non-FBIC, interference channel are always equal, and there is a one to one correspondence between each transmitting node to a receiving node. The intended signal that are received by each receiver is the signal that is transmitted from the corresponding transmitting point. Therefore, with for example K transmit-receive pairs, there are only K degrees of freedom in the channel where degrees of freedom are in fact associated with K direct links between the corresponding transmit and receive pairs.

However, the degrees of freedom for an FBIC channel may be defined per node. This means that that the degrees of freedom for each transmitting node can be equal, but the degrees of freedom for the receiving nodes can be different. For example, the degrees of freedom of each of the transmitting node could be equal to 2, while degrees of freedom of all receiving nodes can be equal to 1. This means that each transmitting node can in fact transmit in two independent and orthogonal direction. While the transmitting node interferes with all receiving nodes, the transmitting node of the FBIC channel provides at least with one degree of freedom, or one channel direction, that is interference free, and hence can be used by another node, e.g., the access point to receive information. This situation is very different from the one in the (non-FBIC) interference channel, where degrees of freedom are defined per direct link between the corresponding transmit-receive pair, and it is not useful to have a transmit precoder or a receive filter that is potentially has larger dimension than the other one.

Figure 4:
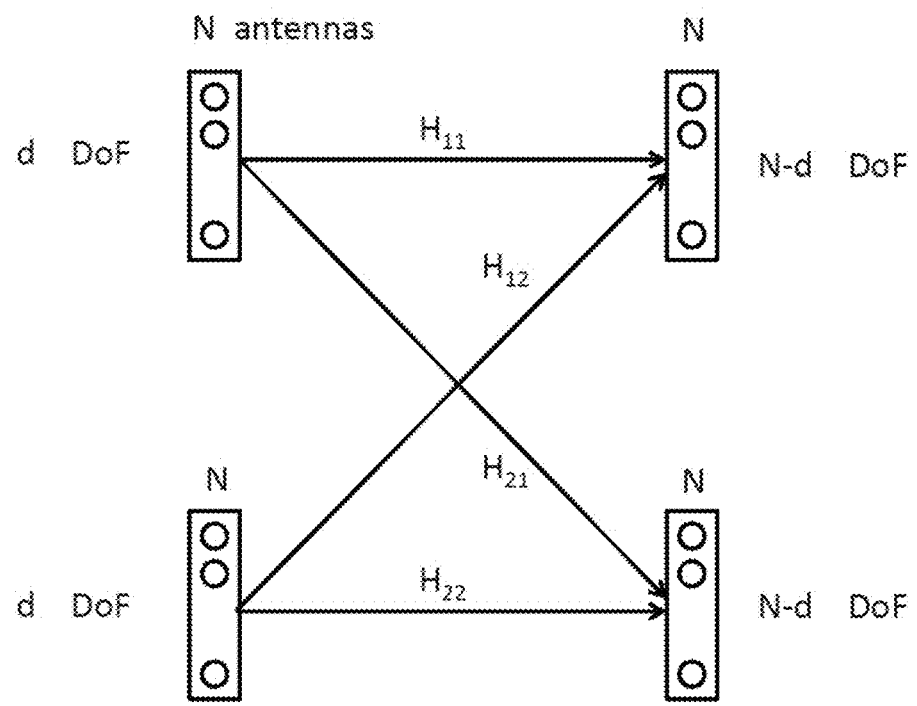
FIG. 4 is a schematic of one embodiment of the degrees of freedom in a symmetric full bipartite interference channel (FBIC), in accordance with the present disclosure.

In the following paragraphs some examples of designs and bound for interference alignment in FBIC type channels is provided. For example (referred to hereafter as Lemma 1), the maximum degrees of freedom in a (2,2) FPIC channel with N antenna, e.g., virtual antenna, at each node, e.g., transmission and receiving nodes, may be equal to 2N, as depicted in FIG. 4. FIG. 4 depicts one embodiment of the degrees of freedom available in a symmetric (2,2) FBIC. In this example, $V_1$ and $V_2$ can be the transmit precoding filters (as depicted in FIG. 3) and $U_1$ and $U_2$ can be the receive precoding filters (as depicted in FIG. 3). The following equation is to be satisfied:

$$U_i H_{ij} V_j = 0 \quad \forall i=1,2, \text{ and } j=1,2 \qquad \text{Equation (8)}$$

Letting $d_{t,i}$ and $d_{r,i}$, i=1, 2 denote the degrees of freedom of transmitting notes and receiving nodes, respectively. Counting, the number of variables and equations, results in the following:

$$\sum_{i=1}^{2} d_{t,i}(N-d_{t,i}) + d_{r,i}(N-Nd_{r,i}) \geq \sum_{i=1}^{2} \sum_{j=1}^{2} d_{t,i} d_{r,j} \qquad \text{Equation (9)}$$

Rearranging the above inequality in Equation (9) provides the following:

$$(d_{t,1}+d_{t,2}+d_{r,1}+d_{r,2})N \geq \sum_{i=1}^{2} d_{t,i}^2 + \sum_{i=1}^{2} d_{r,i}^2 + \sum_{i=1}^{2}\sum_{j=1}^{2} d_{t,i} d_{r,j} \qquad \text{Equation (10)}$$

$$\geq \sum_{i=1}^{2} d_{t,i}^2 + \sum_{i=1}^{2} d_{r,i}^2 + \sum_{i=1}^{2}\sum_{j=1}^{2} d_{t,i} d_{r,j} - (d_{t,1}-d_{t,2})^2 - (d_{r,1}-d_{r,2})^2 \qquad \text{Equation (11)}$$

$$\geq \tfrac{1}{2}(d_{t,1}+d_{t,2}+d_{r,1}+d_{r,2})^2 \qquad \text{Equation (12)}$$

Hence providing:

$$(d_{t,1}+d_{t,2}+d_{r,1}+d_{r,2}) \leq 2N \qquad \text{Equation (13)}$$

In another example (referred to as Lemma 2 and reduction lemma), if by using a particular set of transmit and receive filters, a set of degrees of freedom is achievable, it can be possible to rewrite all the channels with a different number of transmit and receive antennas that are equal to the achievable degrees of freedoms at each node where the channel gain between the pair of the nodes (where interference has been taken care of) is equal to zero. For example, making the assumption that the transmit precoders $V_i$, i=1, 2, ..., L and the receive filters Uj, j=1, 2, ..., K have been used at uplink and downlink nodes. The signal seen at the receiver j can be rewritten as $y'_j = U_j y_j$ and the transmit signal at the transmitting node i is given by $x_i = v_i x'_i$. In view of the above, the following is provided:

$$y_j = \sum_{i=1}^{L} H_{ji} x_i + z_j \qquad \text{Equation (14)}$$

$$y'_j = \sum_{i=1}^{L} U_j H_{ji} V_i x'_i + z'_j \qquad \text{Equation (15)}$$

where $z'_j = U_j z_j$. Therefore, the equivalent channel can be considered as $H'_{ji} = U_j H_{ji} V_i$ that is the matrix of size $d_{r,j} \times d_{t,i}$. In some embodiments, the selection of transmit precoders and receive filters may only cancels out the interferences between particular subgroups of the nodes where $U_j H_{ji} V_i$ is zero only for particular values of i and j for which the corresponding channels are zero. In some embodiments, the reduction lemma allows for a full interference alignment solution for a complicated problem to be broken down in multiple stages. For example, in some embodiments, by using the reduction lemma it is possible to find simple algebraic solution to the interference alignment problem in large channels.

In another example (referred to as Lemma 3), a total degrees of freedom being equal to 2N is achievable using any split of d,d≤N at both transmit points, and N−d at both receiving nodes in a (2,2) FBIC channel, as depicted in FIG. 4, with N antenna at each node. As in proof of Lemma 1, $V_1$ and $V_2$ can be the transmit precoding filters of size N×d and $U_1$ and $U_2$ can be the receive precoding filters of size N×(N−d). The following has to be satisfied:

$$U_i H_{ij} V_j = 0 \quad \forall i=1,2, \text{ and } j=1,2 \qquad \text{Equation (16)}$$

$V_1$ and $V_2$ are selected such that $\text{span}(H_{11}V_1) = \text{span}(H_{12}V_2)$ in order to align the interferences of both transmitting nodes into the same space of size N×d dimensions at the receiving node 1. Such selection is easy as for any choice of the precoding matrix $V_1$, the precoding matrix $V_2$ can be obtained by choosing $V_2 = H_{12}^{-1} H_{11} V_1$ where for random matrices Hi j this can be done with probability 1. In order to align the interferences of both transmitter to the receiving node 2, we must have $\text{span}(H_{21}V_1) = \text{span}(H_{22}V_2)$, hence we have $\text{span}(V_1) = \text{span}(H_{11}^{-1} H_{12} V_2)$. In order to satisfy both alignment conditions, we have $\text{span}(V_1) = \text{span}(H_{11}^{-1} H_{12} H_{12}^{-1} H_{11} H_{12}^{-1} H_{11} V_1)$. This means that $V_1$ can be composed of any d eigenvectors of the matrix $H_{11}^{-1} H_{12} H_{12}^{-1} H_{11}$ and $V_2 = H_{12}^{-1} H_{11} V_1$. Under these conditions the space of signals at both receiving nodes is limited to a d dimensions and hence there exist N−d orthogonal dimensions at each receiving nodes, which can be used to construct N×(N−d) dimensional receive filters $U_1$ and $U_2$.

In another example (referred to as Lemma 4), in a single cell with a full duplex access point with N transmit and N receive RF chains and (K−t,K) FBIC with L transmitting nodes with degrees of freedom $d_{t,i}=1, \ldots, L$, and K receiving nodes with degrees of freedom $d_{r,i}=1, \ldots, K$, the total simultaneous uplink and downlink streams is equal to:

$$\min(N, \sum_{i=1}^{L} d_{t,i}) + \min(N, \sum_{i=1}^{K} d_{r,i}) \qquad \text{Equation (17)}$$

Proof for the validity of Equation (17) relies on the fact that the transmitting nodes have total of $\sum_{i=1}^{L} d_{t,i}$ degrees of freedom to transmit in uplink to a full duplex access point without causing interference on total of $\sum_{i=1}^{K} d_{r,i}$ degrees on freedom available to the receiving point that receive signals from the same full duplex access point in the downlink. However, the number of transmitted stream in the downlink and received stream in the uplink by the access point can also be limited by the number of RF chain (or corresponding antenna) in each direction. Assuming the number of antennas for the purpose of transmission or reception or equivalently, the number of RF chain in the receive path and transmit path are both equal to N that is the same as the number of antennas for each node in FBIC, the total stream in the uplink and downlink is also bounded by N. The uplink channel between the transmitting node and the access point is independent of the intranode channels in FBIC, hence, the transmitted signal to the access point are received in generic direction, which means that up to the N of them are independent. In some embodiments, the number of antenna at the access point could be different from the number of antenna at the FBIC. For example, the number of access point antenna might be larger than the number of antennas at the transmitting point, and still due to the fact that the uplink channels are generic, the number of resolvable directions would be only limited by the number of antennas at the access point rather than the dimension of transmitting vectors. The same arguments hold true for the downlink channel between the access point and the receiving nodes.

Figure 6:
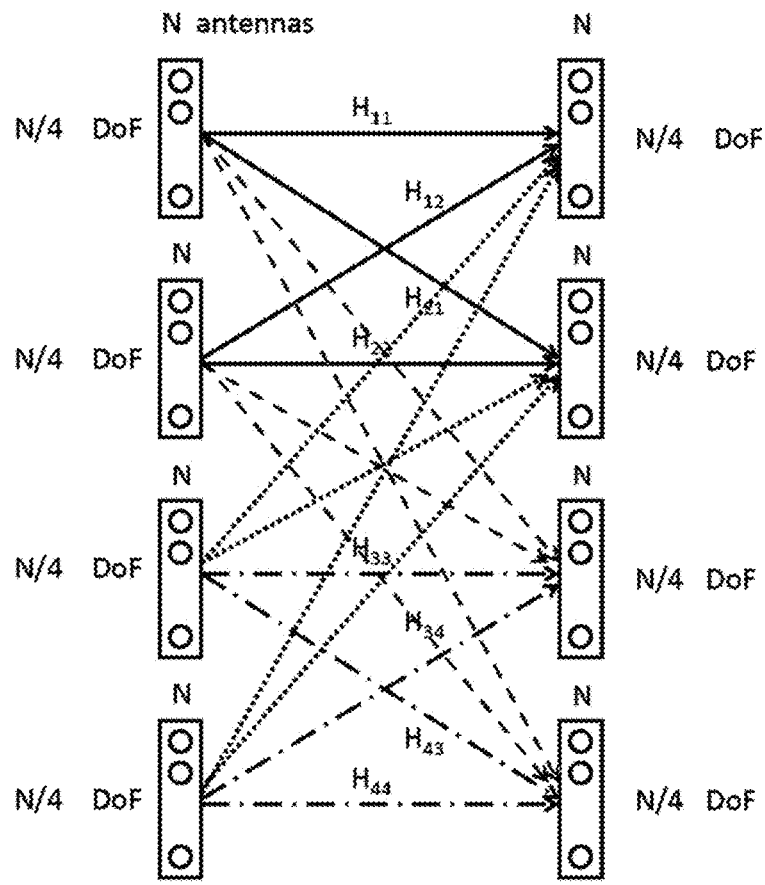
FIGS. 6-13 are schematics of other embodiments of full bipartite interference channel (FBIC) configurations for use with the method, systems and computer program products of the present disclosure.
Figure 7:
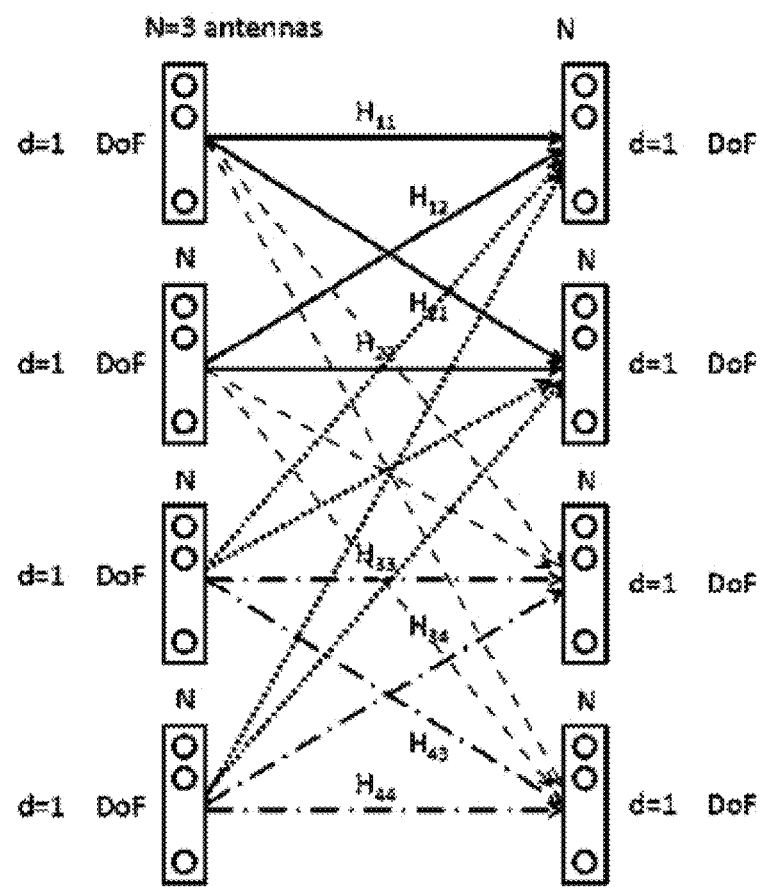

FIG. 6 depicts the degrees of freedom that are achievable in a symmetric (4,4) FBIC with algebraic construction (N=4 antennas per node). FIG. 7 depicts the degrees of freedom that are achievable in a symmetric (4,4) FBIC with N=3 antennas per node.

Figure 8:
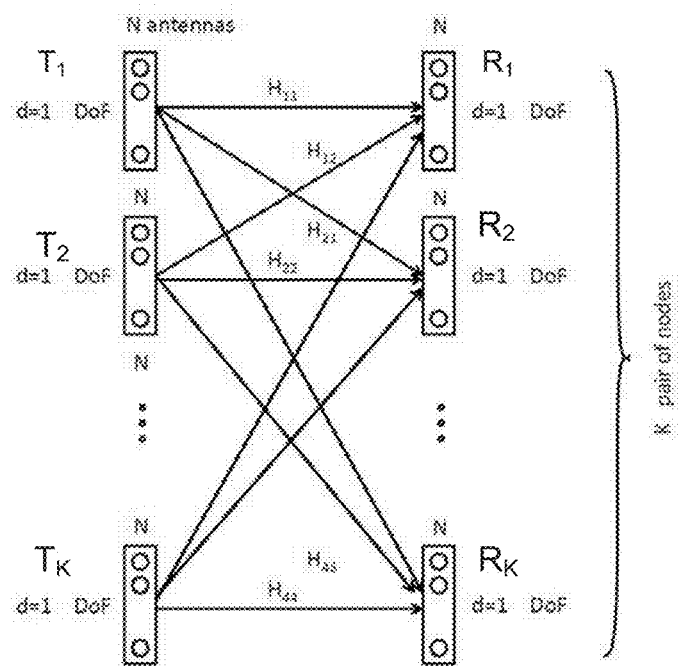

In yet another example (referred to as Lemma 5), a maximum of the total degrees of freedom in a (K,K) FBIC channel, as depicted in FIG. 8, with a symmetric d degrees of freedom and N antenna at each node is $$2K\left\lfloor \frac{2N}{k+2} \right\rfloor.$$

FIG. 8 depicts the degrees of freedom achievable (by algebraic construction) in a symmetric (K,K) FBIC with arbitrary number of nodes K and number of antennas N per node. In this example, the number of variables have to be greater or equal to the number of constraint in order to have a possible solution, in which:

$$\sum_{i=1}^{K} d_{t,i}(N - d_{t,i}) + d_{r,i}(N - d_{r,1}) \geq \sum_{i=1}^{K}\sum_{i=1}^{K} d_{t,i}d_{r,j} \quad \text{Equation (18)}$$

$$2Kd(n-d) \geq K^2 d^2 \quad \text{Equation (19)}$$

$$d \leq \frac{2N}{K+2} \quad \text{Equation (20)}$$

In this example, there are 2K nodes each with degrees of freedom less than or equal to $$\frac{2N}{k+2}$$

that will add up to $$2K\left\lfloor \frac{2N}{k+2} \right\rfloor.$$

In a further example (referred to as Lemma 6), the maximum degrees of freedom in an arbitrarily large FBIC with maximum of N antenna at each node is not limited by N and can be made arbitrarily large. Considering a (K,K) FBIC where the case that total uplink degrees of freedom is limited to N−1, i.e.:

$$\Sigma_{i=1}^{K} d_{t,1} \leq N-1 \quad \text{Equation (21)}$$

In this example, each node in the downlink has at least one degrees of freedom left. Hence, the total number of degrees of freedom in the system can be made at least as large as N−1+K. Therefore, in some embodiments, by increasing the number of downlink users, e.g., increasing K, the total degrees of freedom in the system can grow unboundedly and independent of the number antennas N. In some embodiments of this example, the total number of uplink user does not need to increase with increasing K, and at most N−1 uplink user suffices to reach the desired result. Lemma 6 reveals that the (K,K) FBIC with constant gain has degrees of freedom scaling that is much better than interference channel even with time extension (time varying channel with channel state information (CSI) at the transmitters) that is bounded by K/2.

In a further example (referred to as Lemma 7), an FBIC is considered with N antenna per node, wherein if either of the uplink or downlink degrees of freedom scales with the number of antennas N as $(1+\alpha)N$ then the other one cannot scale with a scaling factor more than $(1+1/\alpha)$. In some examples, this can mean that both the uplink and downlink degrees of freedom cannot be made equal to 2N or larger simultaneously. For example, considering a (K,K) FBIC with N antenna at each node, in which by counting the number of variables and constraints, the following equations are provided:

$$\Sigma_{i=1}^{K} d_{t,i}(N-d_{t,i}) + d_{r,i}(N-d_{r,i}) \geq \Sigma_{i=1}^{K}\Sigma_{i=1}^{K} d_{t,i} d_{r,j} \quad \text{Equation (22)}$$

$$N(\Sigma_{i=1}^{K} d_{t,i} + \Sigma_{i=1}^{K} d_{r,1}) \geq \Sigma_{i=1}^{K} d_{t,i}^2 + \Sigma_{i=1}^{K} d_{r,i}^2 + \Sigma_{i=1}^{K} d_{t,i} \Sigma_{i=1}^{K} d_{r,j} \quad \text{Equation (23)}$$

In one example, when $(1+\alpha)N = \Sigma_{i=1}^{K} d_{t,i}$ and $(1+\beta)N = d_{r,i}$ for some non negative real numbers $\alpha$ and $\beta$, Lemma 9 can support the existence of at least N uplink and N downlink simultaneously. $\alpha$ and $\beta$ may exist. However, for the purpose of finding the upper bound, $\alpha$ and $\beta$ may be considered as negative values between −1 and 0 to provide:

$$N((1+\alpha)N+(1+\beta)N) \geq \Sigma_{i=1}^{K} d_{t,i}^2 + \Sigma_{i=1}^{K} d_{r,i}^2 + (1+\alpha)N(1+\beta)N \quad \text{Equation (24)}$$

$$N^2(2+\alpha+\beta) \geq \Sigma_{i=1}^{K} d_{t,i}^2 + \Sigma_{i=1}^{K} d_{r,i}^2 (1+\alpha+\beta+\alpha\beta) \quad \text{Equation (25)}$$

$$N^2 \geq \Sigma_{i=1}^{K} d_{t,i}^2 + \Sigma_{i=1}^{K} d_{r,i}^2 + N^2 \alpha\beta \quad \text{Equation (26)}$$

Therefore, in view of the above, $\alpha\beta < 1$ or equivalently $\beta < 1/\alpha$, must be met. This can mean that scaling in the uplink and downlink are bounded by $(1-\alpha)N$ and $(1+\beta)N$ where $$\beta < \frac{1}{\alpha}.$$

Hence, the scaling of 2N in the uplink and downlink is possible simultaneously. Further, based on Theorem 1 for large enough K it is possible to approach arbitrarily close to this scaling.

Figure 15:
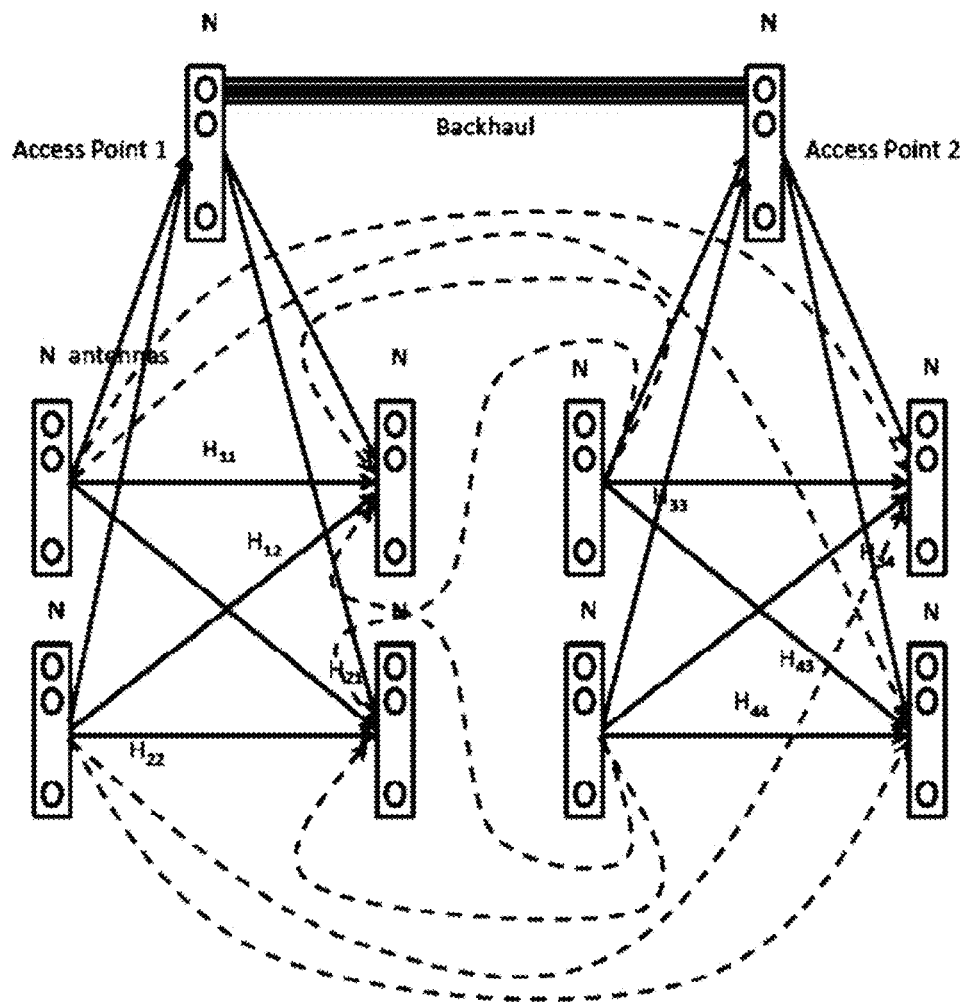
FIG. 15 is a schematic of a multi-cell channel having FBIC between users in each cell, and showing the interference from adjacent cells, in accordance with one embodiment of the present disclosure.

FIG. 15 depicts an example of a multi-cell channel having FBIC between the users in each cell, and showing the interference from other (adjacent) cells. FIG. 15 illustrates the uplink and downlink channel in each cell between the users and the access points. FIG. 15 shows the backhaul connection between the access points. In an yet another example (referred to as Lemma 8), the total degrees of freedom is equal to N(M+1)−1 in a M cell full duplex system, as depicted in FIG. 15, in which a maximum of N antennas per node and access point is achievable. This corresponds to the gain of $$1 + \frac{N-1}{M}$$

for using full duplex versus half duplex access points. Furthermore, in some embodiments, no scaling better than 1/(M−1) with respect to the number of cells is achievable; which means that the presented scheme is optimal in terms of scaling. Using the construction presented in Lemma 6 it is possible to have a (K,K) FBIC with N antenna per node that has total of N−1 degrees of freedom in the uplink and K degrees of freedom in the downlink. In some examples, by choosing K=MN, and dividing the receiving nodes into M equal group of size N node each, and assigning each group to a different access point total of MN degrees of freedom in the downlink is available (based on Lemma 4).

On the other hand, any split of the nodes in the uplink would result in total of N−1 degrees of freedom in the uplink simultaneously with MN degrees of freedom in the downlink. Hence, the total degrees of freedom is equal to N(M+1)−1. Splitting the streams in the downlink into M different cells requires implementation of cooperative multi-point transmission (also known as CoMP) in the downlink. Based on reciprocity for any configuration, the role of the transmit and receiving nodes in FBIC can be reversed without affecting the achievable degrees of freedom. Therefore, it is also possible to achieve total of MN degrees of freedom in the uplink and N−1 degrees of freedom in the downlink. In this scenario, the requirement of downlink-CoMP will be replaced with cooperative multi point reception or uplink-CoMP.

Comparing the full duplex access point with a half duplex access point, we can achieve a total of MN+N−1 degrees of freedom with full duplex access point versus the maximum of MN degrees of freedom with half duplex access point. Hence the gain of using full duplex versus half duplex access point $$G\frac{FD}{HD} \text{ is } 1 + \frac{N-1}{NM}$$

which means that by increasing the number of access points $$G\frac{FD}{HD}$$

only scales with $$\frac{1}{M}.$$

Proceeding to characterizing the bound on the achievable scaling of $$G\frac{FD}{HD}$$

by increasing the number of access point M, by using Lemma 7, the achievable scaling of the total degrees of freedom in the uplink and downlink are bounded by $(1+\alpha)N$ and $(1+\beta)N$ where $\beta \leq 1/\alpha$. In order to use the full degrees of freedom in, for example, uplink, we can set $(1+\alpha)N=MN$, and hence the total degrees of freedom in the downlink is limited to $$\left(1 + \frac{1}{m-1}\right)N.$$

Using proper splitting of the transmit and receiving nodes of FBIC into M cells it can be possible to achieve a total of MN+N+N/(M−1) streams. Therefore, the following equation is provided:

$$G\frac{FD}{HD} = \frac{MN + N + \frac{N}{M-1}}{MN} = 1 + \frac{1}{M-1} \qquad \text{Equation (27)}$$

The upper bound on the scaling of $$G\frac{FD}{HD}$$

as a function of M is 1/M.

In another example (referred to as Lemma 9), for any (K,K) FBIC channel with N=K antennas per node (e.g, as in FIG. 8), there may exist an algebraic construction of the transmit and receive vector that achieves degree of freedom 1 per node, e.g., see FIG. 7 in which K=4. For example, the case of (2,2) has been handled in Lemma 3. In this example, the case of K=2k is considered, for k=2, 3, . . . etc. Referring to FIG. 8, the transmit nodes are labeled by T1, T2, . . . , TK and receiving nodes are labeled by R1, R2, . . . , RK.

In this example, the transmit and receiving nodes are divided into groups of two where the $g^{th}$ group, g=1, 2, . . . , k, consists of the transmitting nodes $T_{2g-1}$ and $T_{2g}$ and the receiving nodes $R_{2g-1}$ and $R_{2g}$. The methodology described above in Lemma 3 may be used to transmit in a single dimension from each transmitter and align the received interferences into a single dimension for each pair, leaving the receiving nodes with K−1 degrees of freedom. The total number of transmitters besides the transmitters in a given group is equal to K−2, hence, their received interference at this group cannot span more than K−2 dimensions. Therefore, each receiver will have K−1(K−2)=1 degrees of freedom. Letting K=2k−1, for k=2, 3, . . . the transmit and receiving nodes can be divided into groups of two except for the last group where the $g^{th}$ group, g=1, 2, . . . , k−1, consists of the transmitting nodes $T_{2g-1}$ and $T_{2g}$ and the receiving nodes $R_{2g-1}$ and $R_{2g}$ and the last group consists of a single transmitting node $T_{2k-1}$ and a single receiving node $R_{2k-1}$.

The methodology of Lemma 3 can be used to transmit in a single dimension from each transmitter and align the received interferences into a single dimension for each pair g=1, 2, . . . , k−1, leaving the receiving nodes with K−1 degrees of freedom. The receiving node $R_{2k-1}$ will see interference from the first K−1 transmitters in an at most K−1 dimensional space. Hence, this receiver is left with at least one degrees of freedom and chooses its receive filter, accordingly. In some examples, it can be important to make sure that the transmitter $T_{2k-1}$ does not interfere with the receiver $R_{2k-1}$ in this direction, hence, the transmitter $T_{2k-1}$ can choose its transmit directions in only K−1 dimension beside the dimension that after passing through the channel will cause interference with $R_{2k-1}$ in its only dimension.

The total number of transmitters besides the transmitters in a given group g=1, 2, ..., k−1 and the last transmitter $T_{2k-1}$ is equal to K−3, hence, their received interference at this group g=1, 2, ..., k−1 cannot span more than K−3 dimensions. Hence, each receiver g=1, 2, ..., k−1 is left with K−1(K−3)=2 degrees of freedom. The only interferences that have not been accounted for are from the last transmitter $T_{2k-1}$ to all the receivers of the group g=1, 2, ..., k−1. Using reciprocity, it is easier to exchange the role of the receivers $R_g$, g=1, 2, ..., 2k and the transmitter $T_{2k-1}$ and their effective channels that is obtained after performing the reduction of Lemma 2. It can be easily deducted that each pair $R_{2g}$ and $R_{1g-1}$, g=1, 2, ..., k can align their interferences at $T_{2k-1}$ in the same direction. Hence total of k degrees of freedom will be deducted from the last node $T_{2k-1}$ leaving this node with K−k−1=k≥1 degrees of freedom. A simpler argument may also be made. Let all receiving nodes $R_g$, g=3, 4, ..., K only select one degree of freedom. Then, the node TK will have K−(K−2)=2 degrees of freedom and the only interferences that have not been accounted for are from the pair R1 and R2 to TK where each node has two degrees of freedom. Using the reduction in Lemma 2 it is easily observed that the interferences in the reciprocal channel from the pair R1 and R2 to the node TK can be aligned and this process will take away only one degree of freedom from each involved node leaving these three nodes with one degree of freedom.

The following paragraph provides the details of theorem 1 that has been referenced in the above examples, i.e., Lemmas. In the following theorem, let $N_{t,i}$, i=1: L and $N_{r,i}$,i=1. K denotes the number of antennas at the L transmitting nodes and K receiving nodes, respectively. The total degrees of freedom $\Sigma_{i=1}^{L} d_{t,1}$ in the uplink and $\Sigma_{i=1}^{K} d_{r,i}$ in the downlink is achievable where $d_{t,i}$ and $d_{r,i}$ denote the degrees of freedom of the $i^{th}$ node in the uplink and downlink, respectively, if and only if the following conditions are satisfied:

$$\Sigma_{i:(i,j)\in I} d_{t,i}(N_{t,i}-d_{t,i}) + \Sigma_{j:(i,j)\in I} d_{r,i}(N_{r,i}-d_{r,i}) \geq \Sigma_{i,j:(i,j)\in I} d_{t,i} d_{r,j}$$  Equation (28)

$$I \subseteq \mathcal{M} = \{(i,j), 1 \leq i \leq L, 1 \leq j \leq K\}$$  Equation (29)

$$d_{t,i} \leq N_{t,i}, \text{ and } d_{r,i} \leq N_{r,i}$$  Equation (30)

$$d_{t,i} + d_{r,j} \leq \max N_{t,i} N_{r,j}$$  Equation (31)

Figure 9:
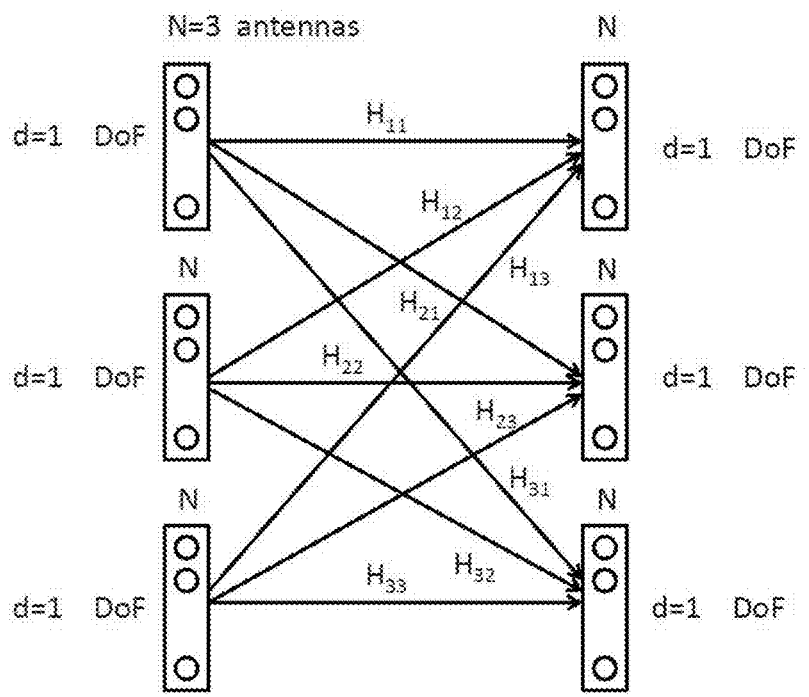
Figure 10:
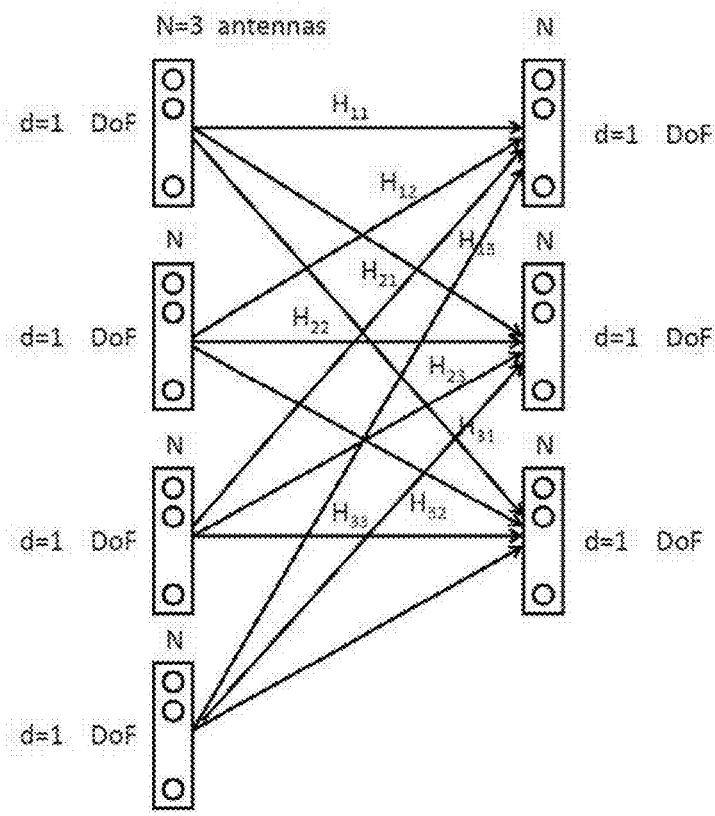
Figure 11:
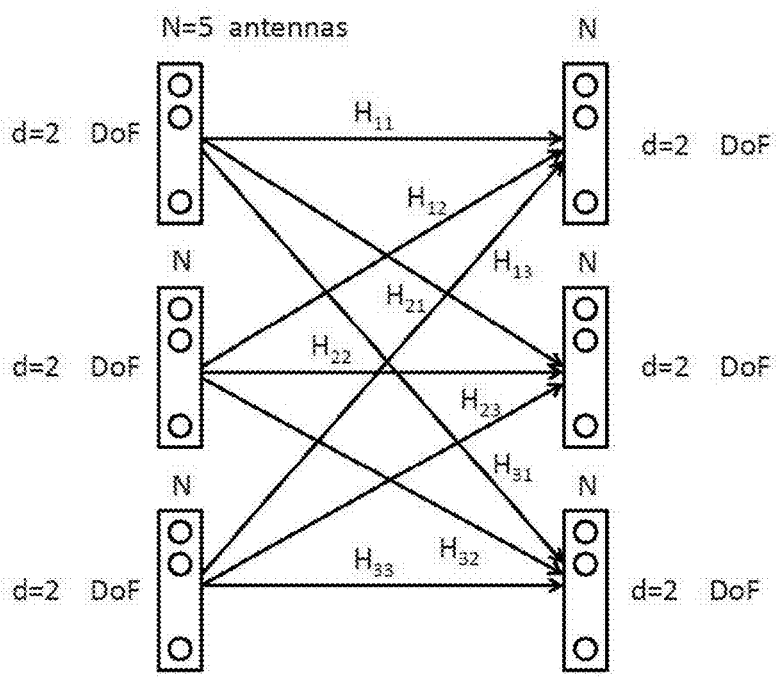
Figure 12:
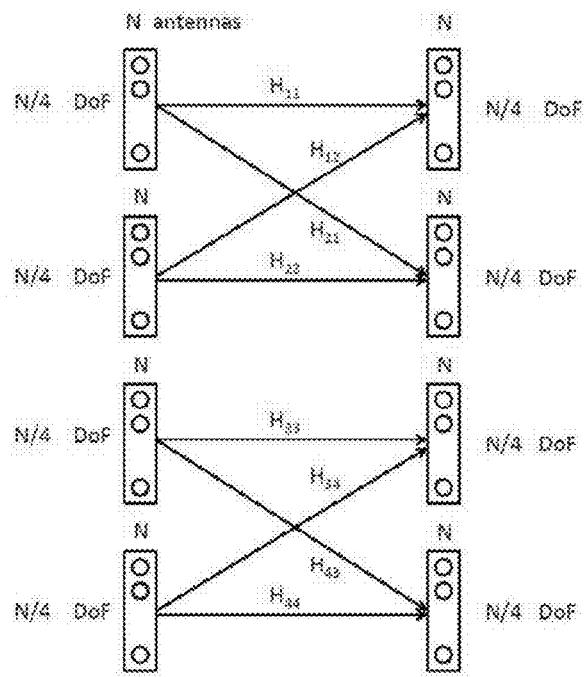

FIG. 9 depicts the degrees of freedom achievable in a symmetric (3,3) FBIC with algebraic construction with N=3 antennas per node. FIG. 10 depicts the degrees of freedom achievable in an asymmetric (4,3) FBIC (or equivalently in (3,4) FBIC) with algebraic construction (N=3 antennas per node). FIG. 11 depicts the degrees of freedom available in a symmetric (3,3) FBIC with N=5 antennas per node. FIG. 12 depicts one embodiment of an FBIC using modular construction. In this example, an intermediate step K pair of nodes in K/2 pairs (e.g., K=4).

The methods, systems and computer program products disclosed herein provide interference alignment in a new channel in the form of full bipartite interference channel (FBIC) where each receiving node sees an interfering signal from all transmitting nodes. The FBIC channel is a part of the single cell channel (SCC) where the SCC is obtained by addition of a single node (access point) to the FBIC and considering the broadcast channel or the downlink channels from the access point to all receiving points in FBIC and the multiple access channel or the uplink channel from all the transmitting points in FBIC to the access point.

In some embodiments, it is considered that uplink CoMP might be harder to realize than the downlink CoMP. Therefore, in some examples, it might be desirable not to two adjacent cells to receive in uplink. For example, consider a network of three cells with half duplex access point having N antenna each. In such situation, either all three cells are in downlink mode simultaneously or at most one access point is in uplink mode while the other access points are in uplink mode. However, if the access points are full duplex capable, it is enough to have one access point to work in FD mode to receive N−1 in the uplink and transmit N streams in the downlink while the other two access point remain in the half duplex mode and each transmit N streams in the downlink. It is noted that it is also possible to change the role of uplink and downlink, i.e., one access point transmit N−1 streams in downlink while receiving N streams in the uplink in full duplex mode while the other two access points work in half-duplex mode and each receive N streams in the uplink. In some examples, a total 4N−1 streams are possible due to methods described in Lemma 8. In other embodiments, by using all three access points in full duplex mode, it is possible to have different number of uplink streams in the former case or downlink streams in the latter case that add up to N−1.

Figure 13:
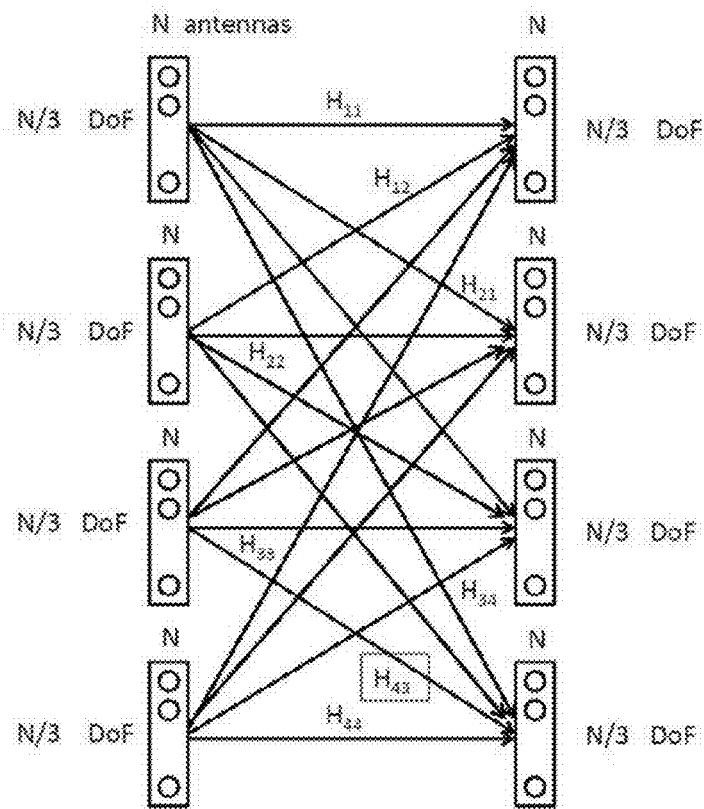

Although Lemma 8 characterizes the achievable degrees of freedom and the scaling of $$G\frac{FD}{HD},$$

the actual number of nodes in each cell to achieve this gain can drastically change by using different configurations. To this end, we note that only four nodes are enough to achieve total degree of freedom 2N in a single cell while the construction of the lemma requires at least N users where N is the number of antenna per node. We also note that the factor of 3N/2 can be achieved in two cells by using the construction of Lemma 8. However, the actual bound for possible degrees of freedom in two cells is given by 2N as predicted by the same lemma, although the actual value of 2N is not achievable for any finite N but the bound is 2N which means that for large enough N we can get as close as we want to 2N degrees of freedom. For example, if only two cell is deployed and four nodes per cell are used where each node has N antenna the total degrees of freedom is equal to 8N/6, as depicted in FIG. 13, which corresponds to the gain of 33% in total aggregate downlink and uplink throughput. FIG. 13 depicts the degrees of freedom available in a symmetric (4,4) FBIC with N antennas per node.

Figure 14:
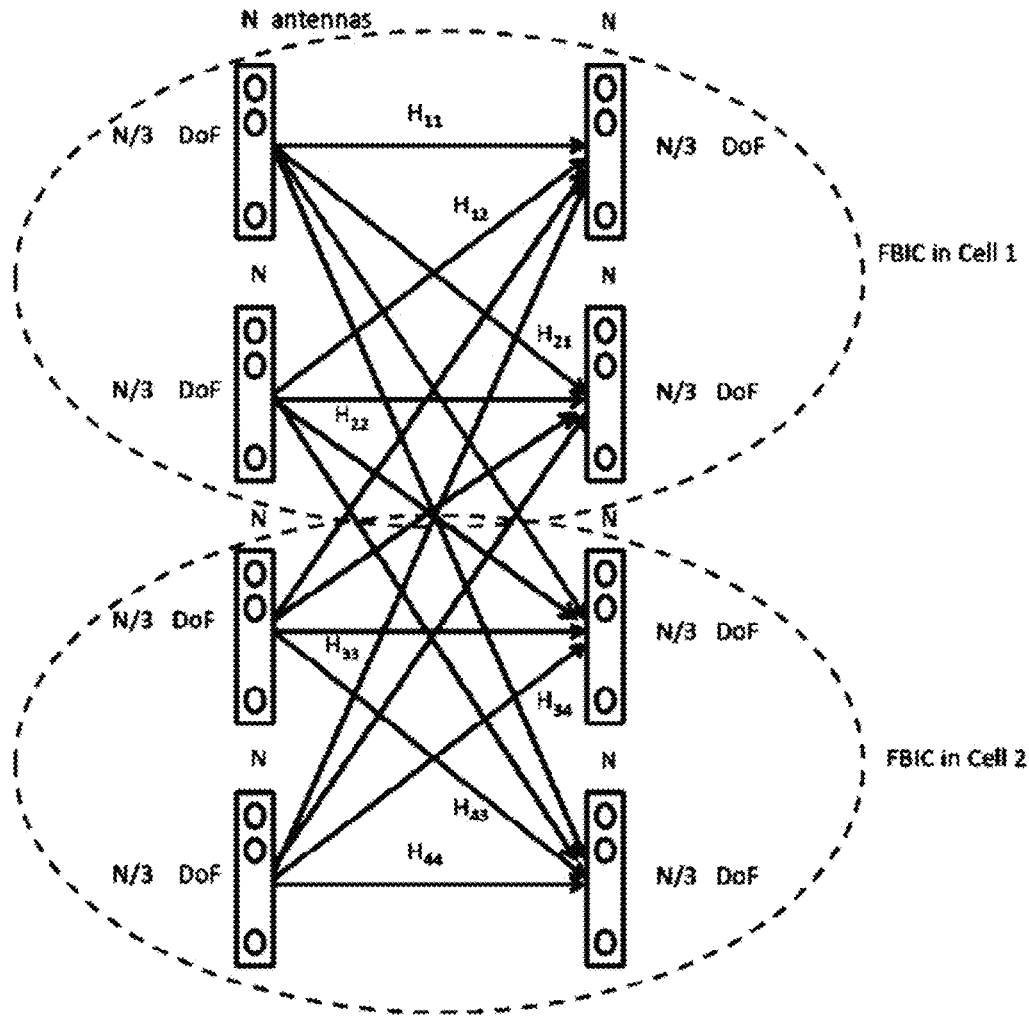
FIG. 14 is a schematic of two cells including full bipartite interference channel (FBIC) interference configurations, in accordance with one embodiment of the present disclosure.

FIG. 14 depicts one embodiment of breaking a single FBIC into several FBIC (not necessarily symmetric with possibly different uplink or downlink nodes). FIG. 14 depicts one embodiment of the symmetric breaking of 8 nodes into two FBIC with 4 nodes each with inter-cell and intra-cell interferences.

One result of the methods, systems and computer products disclosed herein is a very optimistic view for the use of full duplex in cellular systems by analytically proving that the gain of using full duplex access point versus using half duplex access point is (1) full 100% in a single cell (2) considerably maintained over multiple cells having 50%, 33%, and 25% for two, three and four cells by algebraic construction, respectively. The actual bound of the gain of using full duplex versus half duplex access points can be in fact 100%, 50%, and 33% for two, three, and four cells, respectively, and this bound can be achieved through solving optimization problem to find out the precoding matrices. Considering the results on local information exchange and sufficiency of doing interference alignment locally, there are usually between three to four base station in each interfering zone and the throughput increase might remain in upper 30% range.

In another aspect of the present disclosure, a full duplex system without strings is provided to enable full duplex with half duplex clients. Enabling wireless full-duplex (from an AP) with multiple half-duplex (HD) clients is key to widespread adoption of full-duplex (FD) in commercial networks. However, enabling FD in such networks is fundamentally challenged by a new form of uplink-downlink interference (UDI), arising between HD clients operating simultaneously in the uplink and downlink directions of FD. In this context, the present disclosure shows that spatial interference alignment (IA) between clients is an effective and scalable technique to address UDI and hence enable FD in these networks, especially in the presence of MIMO. The present disclosure also provides a solution and system in the form of FDoS: Full-Duplex without Strings that incorporates this notion.

In one embodiment, FDoS shows that four HD clients can be both necessary and sufficient to eliminate UDI through IA and enable 2N streams at an N transceiver AP. FDoS may also include an efficient MAC design at the AP to handle clients with heterogeneous antenna capabilities, maximize the throughput of the enabled streams in the FD session, as well as reduce the overhead incurred in FDoS, e.g., by half, by facilitating a distributed implementation.

Wireless full-duplex (FD) allows a device to transmit and receive at the same time in the same frequency band, thereby potentially doubling the link capacity. However, to allow for widespread adoption of FD, it can be important to enable FD in commercial networks. In such networks, while the AP can be envisioned to be burdened with additional processing for FD, it is hard to embed FD functionality in client devices that are energy constrained to begin with. Hence, in some embodiments, the key to widespread adoption of FD lies in enabling it with half-duplex (HD) clients. Enabling FD with half-duplex clients requires at least two clients—one for transmitting to the AP, while the other for receiving from the AP simultaneously. However, this introduces a new form of interference between the uplink and downlink clients of the FD session, which may be referred to as the uplink-downlink interference (UDI, also called inter-node interference).

Figure 16A:
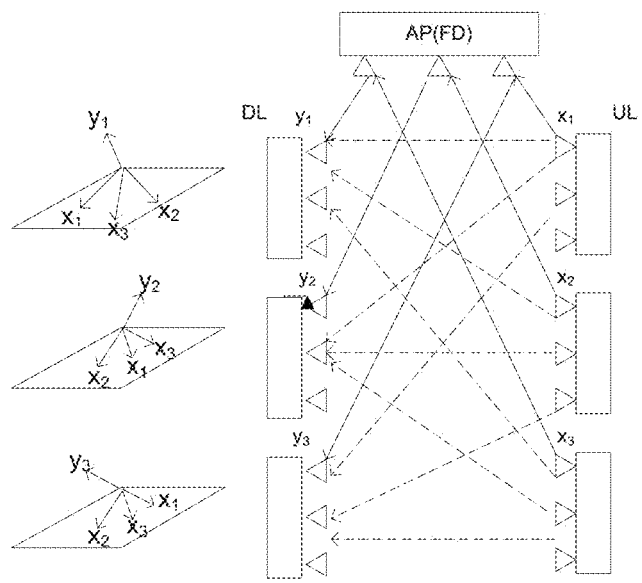
FIG. 16A is a schematic of interference alignment to address uplink-downlink interference (UDI) in a full duplex (FD) wireless network, in accordance with one embodiment of the present disclosure.
Figure 16B:
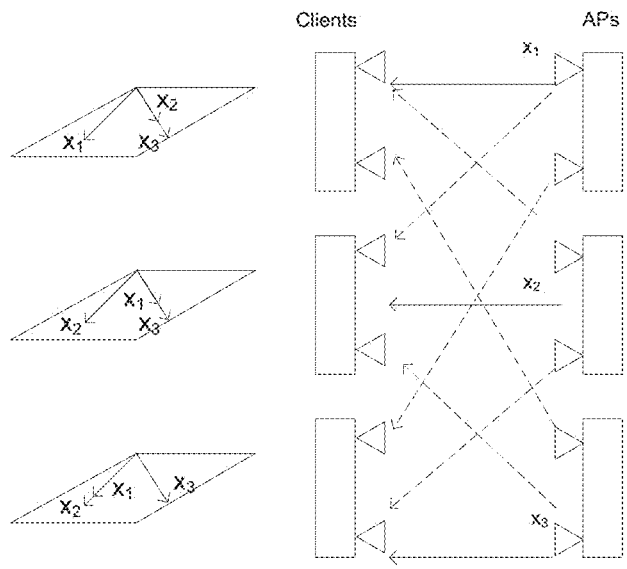
FIG. 16B is a schematic of interface alignment in a half duplex (HD) wireless network, in accordance with the present disclosure.

Towards this challenge of overcoming UDI interference, one of contributions of the methods, systems and computer program products disclosed herein is showing that spatial interference alignment is a practical and effective approach to addressing the UDI problem in full-duplex both efficiently and scalably. In other words, with multiple antennas being available at the HD clients, uplink (UL) clients can align their transmissions (interference) towards the downlink (DL) clients in a FD session to eliminate the UDI, as shown in FIGS. 16A and 16B, which depict spatial interference alignment. FIG. 16A depicts interference alignment to address UDI in full duplex (FD) systems. FIG. 16B is an interference alignment illustration with a half duplex (HD) client.

To put the proposal of the present disclosure into perspective, note that for N transceiver AP and client (half-duplex) devices, while conventional FD systems enable 2N streams only in restricted settings (where UL and DL clients do not interfere or employ side channels) and interference alignment solutions (for HD systems) are limited to N streams, employing spatial interference alignment intelligently with full-duplex will enable 2N streams without any restriction on the client topologies or use of side channels, thereby truly enabling full-duplex in realistic network settings. The FDoS—Full Duplex without Strings system disclosed herein incorporates this notion. Several challenges arise in translating this notion into reality.

Specifically, although carried out in the same bandwidth, spatial interference alignment (IA) requires the estimation of channels between the UL and DL clients. This is an overhead specific to FDoS and scales with the number of DL and UL clients involved in the IA process during the FD session. In some embodiments, one key result here is in showing that irrespective of the number of antennas at the AP and clients (say N), exactly four clients—two in the DL and two in the UL, are necessary and sufficient to enable 2N streams with FD in any topology. This is an interesting result in that the additional overhead from IA is fixed (constant), restricted to four additional channel estimations and does not depend on N.

While the analytical results indicate the existence of a solution, constructing a feasible solution is a hard problem in itself. As will be discussed below, the present disclosure provides a low-complexity construction in FDoS, that proposes the notion of an interference alignment network and leverages its structure to generate a feasible IA solution supporting 2N streams for any given topology. The FDoS disclosed herein can incorporates a media access control (MAC) design at the AP that helps maximize the aggregate throughput from the FD session. The role of the MAC can two-fold: (i) compute the IA solution and MIMO precoders at the clients and AP in an efficient manner to not only handle the UDI problem and enable 2N streams but to also maximize the throughput of those enabled streams, and (ii) handle clients with heterogeneous antenna capabilities ($1 \leq M \leq N$) by determining when FD must be enabled and how FDoS must be adapted.

The methods, systems and computer program products disclosed herein leverage spatial interference alignment (IA) in distributed FD networks towards addressing the UDI problem. Specifically, with multiple antennas being available at clients, half-duplex UL clients will use their spatial dimensions effectively to align their interference (i.e. transmissions to full-duplex AP) towards the half-duplex DL clients in a FD session as shown in FIGS. 16A, 16B. Using the channel state information (CSI) between the UL and DL clients, appropriate precoders at the UL clients and receive filters at DL clients are employed. This eliminates the UDI, and hence enable N streams each on both the DL and UL simultaneously (for N antenna devices), thereby securing the multiplexing gain of two from FD. Such an approach has all the desired attributes of a good solution. (1) Efficient: It operates in the same bandwidth and does not depend on the separation between the UL and DL clients as UDI is addressed explicitly. (2) Scalable: It can secure the desired multiplexing gain from FD even in the presence of MIMO (i.e. multiple antenna devices) and multiple clients being involved in the FD session. (3) Deployable: IA, being a form of precoding, is only as challenging as multi-user MIMO systems and can be realized in practice with the AP serving as the FD session coordinator.

Figure 17A:
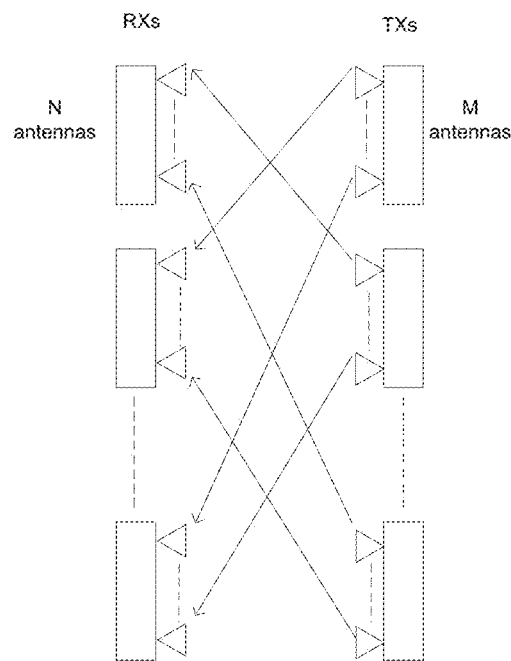
FIGS. 17A-17D are schematics comparing network interference between half duplex (HD) and full duplex (FD) wireless networks, in accordance with the present disclosure.
Figure 17B:
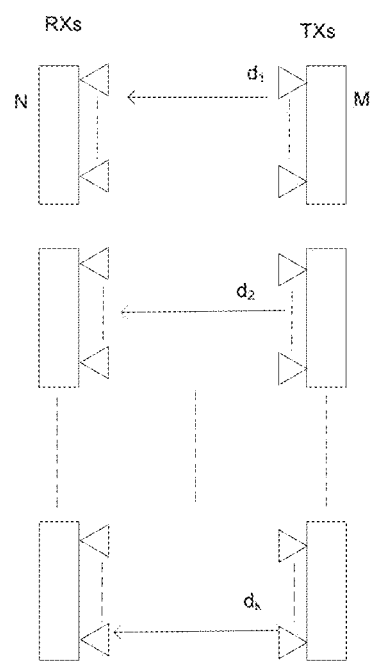
Figure 17C:
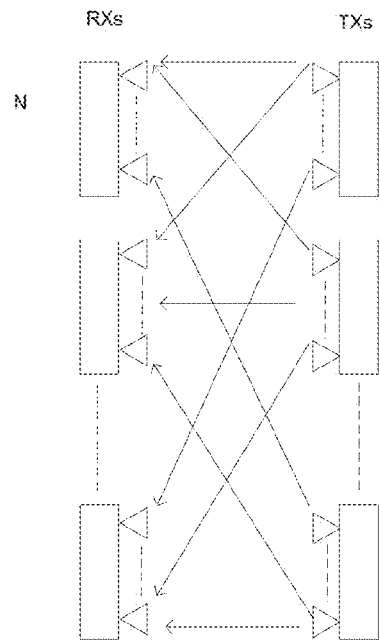
Figure 17D:
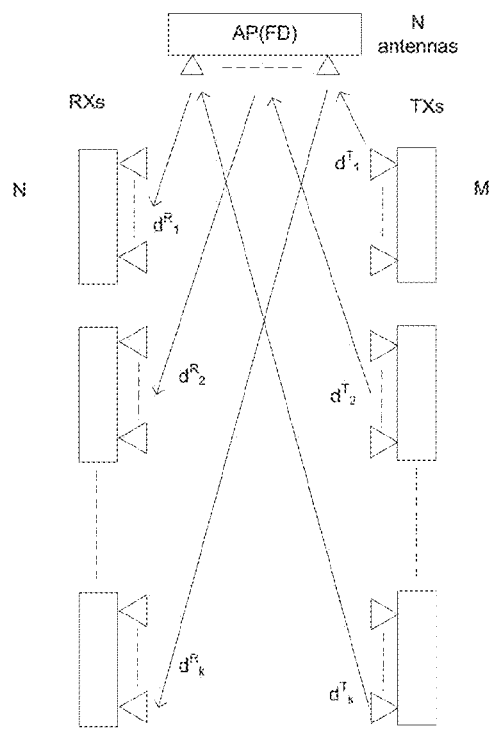

FIGS. 17A to 17D depict a comparison of interference networks in half duplex (HD) and full duplex (FD) systems. FIG. 17A depicts a half duplex (HD) interference channel. FIG. 17B depicts a half duplex (HD) communication network. FIG. 17C depicts a full duplex (FD) interference channel. FIG. 17D depicts a full duplex (FD) communication network. One example of a T conventional HD interference channel is shown in FIG. 17A, where there are K links, each consisting of an M antenna transmitter communicating with an N antenna receiver. In IA theory, the DoF on each of the communication links (di, FIG. 17B) in this interference channel essentially correspond to the rank of the precoding matrices Vi and receive filters Uj such that:

$$U_j H_{ji} V_i = 0, \forall \neq j$$

$$\text{Rank}(U_j H_{ji} V_i) = d_i, \forall = j \qquad \text{Equation (32)}$$

Where $U_j$ and $V_i$ are of size $d_j \times N$ and $M \times d_i$ respectively, while Hji is the channel between receiver j and transmitter I and is of size N×M. While the first constraint ensures that interfering streams are aligned in the null space of the receivers, the second constraint ensures that $d_i$ DoFs are available for the desired streams at receiver of link i. For generic channel matrices H, it has been shown that it is sufficient to satisfy the first set of constraints (i.e IA), which automatically leads to the second set of constraints being satisfied. Based on the above constraints, one can easily obtain the following necessary conditions for a given network to support the desired DoFs (di, $\forall$i).

$$E_{i:(i,j) \in s} d_i(M-d_i) + \Sigma_{j:(i,j) \in s}^{d_j \leq \min\{M,N\}} d_j(N-d_j) \geq \Sigma_{i,j:(i,j)} \\ \in s d_i d_j \qquad \text{Equation (33)}$$

where $s \subseteq \epsilon = \{(i,j); i,j \in [1, K]\}$, the first condition indicates that on a link is limited by the minimum of the number of antennas on either ends of the communication link. The second condition indicates that to have a feasible IA solution, the system defined on any subset ($\epsilon$) of the interference constraints (i.e., s) must not be over-constrained. Note that matrices $V_i$ and $U_j$ are composed of $d_i$ and $d_j$ vectors respectively. Hence, a single interference constraint in Equation (32) between transmitter i and receiver j is comprised of $d_i d_j$ equations, while the transmitter and receiver give rise to $d_i$ (M−$d_i$) and $d_j$ (M−$d_j$) variables respectively. This condition may be referred to as the dimension counting argument.

The following description illustrates the principles of FD distributed interface channel. Referring to FIG. 17A, in the HD interference channel, the DoF (number of data streams) are defined on a per-link basis, with every receiver (receiving desired streams) being subject to interference from the transmitters of all the other links. Such an interference network (graph) captures even FD networks in the peer-peer mode. However, the case of distributed FD networks (in a single cell) is quite different for two reasons. (1) Here, all the desired streams either originate or terminate at a single common node, namely the AP (see FIG. 17D), which does not receive interference from any other node in the network (other than self-interference during FD, for which we assume ideal suppression). This results in an interference network (called full-duplex interference channel, FDIC) that is fully bipartite and decoupled from the desired/communication stream network as shown in FIGS. 17C and 17D. (2) Further, with no desired streams going between the nodes in the interference network (i.e. clients), this allows for the DoF notion to be applied on a per-node basis, with the uplink and downlink clients potentially operating on different DoF. The IA constraints for FDIC are as follows:

$$U_j H_{ji} V_i = 0, \forall_{i,j}$$

$$\text{Rank}(U_j H_{j0} V_0) = d_j^R, \forall_j \in \{\text{DL clients}\}$$

$$\text{Rank}(U_0 H_{0i} V_i) = d_i^T, \forall_j \in \{\text{UL clients}\} \qquad \text{Equation (33)}$$

where index 0 represents the AP. While the first constraint ensures elimination of interference between "all" pairs of UL and DL clients, the last two constraints allow for varied DoF at each node, with $d_j^R$ and $d_i^T$ being the DoF for the downlink client (receiver)/and uplink client (transmitter) i respectively.

Figure 18A:
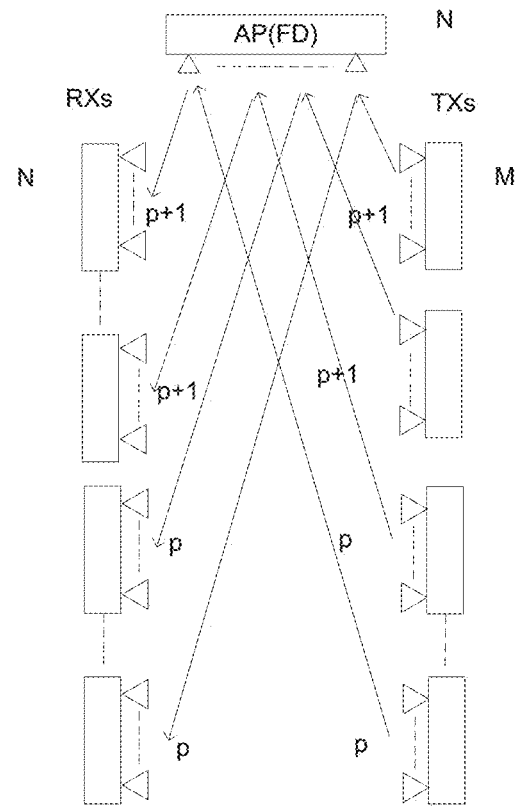
FIGS. 18A and 18B are schematics depicting symmetric full duplex interference channel (FDIC) configurations, in accordance with some embodiments of the present disclosure.
Figure 18B:
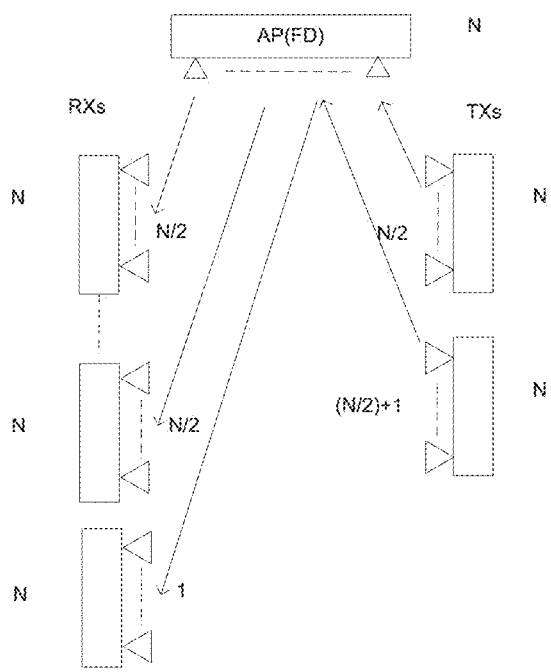

In some embodiments, there can be some necessary conditions for FDIC. With IA in HD and peer-peer FD networks, the goal is to typically determine the maximum DoF that can be achieved over the interference network. In contrast, with the AP controlling (originating/terminating) all the desired streams in distributed FD networks, the maximum number of streams that can be enabled by an N transceiver AP is 2N streams. The number of antennas at each client is the same (N) and the aggregate streams (DoF) are uniformly distributed across the K clients (i.e. p or p+1 DoF at each client, where $$p = \left\lfloor \frac{N}{K} \right\rfloor;$$

i.e., N=pK+q; p, q$\in$Z$^+$; q<K in either direction as shown in FIG. 18A (clients with asymmetric antennas and DoF on DL and UL are considered in Section 5.4 of the appended article "Full-Duplex without Strings: Enabling Full-Duplex with Half Duplex Clients"). In view of the above, it has been determined that for N antenna HD clients, four clients are needed for IA to address UDI and enable 2N streams in symmetric FDIC, if N is even. If N is odd, six clients are needed, which reduces to five (FIG. 17B) in an asymmetric FDIC. This conclusion may be referred to as Lemma 10.

It is noted, that the condition on the minimum number of clients is only a necessary condition, and hence does not guarantee that a feasible IA solution can be found with four clients. The following provides that the structure of the interference in symmetric FDIC can be intelligently leveraged to construct a feasible IA solution that is implementation-friendly and can be realized with a small number of clients. An interference alignment network (IAN) is a subset of the original interference network that captures interference only due to transmit streams that need IA at the receivers. In other words, IAN discounts those interfering streams that can be suppressed by allocating an equivalent number of DoF at the receivers (i.e. interference suppression), thereby not requiring IA for handling those streams.

Figure 19A:
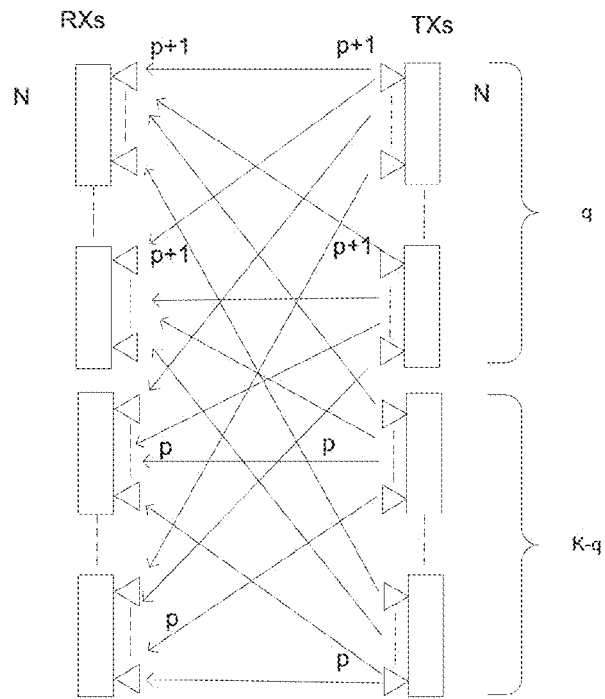
FIGS. 19A-19C are schematics depicting interference alignment networks, in accordance with some embodiments of the present disclosure.
Figure 19B:
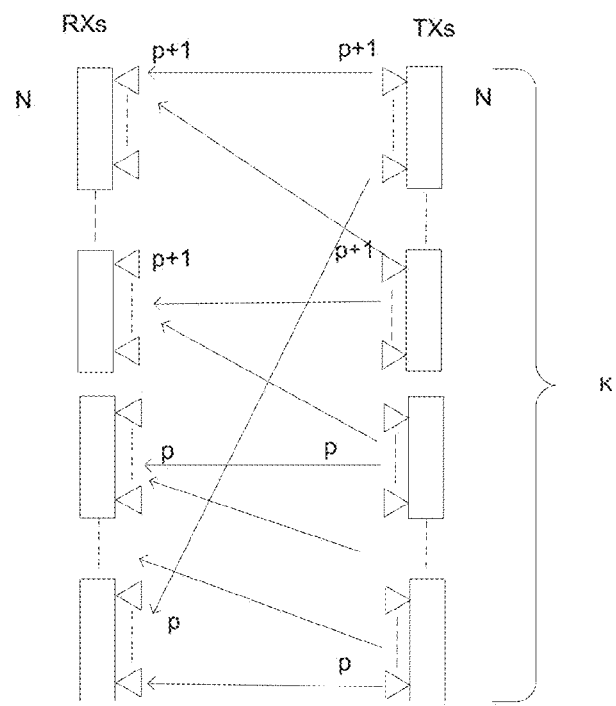
Figure 19C:
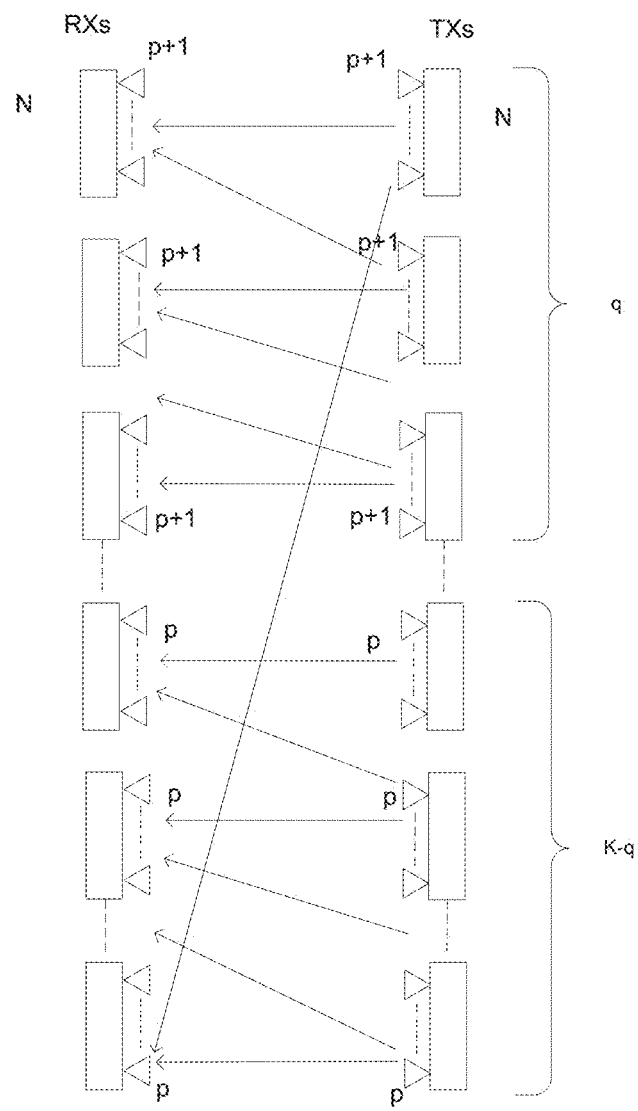

FIGS. 19A-19C depict some embodiments of interference alignment networks. FIG. 19A illustrates one embodiment of a full duplex (FD) interference network. In the example depicted in FIG. 19A (with q=0), there are four clients (K=4) each on the DL and UL in FDIC, each equipped with N=4 antennas (AP has 4 antennas as well) and requires only a single DoF (p=1) to generate a total of 8 DoF through FD. It is noted that all interfering streams do not need to be aligned in this example given the requirement of a single DoF with four available dimensions at each client. Hence, while the interference network is a fully bipartite graph, as shown in FIG. 18A, the resulting IAN is as shown in FIG. 19B (with K=4). Here, the IAN requires only two of the UL clients' streams to be aligned (using one DoF) at a DL client, while the other two UL streams are handled directly through interference suppression (using two DoF), thereby leaving one DoF for receiving the desired DL stream.

In view of the above, for N antenna HD clients, if the necessary conditions are satisfied, there exists a feasible IAN with at most one (un-directed) cycle that can enable 2N streams in symmetric FDIC. The proof is by means of providing a construction for a feasible IA solution.

IAN Construction: For example, to provide an IAN construction, in symmetric FDIC, q clients desire to send or receive p+1 streams, while the remaining K q clients desire p streams. The necessary conditions have been shown to be satisfied for this interference network. The following IAN with a single cycle involving 2K clients as shown in FIG. 19C can now be constructed. There are three types of DL clients: (i) q of them requiring p+1 streams and receiving interference from 2(p+1) streams from two UL clients; (ii)K−q−1 of them requiring p streams and receiving interference from 2p streams from two UL clients; and (iii) one DL client requiring p streams and receiving interference from 2p+1 streams from two UL clients.

Feasibility: Consider a DL client requiring p+1 streams. $d_{IA}$=p+1 dimensions are used to align interference from a net 2(p+1) streams from the two UL clients (edges in IAN). Further, (K−2) edges, i.e. (K−q) edges with p streams each and (q−2) edges with p+1 streams each, are removed at the DL client (compared to interference network). This requires that $d_{IS}$=(K−q)p+(q−2)(p+1) dimensions are set aside at the client to handle these streams through interference suppression. This eventually leaves N−$d_{IA}$−$d_{IS}$=p+1 remaining dimensions, which is sufficient to handle the desired (p+1) streams at the client. Similarly, the desired streams at the other types of DL clients can also be shown to be supported by this IAN. Hence, the IAN is feasible and can support 2N streams through FD.

IA Solution: The construction is as follows. The individual IA conditions for this IAN can be given separately for the cyclic (top 2q nodes) and the non-cyclic (bottom 2(K−q) nodes) part as, $$H_{ii}V_{i}\underline{s}H_{ik}V_{k}, \forall i \in [1,q], k=(i+1)(\mathrm{mod})_q \quad \text{Equation (36)}$$

$$H_{ii}V_{i}\underline{s}H_{ik}V_{k}, \forall i \in [q+1,K], k=(i+1)(\mathrm{mod})K \quad \text{Equation (37)}$$

Substituting back in the cyclic component provides:

$$V_{1}\underline{s}(\Pi_{i=q}^{1} H_{ik}^{-1} H_{ii})V_{1}, k=(i+1)(\mathrm{mod})q \quad \text{Equation (38)}$$

Thus, $V_1$ can be composed of any p+1 Eigen vectors of the matrix $\Pi_{i=q}^{1} H_{ik}^{-1} H_{ii}$ to provide the required N×(p+1) matrix. The rest of the precoding matrixes in the cycle ($V_i$, i∈[2, q]) can be computed sequentially from the first set of constraints in Equation (37).

Since, the second set of constraints couple the rest of the precoding matrices (Vi, i∈[q+1,K]) to $V_1$ through DL client K (i.e. $V_K$), once $V_1$ is computed, they can be determined as well. However, these K−q precoding matrices are N×p in size compared to V1 that is N×(p+1) in size. Therefore, first $V_K$ is obtained as an N×(p+1) precoding matrix from $V_K$=$H_{K1}^{-1}H_{KK}V_{14}$. Since only p streams are transmitted by the UL clientK, p is picked out of the p+1 vectors in $V_K$ to make it N×p in size.

Thereafter, the remaining precoding matrices Vi, i∈[q+1, K−1] of size N×p can be sequentially obtained from $V_K$ from the second set of constraints in Equations (36) and (37).

The corresponding receiver filters ($U_i$) of dimensions N×(p+1) or N×p are obtained orthogonal to the sub-space spanned by $H_{ii}V_i$. When N=$K_p$, i.e. q=0, the IAN consists of a single Hamiltonian cycle, with all clients requiring the same streams as shown in FIG. 19B. This simplifies the solution to only the cyclic part of the generic N=$K_p$+q case, and would require only the first step of the construction, albeit applied over all the clients.

Since symmetric FDIC automatically results in IANs with at most a single cycle, this indicates that a feasible IA solution exists for the networks disclosed herein. Hence, the necessary conditions for IA in symmetric FDIC also serve as sufficient conditions.

FDoS solution: While a feasible IA can be constructed for any symmetric FDIC with 2K clients, to minimize the overhead of CSI from IA, the present solution enables FD with exactly four clients (two DL and two UL clients) with N 2 streams each. This is the smallest number of clients needed to realize 2N streams when N is even (here q=0). The IA construction is as follows.

(i) $V_1$ is composed of $$\frac{N}{2}$$

eigen vectors of the N×N matrix to result in N×N/2 precoding matrix for UL client 1.

(ii) V2 is again a N×N/2 precoding matrix for UL client 2 that is given by $V_2\underline{s}H_{12}^{-1}H_{11}V_1$.

(iii) From $V_1$ and $V_2$, the N/2 dimensional receiver filters for the two DL clients, namely $U_1$ and $U_2$ $$\left(\text{matrices of size} \frac{N}{2} \times N\right)$$

are obtained orthogonal to the sub-space spanned by $H_{11}V_1$ and $H_{22}V_2$ respectively.

Figure 20A:
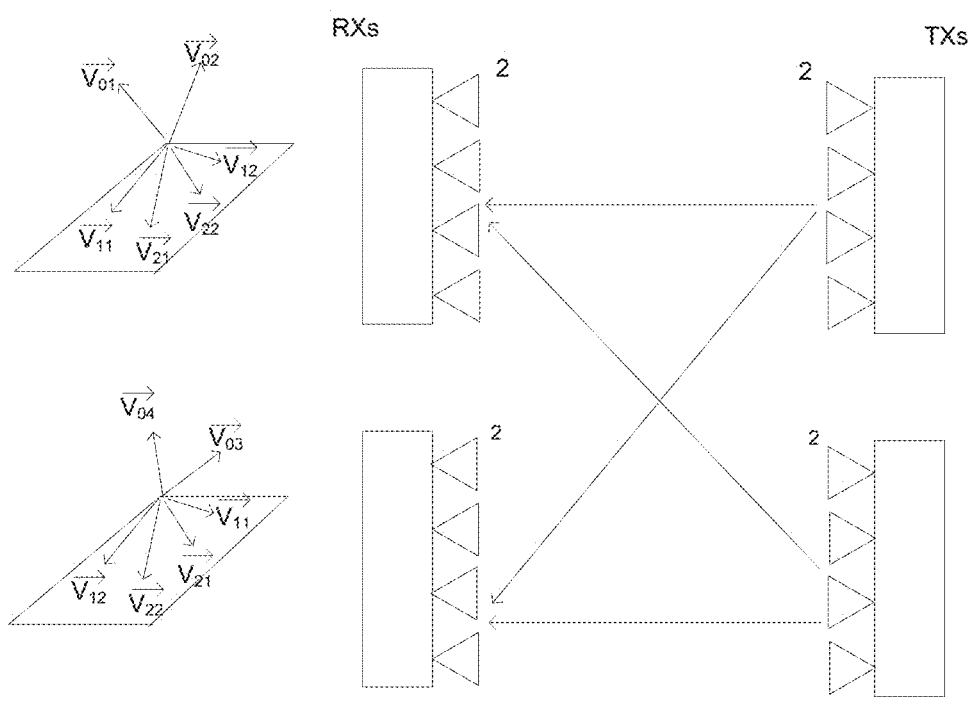
FIGS. 20A-20B are schematics depicting examples of interface alignment construction.
Figure 20B:
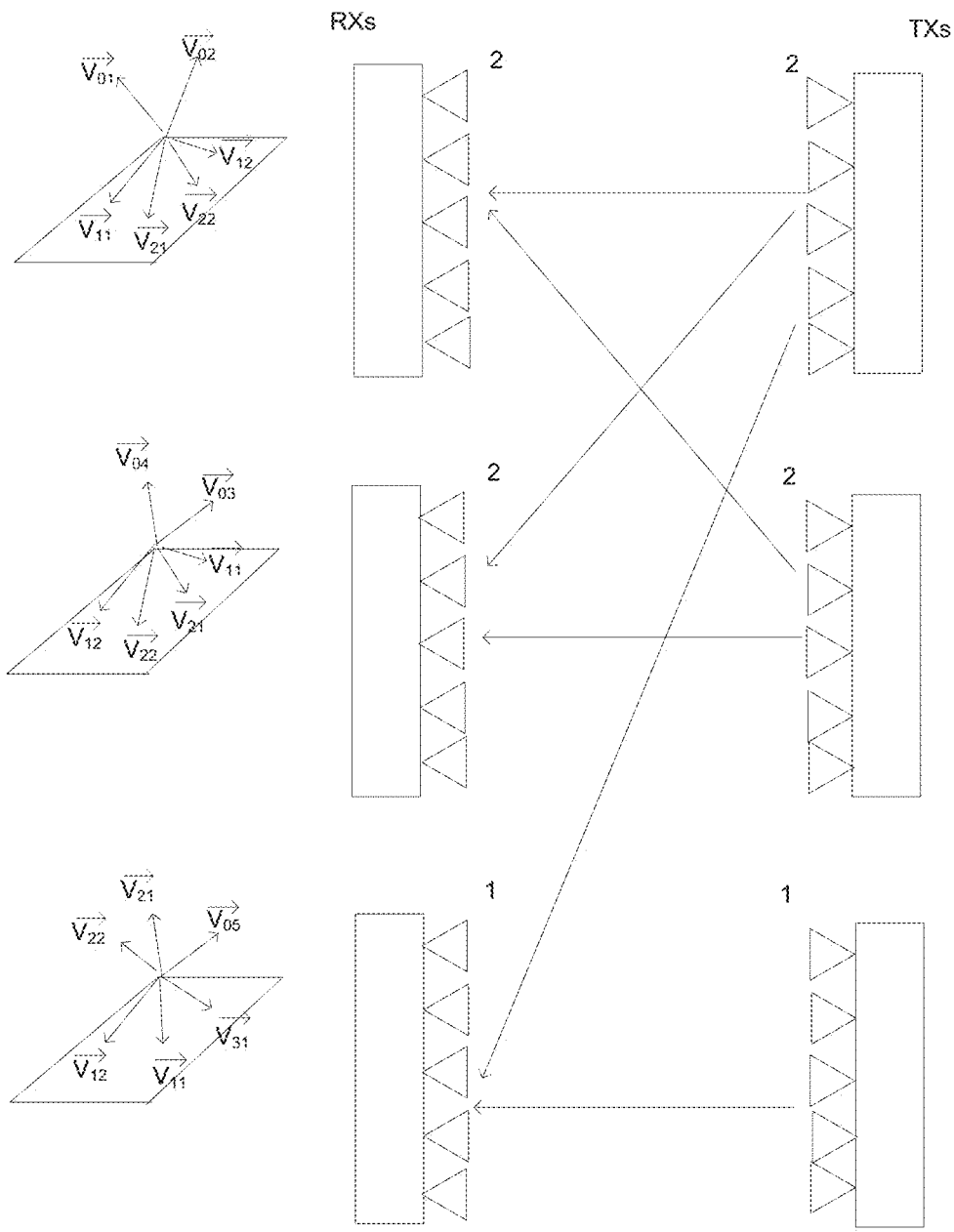

Similarly, when N is odd, our construction would require six clients (K=3) and would follow the appropriate procedure described above with respect to sections titled IAN constructions, feasibility, and IA solution, depending on whether N is a multiple of 3 or not. FIGS. 20A and 20B illustrates the IAN and IA construction pictorially for N=4 and N=5 respectively, wherein N is the number of antenna. In FIG. 20A there are 8 signal streams and in FIG. 20B there are 10 signal streams.

Figure 21:
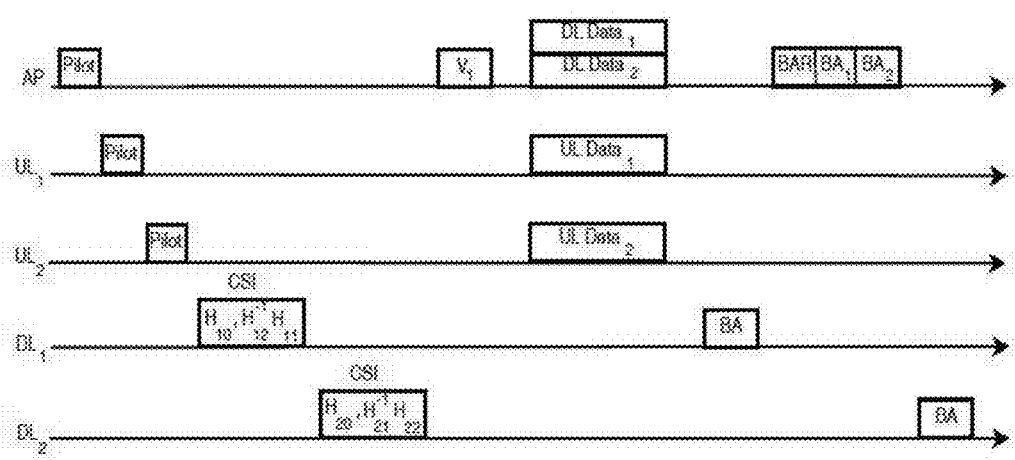
FIG. 21 is a timeline of a full duplex without strings (FDoS) system operation, in accordance with one embodiment of the present disclosure.

We now outline one embodiment of the complete sequence of steps in executing an FD session in FDoS with reference to FIG. 21. (1) Decide FD vs. HD: Based on desired scheduling/QoS policies (proportional fairness in our case), the four clients for a FD session in FDoS are chosen by the AP. Based on the number of antennas available at the clients, the total number of streams possible through FD can be determined using the instructions provided in Section 5.4 of the appended article "Full-Duplex without Strings: Enabling Full-Duplex with Half Duplex Clients", and compared against N streams possible with HD. FD is enabled only if it can enable a larger number of streams (than in HD).

(2) Channel Estimation and Feedback: Once FD is chosen, the clients in the session are notified. The channels between AP and the four clients as well as between the clients themselves are estimated, followed by the intelligent (reduced) feedback procedure as outlined in Section 5.3 of the appended article "Full-Duplex without Strings: Enabling Full-Duplex with Half Duplex Clients".

(3) Distributed Computation of Solution: In addition to determining its own precoder and receive filter, the AP disseminates the precoder for one of the UL clients. Using this, the rest of the precoder and receiver filters are computed locally at each of the clients, in accordance with Sections 5.2 and 5.3 of the appended article "Full-Duplex without Strings: Enabling Full-Duplex with Half Duplex Clients".

(4) Executing FD Session: The FD session is then enabled by the AP between the four clients in the symmetric (2M or 2N streams) or asymmetric (M+N streams) mode as appropriate. The AP serves as the point coordinator (e.g., cellular BS, PCF mode in 802.11) for the FD session.

(5) ACK Delivery: The delivery of ACKs follows a procedure similar to downlink MU-MIMO operation 802.11ac, wherein the AP solicits block ACKs (BA) from each of the MU-MIMO clients (except the first client) sequentially. In one example, in addition to a block ACK request (BAR) for the second DL client, the AP also needs to send back two ACKs to the two UL clients. This can be achieved by piggybacking the two ACKs for the UL clients onto the ACK-request for the second DL client as shown in FIG. 21, thereby not having to incur additional transmissions.

Figure 22:
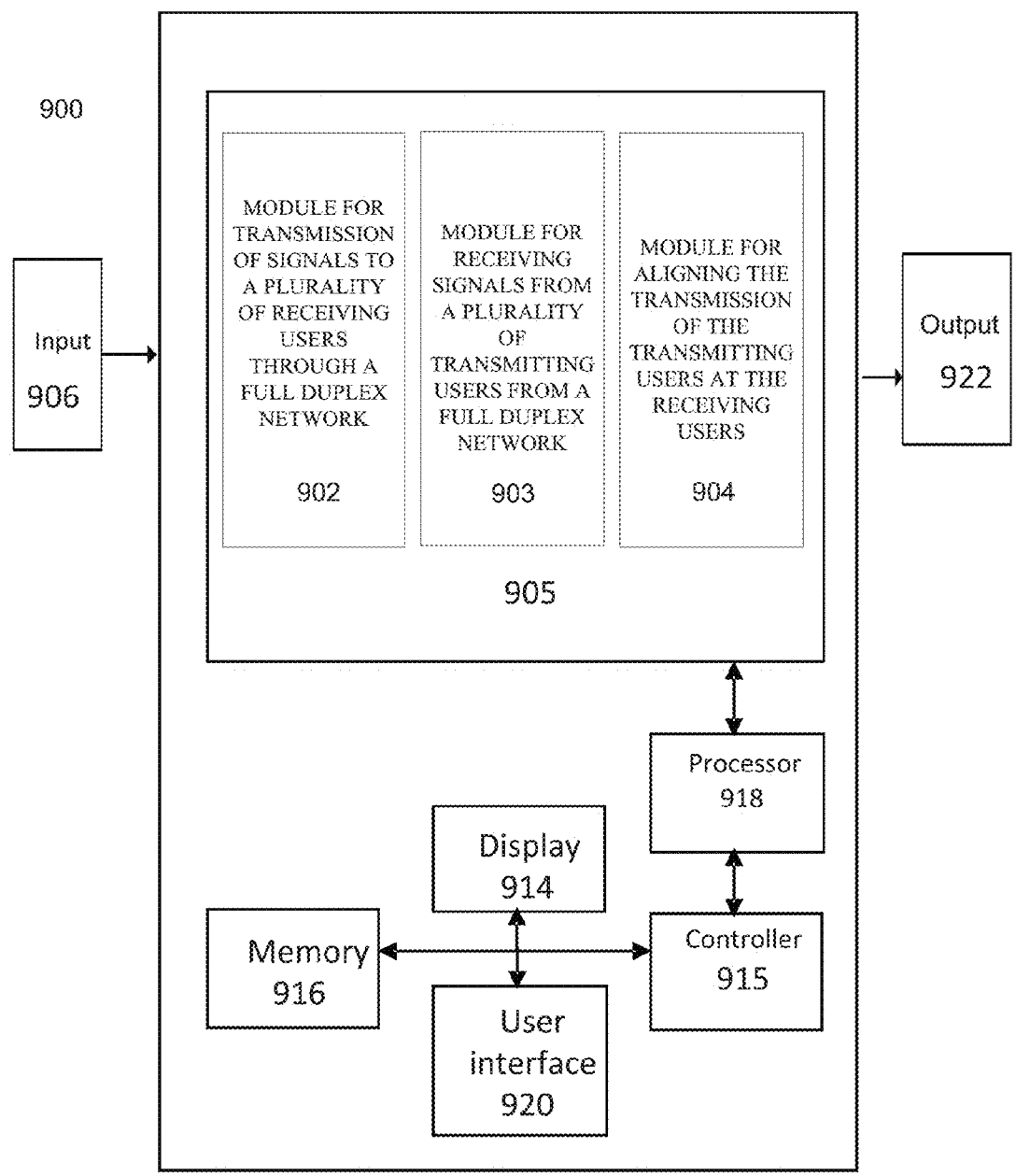
FIG. 22 is a block diagram of a system for providing full-duplex communication in a wireless network, in accordance with the present disclosure.

In another aspect of the present disclosure, a system for providing full-duplex communication in a wireless network is provided, as depicted in the block diagram this is provided by FIG. 22. The system for providing full-duplex communication in a wireless network includes a module for transmission of signals to a plurality of receiving users through a full duplex network 902, a module for receiving signals from a plurality of transmitting users from a full duplex network 903, and a module for aligning the transmission of the transmitting users at the receiving users.

In one embodiment, the system 900 preferably includes one or more processors 918, e.g., hardware processor, and memory 916 for storing applications, modules and other data. In one example, the one or more processors 918 and memory 916 may be components of a computer, in which the memory may be random access memory (RAM), a program memory (preferably a writable read-only memory (ROM) such as a flash ROM) or a combination thereof. The computer may also include an input/output (I/O) controller coupled by a CPU bus. The computer may optionally include a hard drive controller, which is coupled to a hard disk and CPU bus. Hard disk may be used for storing application programs, such as some embodiments of the present disclosure, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link.

The system 900 may include one or more displays 914 for viewing. The displays 914 may permit a user to interact with the system 900 and its components and functions. This may be further facilitated by a user interface 920, which may include a mouse, joystick, or any other peripheral or control to permit user interaction with the system 900 and/or its devices, and may be further facilitated by a controller 915. It should be understood that the components and functions of the system 900 may be integrated into one or more systems or workstations. The display 914, a keyboard and a pointing device (mouse) may also be connected to I/O bus of the computer. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

The system 900 may receive input data 906 which may be employed as input to a plurality of modules 905 that provide the module for the long term battery management layer 902 for estimating and managing a life cycle for the battery, and the module for the real time power management layer 904 for managing power sharing between the at least one battery storage element and the at least one capacitor storage element. The system 900 may produce output data 922, which in one embodiment may be displayed on one or more display devices 514. It should be noted that while the above configuration is illustratively depicted, it is contemplated that other sorts of configurations may also be employed according to the present principles.

Further details regarding the functionality of the modules 902, 903, 904 for the simultaneous full duplex transmission and reception of signals by a plurality of receiving and transmitting users across a wireless network, as well as the alignment, e.g., interference alignment, of the transmission signal at the receiving users, has been provided above with reference to FIGS. 1-20. In some embodiments, the system further includes at least one cell channel comprising an access point node, and a full bipartite interference channel (FBIC) configuration of a plurality of receiving nodes and a plurality of transmitting nodes. In some embodiments, each receiving node receives an interfering signal from all transmitting nodes, and the access point node of the cell channel provides a single node having downlink channels to all receiving nodes in the FBIC, wherein all of the uplink channels from the FBIC are to the single access point node to the single cell channel. Removing the interfering signal transmitted through the full bipartite interference channel (FBIC) configuration removes interference via interference alignment.

Embodiment 2

The main challenge in deployment of full duplex systems in a network is the scaling of the promised doubling of the spectral efficiency by the full duplex operation when multi-user communication and multiple antenna systems are considered. This invention addresses a practical way of solving this challenge in a wireless system consisting of a single cell or multiple cells with a full duplex access points. The users in the cell might or might not be full duplex capable.

Some prior art have identified this problem without properly addressing it. In some prior art it is proposed to use imbalance mode of operation when the number of uplink users are usually much lower than the number of downlink users. Some work has looked into the possibility of selecting users that generate the list interference on other users for example through geo tagging or feedback of the channel states between the users. Some other work have considered the possibility of using a genie channel or in practical sense having another frequency band or channel that is not used in the actual communication to provide feedforward or feedback between nodes for the purpose of interference cancellation.

We propose interference alignment where all the uplink nodes try to align their interferences only on a subset of resolvable degrees of freedom of each downlink user. This technique has been considered in other context, e.g., in interference channel, relay channel, or X-channel while the channel of the single cell is different and requires a different treatment and eventually has different type of solution.

At the current moment and with the present knowledge in the state of the art, the full duplex systems would not work in a network or it has very limited use unless the proposed technique is deployed. Nonetheless, there might be future progress and work that can address this problem in a different way or by enhancing our proposed scheme.

A key feature is the interference alignment:
Using interference alignment in full duplex single cell systems.
Using interference alignment in multi-cell full duplex systems.
Using only four nodes per cell.
Two nodes may be in the uplink and two nodes may be in the downlink.

The new and different solution is required for interference alignment in the single cell channel (SCC) which is composed of a full bipartite interference channel (FBIC) between the users in the cell and a broadcast channel from the access point to the downlink users and a multiple access channel from the uplink users to the access point.

Embodiment 3

Enabling wireless full-duplex (from an AP) with multiple half-duplex (HD) clients is key to widespread adoption of full-duplex (FD) in commercial networks. However, enabling FD in such networks is fundamentally challenged by a new form of uplink-downlink interference (UDI), arising between HD clients operating simultaneously in the uplink and downlink directions of FD. In this context, we first show that spatial interference alignment (IA) between clients is an effective and scalable technique to address UDI and hence enable FD in these networks, especially in the presence of MIMO. We then present our solution and system FDoS: Full-Duplex without Strings that incorporates this notion. We build the theory of applying spatial IA to full-duplex networks in general and present elegant, implementation-friendly constructions for generating feasible IA solutions that leverage the structure of interference specific to these networks. In the process, FDoS shows that four HD clients are both necessary and sufficient to eliminate UDI through IA and enable 2N streams at an N transceiver AP. FDoS also includes an efficient MAC design at the AP to handle clients with heterogeneous antenna capabilities, maximize the throughput of the enabled streams in the FD session as well as reduce the overhead incurred in FDoS by half by facilitating a distributed implementation. A prototype of FDoS on WARP radios showcases its ability to address UDI and hence enable 2N streams in varied settings with just four HD clients.

1. Introduction

Wireless full-duplex (FD) allows a device to transmit and receive at the same time in the same frequency band, thereby potentially doubling the link capacity. Although promising, one of the key challenges in realizing full-duplex is the Self-Interference (SI) generated by the Tx antenna at the Rx antenna on the device, which can be several orders of magnitude stronger than the received signal from a desired node. Several research works have looked at addressing this SI problem in the analog domain through antenna [7, 10, 1] and RF cancellation [16, 12, 8, 4] techniques, as well as through digital cancellation [12, 8] schemes.

With the focus being on addressing the SI problem, current works have looked at FD from a peer-peer standpoint, with both nodes of the link being FD enabled. However, to allow for widespread adoption of FD, it is important to enable FD in commercial networks. In such networks, while the AP can be envisioned to be burdened with additional processing for FD, it is hard to embed FD functionality in client devices that are energy constrained to begin with. Hence, the key to widespread adoption of FD lies in enabling it with half-duplex (HD) clients.

Enabling FD with half-duplex clients requires at least two clients—one for transmitting to the AP, while the other for receiving from the AP simultaneously. However, this introduces a new form of interference between the uplink and downlink clients of the FD session as shown in FIG. 23(a). We refer to this interference that is specific to FD communication as the uplink-downlink interference (UDI, also called inter-node interference [3, 17]). There are two simple, but practical approaches to addressing UDI with HD clients. (1) Leverage Client Separation: Separating the UL and DL clients of the FD session as far away as possible is one option to alleviate UDI. However, [1] showed that this significantly reduces the opportunities for FD in a cell and reduces the gains from FD to as low as 20-30% even in the presence of ideal SI cancellation. (2) Use of Side-channel: With most client devices being equipped with both 3G/4G and WiFi interfaces, it is possible to send a coded version of the interfering packet from the UL client to the DL client through a side (orthogonal) channel (e.g. WiFi interface), while the primary channel (e.g. 3G/4G) is being used for FD communication (e.g. [3]). This would allow the DL client to partially or completely remove the UDI on its primary channel as shown in FIG. 23(b). However, such a solution comes at the expense of additional bandwidth, which when accounted for, diminishes the gains from FD. Further, both these approaches do not scale to multi-stream FD (i.e. FD with MIMO). Hence, the focus of this work is to address the UDI problem arising in full-duplex with half-duplex clients efficiently using the same bandwidth and allowing it to scale to multi-stream FD (i.e. FD with MIMO) transmissions.

Towards this challenge, one of our main contributions in this work is in showing that spatial interference alignment is a practical and effective approach to addressing the UDI problem in full-duplex both efficiently and scalably. In other words, with multiple antennas being available at the HD clients, UL clients can align their transmissions (interference) towards the DL clients in a FD session to eliminate the UDI as shown in FIG. 24(a). To put our proposal in perspective, note that for N transceiver AP and client (half-duplex) devices, while conventional FD systems enable 2N streams only in restricted settings (where UL and DL clients do not interfere or employ side channels) and interference alignment solutions (for HD systems) are limited to N streams, employing spatial interference alignment intelligently with full-duplex will enable 2N streams without any restriction on the client topologies or use of side channels, thereby truly enabling full-duplex in realistic network settings.

We present our solution and system, FDoS—Full Duplex without Strings, which incorporates this notion. Several challenges arise in translating this notion into reality.

(1) Specifically, although carried out in the same bandwidth, spatial interference alignment (IA) requires the estimation of channels between the UL and DL clients. This is an overhead specific to FDoS and scales with the number of DL and UL clients involved in the IA process during the FD session. Our key result here is in showing that irrespective of the number of antennas at the AP and clients (say N), exactly four clients—two in the DL and two in the UL, are necessary and sufficient to enable 2N streams with FD in any topology. This is an interesting result in that the additional overhead from IA is fixed (constant), restricted to four additional channel estimations and does not depend on N. This is in contrast to the results for HD systems [5, 11], where 2(N−1) streams are possible with IA alone, but the overhead scales with N2 (N if clients can receive from multiple transmitters [11]).

(2) While the analytical result only indicates the existence of a solution, constructing a feasible solution is a hard problem in itself. Here, we present a low-complexity construction in FDoS, that proposes the notion of an interference alignment network and leverages its structure to generate a feasible IA solution supporting 2N streams for any given topology. (3) In translating our solution from data streams to actual throughput, FDoS incorporates a MAC design at the AP that helps maximize the aggregate throughput from the FD session. The role of the MAC is two-fold: (i) compute the IA solution and MIMO precoders at the clients and AP in an efficient manner to not only handle the UDI problem and enable 2N streams but to also maximize the throughput of those enabled streams, and (ii) handle clients with heterogeneous antenna capabilities ($1 \leq M \leq N$) by determining when FD must be enabled and how FDoS must be adapted. (4) Finally, our solution lends itself naturally to a distributed implementation across clients. This is leveraged by FDoS through intelligent feedback mechanisms to further reduce the overhead incurred in executing our solution by half We prototype FDoS using the WARP software-defined radio platform. While the AP is enabled with full-duplex, the clients are restricted to be half-duplex.

Our contributions in this work are multi-fold:

We show that spatial interference alignment is an effective approach to address the UDI problem in FD communication and build the theory and design behind its application.

We propose our solution and system FDoS, which shows that four clients are both necessary and sufficient to enable 2N streams in FD with the help of IA and present an elegant construction to realize such a solution in reality.

We design an efficient MAC to handle clients with heterogeneous antenna capabilities, maximize the throughput of the enabled streams in the FD session and reduce the additional (albeit constant) overhead incurred in FDoS by half through a distributed implementation.

We build a prototype of FDoS with WARP radios and showcase its ability to enable 2N streams in most topologies in practice with just four clients.

2. Background 2.1 Full-Duplex

Full-duplex networks can be of two types: peer-peer and distributed. In peer-peer, both the nodes of a FD link are FD enabled and is characteristic of relay and backhaul networks. On the other hand, in distributed FD networks, only the AP is FD enabled, while the clients devices are half-duplex. This is characteristic of practical wireless networks (e.g. WLANs), where one can expect to burden the AP with additional (FD) processing, while the clients are legacy half-duplex devices that are energy constrained. The focus of this work is on distributed FD networks, which unlike its peer-peer counterpart, require at least two clients to enable a FD session—one that transmits to the AP, while the other simultaneously receives from the AP as shown in FIG. 23(a). Such a configuration results in a new form of interference created by the uplink client on the downlink client during the FD session. We refer to this interference that is unique to distributed FD networks, as the uplink-downlink interference (UDI), which forms a critical challenge towards realizing FD in practical networks.

2.2 Interference Alignment

IA allows more interfering streams to be accommodated in lesser resource dimensions, thereby leaving room to accommodate more desired streams. While the resource dimensions can correspond to those in time, frequency (called frequency or symbol extension) or space (antennas), our focus in this work is on spatial IA. The latter allows for a practical realization in MIMO systems, unlike the former approaches that by relying on certain non-practical channel assumptions (e.g. non-causal CSI), serve mainly as theoretical constructs. The example in FIG. 24(b) illustrates spatial IA. Three APs with two antennas each, desire to send a single data stream to its respective client, each with two antennas. Being limited to two antennas (two spatial dimensions) at the clients and assuming no transmitter cooperation, only two of the streams can be delivered in this network without IA. However, with IA all three streams can be delivered. The two interfering streams at each of the clients can be aligned to consume a single spatial dimension (degree of freedom, DoF), thereby allowing the other dimension for its desired stream. The alignment in turn is realized through a process known as precoding, whereby the data stream (d) at the transmitter is multiplied by a precoding vector (v) before being transmitted through the antennas onto the channel such that $$H_{ji}\vec{v}_i \stackrel{s}{=} H_{jk}\vec{v}_k, \tag{a1}$$

$$\forall j, \text{s.t.}$$

$$j \neq i \neq k$$

where $H_{ji}$ is the channel matrix between transmitter i and receiver j, and $$\stackrel{s}{=}$$

indicates that the span of the vector spaces defined by matrices on either sides of the operator are the same. The precoders at the different transmitters are chosen based on the above constraints to realize the desired alignment, while the receive filters at the receivers are chosen orthogonal to the space of the interference to receive the desired streams.

2.3 Related Work

Interference Alignment (IA):

The notion of interference alignment was introduced in [6]. In general, characterizing the maximum number of streams that can be supported and realized through IA in interference channels has been an elusive problem and has been considered under various network settings in the communications literature (see [13, 2] and references therein). Recently, [5] showed that in an interference channel with K links, with each node of the link having N antennas each, one can potentially achieve 2N streams asymptotically (as K→∞) with IA alone. In the networking space, IA has been leveraged along with transmitter cooperation (packet sharing) to generate 2N streams on the uplink and 2N−2 streams on the downlink. A distributed version of the scheme was later proposed in [14].

Further, [15] considered the realization of blink IA in practice. Note that the above results are for half-duplex systems. As we will show later, interestingly, the interference channel generated by the distributed FD network is different from that in the HD network and hence warrants a fresh understanding of the applicability of IA in FD.

Full Duplex (FD):

The bulk of the system works on FD have focused on addressing self-interference through antenna [7, 10, 1], RF [16, 9, 12, 8, 4] and digital [9, 12, 8, 4] cancellation. Recently, [20] tried to effectively leverage exposed terminals along with FD transmissions in a network. The focus of these works has been on the peer-peer FD model. The importance of distributed FD with HD clients and hence the need to address UDI was only recently considered in [3]. The focus of [3] has been to information-theoretically characterize the benefits of having a side-channel to distributed FD in a three-node, two stream FD network. The cost of the side-channel as well as scalability to multiple streams in FD (i.e. MIMO in either direction of FD) was not considered.

FD+IA:

Very recently, [17] proposed the use of IA in the time domain (through symbol extension) for addressing UDI in FD networks, albeit with FD capability at both the AP and (single-antenna) clients. The focus of [17] is characterizing DoF from an information-theoretic perspective. Being based on time alignment, it requires either non-causal CSI or interference to deterministically repeat itself (in future) to eliminate UDI and is not conducive for a practical realization.

Our focus in this work is to propose and leverage spatial IA as a practical, bandwidth-efficient and scalable approach to address the UDI problem and hence enable full-duplex in distributed FD networks with HD clients. More importantly, we intend to develop the theory and design behind applying IA in these networks, while also addressing the challenges that arise in realizing a practical system.

3. Case for IA in FD

3.1 Significance of UDI

Figure 23:
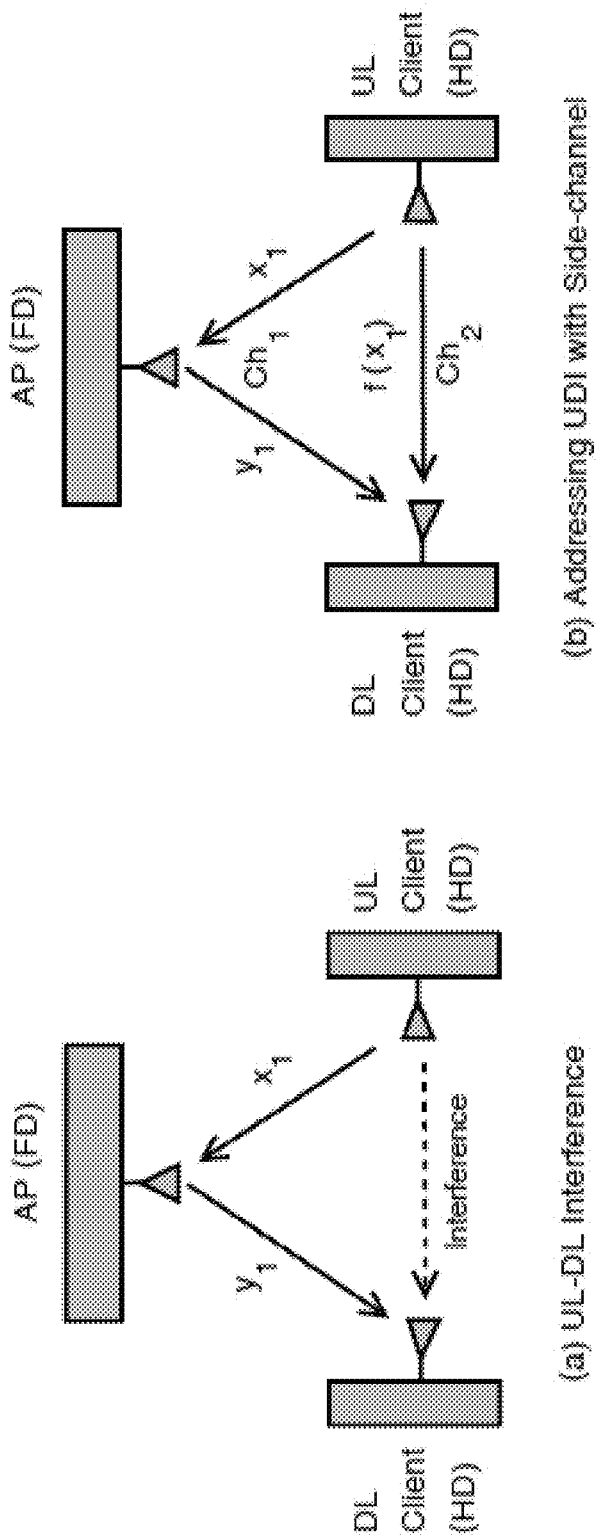
FIG. 23 depicts uplink-downlink Interference in FD Networks.
Figure 24:
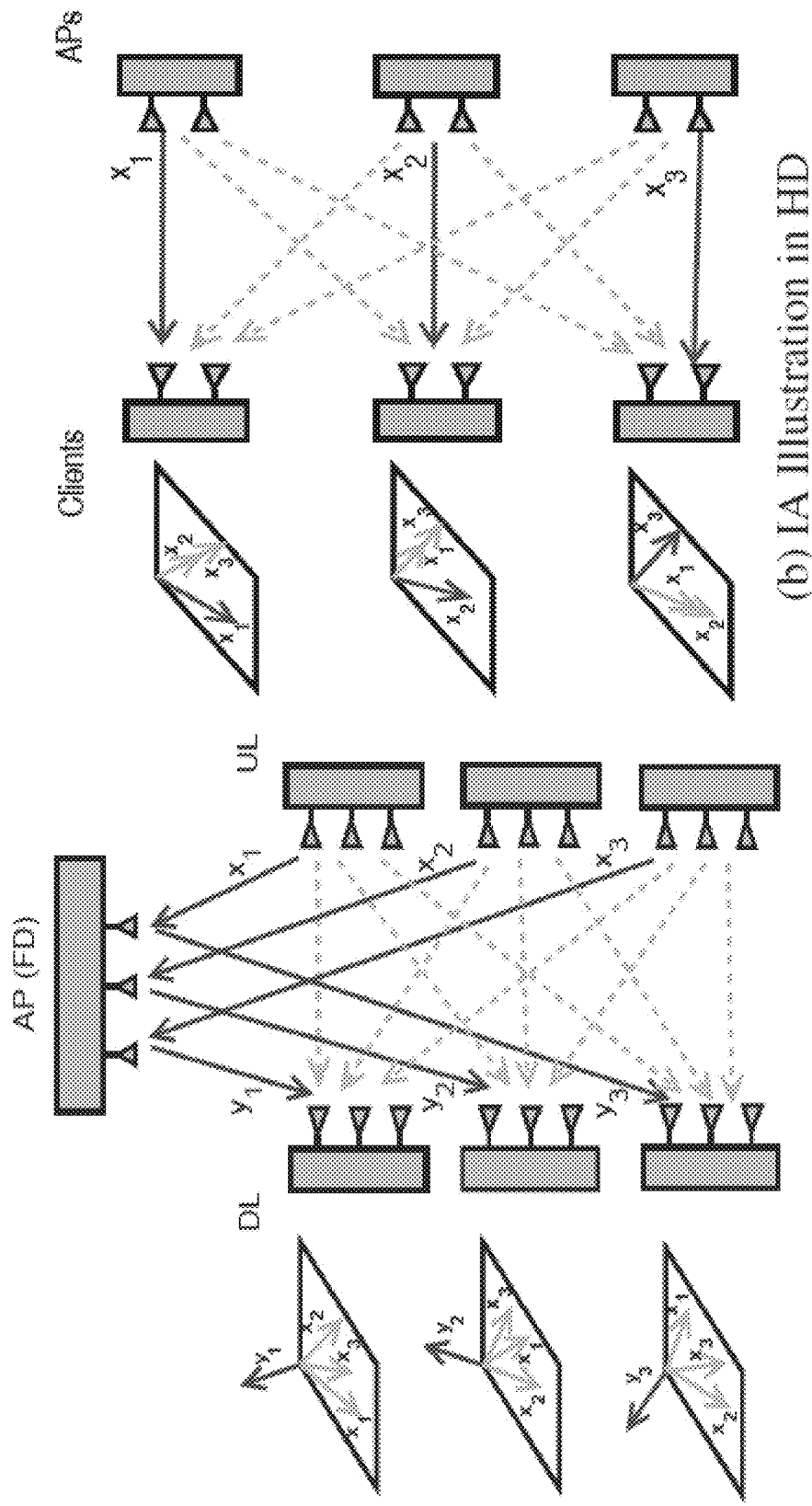
FIG. 24 depicts spatial interference alignment.
Figure 25:
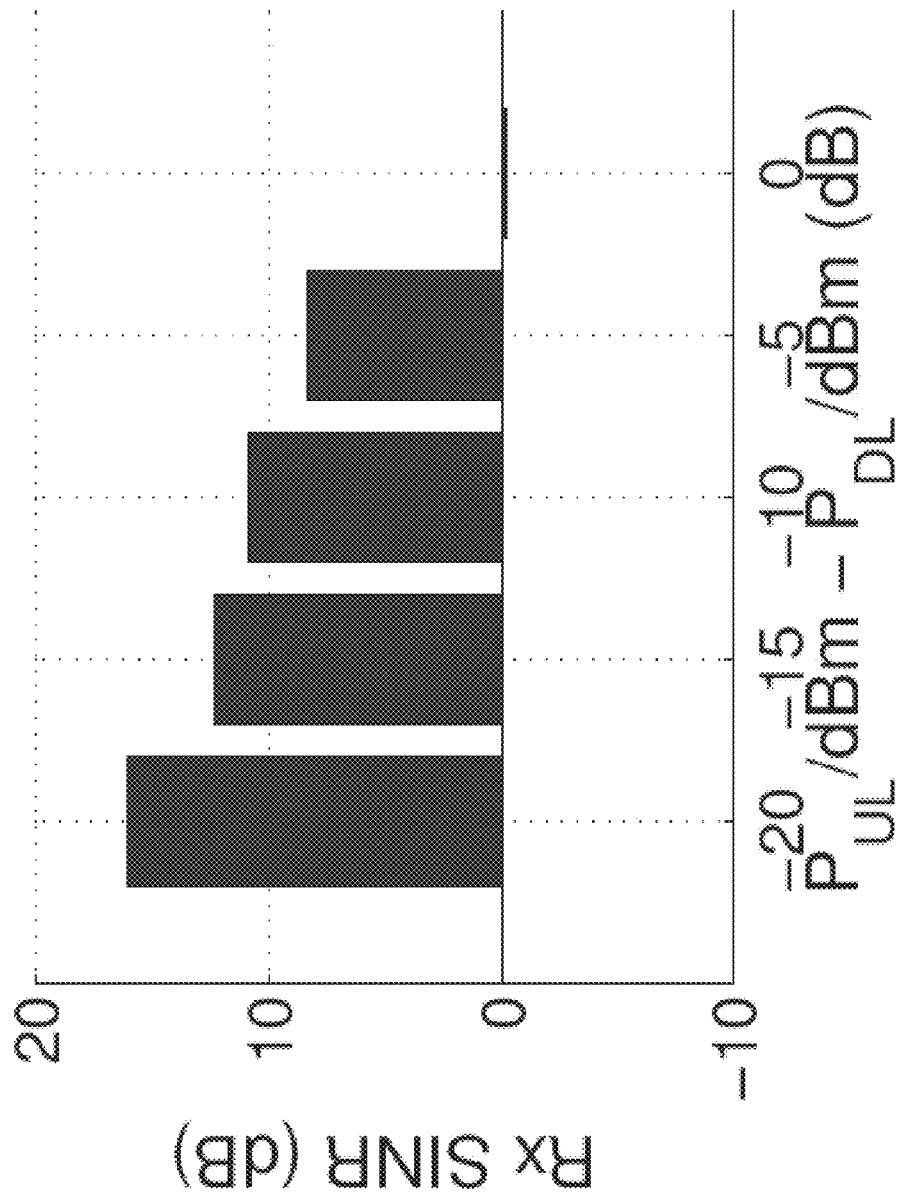
FIG. 25 shows SINR at the downlink client is affected by UDI from UL transmission.

To understand its impact, we conduct numerical as well as channel trace-based simulation (testbed details in Section 7) of a simple 3 node distributed FD network as shown in FIG. 23(*a*). In reality, the impact of UDI depends on the specific clients chosen on the uplink and downlink directions for the FD session, which in turn depends on a variety of MAC related factors such as the set of active clients available in the uplink and downlink, their local channel status (busy/idle), queue occupancy, scheduling policies, etc. To account for these variations, we vary the position of the uplink and downlink clients to create several topologies and measure the SNR at the downlink client both in the presence and absence of the uplink client. The difference between these SNRs provides an estimate of the impact of the UDI. It can be seen from the CDF in FIG. 25 that UDI creates about x dB of interference at the downlink clients in a large fraction of topologies, leaving little room for leveraging client separation. This significantly diminishes the opportunities and hence gains from full-duplex as pointed out in [1]. Further, this restriction on topology would only be increased when MIMO (multiple streams) is enabled from different clients in both the UL and DL directions—one has to now remove UDI between multiple pairs of UL and DL clients simultaneously (as seen in FIG. 24).

3.2 Interference Alignment for UDI

We propose to leverage spatial interference alignment (IA) in distributed FD networks towards addressing the UDI problem. In the rest of this paper, IA refers to spatial IA. Specifically, with multiple antennas being available at clients, (half-duplex) UL clients will use their spatial dimensions effectively to align their interference (i.e. transmissions to full-duplex AP) towards the (half-duplex) DL clients in a FD session as shown in FIG. 24. Using the channel state information (CSI) between the UL and DL clients, appropriate precoders (at UL clients) and receive filters (at DL clients) will be designed. This would eliminate the UDI and hence enable N streams each on both the DL and UL simultaneously (for N antenna devices), thereby securing the multiplexing gain of two from FD.

3.3 Challenges

As with any closed-loop MIMO system, by relying on CSI, our solution is applicable to clients whose channels have coherence times reasonable enough to amortize the overhead of CSI estimation. Note that with closed-loop MIMO becoming mainstream (multi-user MIMO in 802.11ac), this limitation would be imposed on any FD or HD system that employs closed-loop MIMO (even in the absence of IA).

Specific to our approach though, there arise several key challenges in translating our vision into a practical solution.

Performance:

The ability to generate 2N streams and hence a multiplexing gain of two (g=2) from FD, has a direct correspondence to capacity only in the high SNR regime [6], $$C(\text{SNR}) = g \log(\text{SNR}) + o(\log(\text{SNR})) \tag{a2}$$

In reality, different choices of precoders and receive filters at the clients, will result in different rates (throughput) for the desired streams to (from) the AP, although they may all eliminate the UDI between the clients. Hence, it is important to compute the IA solution and hence MIMO precoders and filters at the clients and AP in an efficient manner to not only handle the UDI problem and enable 2N streams but to also maximize the throughput of those enabled streams.

Overhead:

Although our solution operates in the same bandwidth, it requires CSI for channels between the UL and DL clients, which constitutes additional overhead over that incurred by baseline closed-loop, HD MIMO systems between the AP and clients. Further, this overhead would scale with the number of clients needed on the DL and UL to address the UDI problem in FD through IA. Hence, it is important to address the UDI with the least amount of additional overhead. This would include not only determining the minimum number of clients needed for the FD session, but also reducing the CSI overhead incurred by the chosen clients for the IA process.

Handling Heterogeneity:

In practical settings, client devices may possess lesser number of antennas than the AP. Further, the number of antennas on the device can vary across clients. For example, smartphones and tablets may be limited to two antennas, while laptops, desktops and smart TVs can potentially house more antennas. Hence, it is important to understand how the performance of our approach will be impacted by such heterogeneity and how to adapt to the same.

Towards addressing these challenges, we present our solution and system, FDoS—Full-Duplex without Strings, that enables full duplex in distributed multi-stream (MIMO) FD networks without relying on side channels, client separation or non-causal CSI. We first present our analytical results on leveraging IA in distributed FD networks in the next section, followed by the design components of FDoS that handle all the practical challenges in Section 5.

4. Ia in Distributed FD Networks

4.1 Primer on IA Theory

Figure 26:
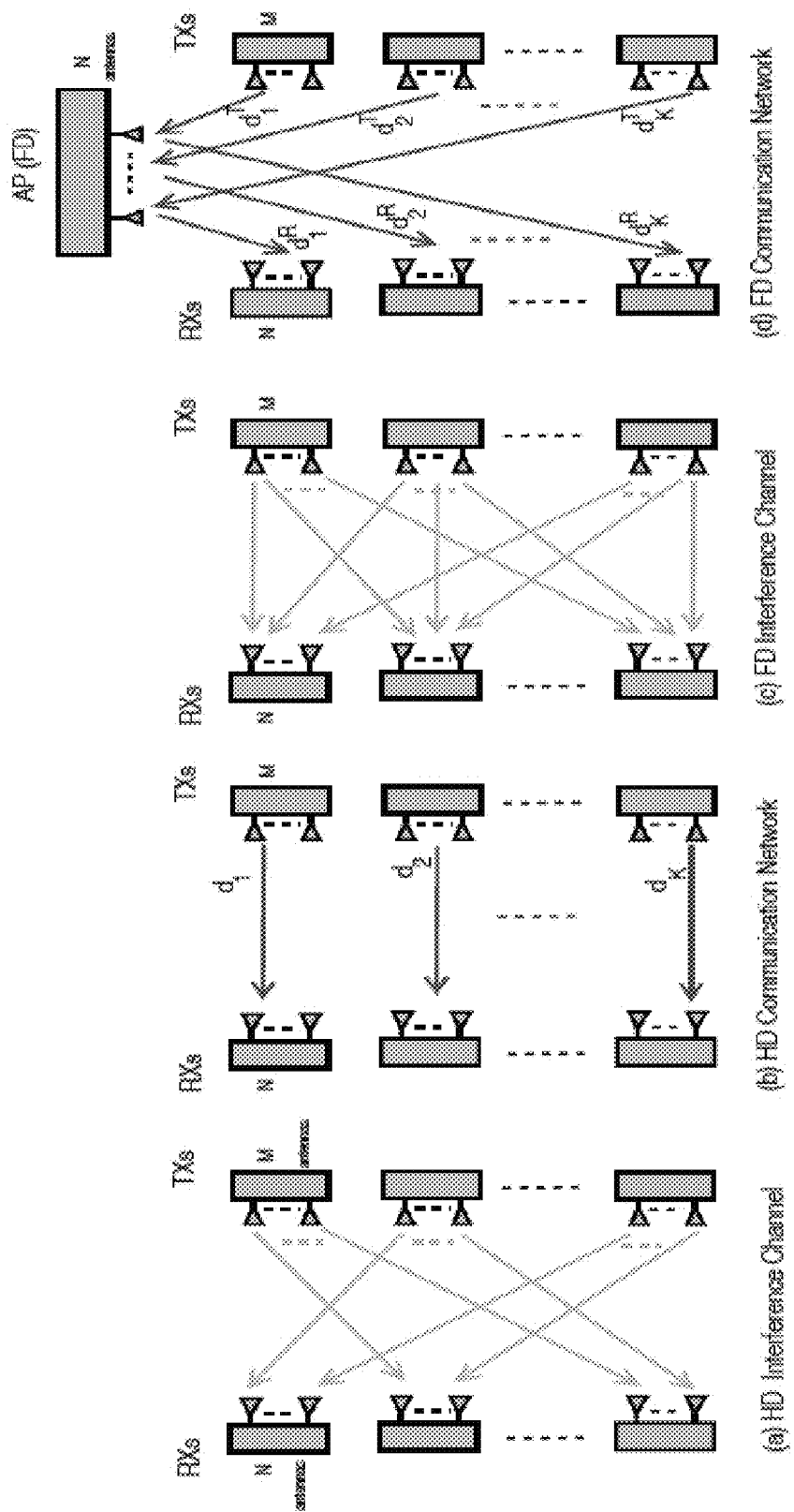
FIG. 26 depicts an interference network: HD vs. FD.

Consider the conventional HD interference channel as shown in FIG. 26(*a*), where there are K links, each consisting of an M antenna transmitter communicating with an N antenna receiver. The DoF on each of the HD communication links ($d_i$, FIG. 26(b)) essentially correspond to the rank of the precoding matrices $V_i$ and receive filters $U_j$ such that [20]

$$U_j H_{ji} V_i = 0, \forall i \neq j$$

$$\text{Rank}(U_j H_{ii} V_i) = d_i, \forall i = j \quad \text{(a3)}$$

where $U_j$ and $V_i$ are of size $d_j \times N$ and $M \times d_i$ respectively, while $H_{ji}$ is the channel between receiver j and transmitter i and is of size N×M. While the first constraint ensures that interfering streams are aligned in the null space of the receivers, the second constraint ensures that $d_i$ DoFs are available for the desired (communication) streams at the receiver of link i. For generic channel matrices H, it is sufficient to satisfy the first set of constraints (i.e. IA), which automatically leads to the second set being satisfied [20].

Necessary Conditions:

Based on the above constraints, one can easily obtain the following necessary conditions [20] for a given network to support the desired DoFs ($d_i$, $\forall i$):

$$d_i \leq \min\{M, N\}$$

$$\Sigma_{i:(i,j) \in \mathcal{S}} d_i(M-d_i) + \Sigma_{j:(i,j) \in \mathcal{S}} d_j(N-D_j) \geq \Sigma_{i,j:(i,j) \in \mathcal{S}} d_i d_j \quad \text{(a4)}$$

where $\mathcal{S} \subseteq \epsilon = \{(i,j); i,j \in [1, K]\}$. The first condition indicates that the DoF on a link is limited by the minimum of the number of antennas on either ends of the communication link. The second condition indicates that to have a feasible IA solution, the system defined on any subset ($\epsilon$) of the interference constraints (i.e. $\mathcal{S}$) must not be over-constrained. Note that matrices $V_i$ and $U_j$ are composed of $d_i$ and $d_j$ vectors respectively. Hence, a single interference constraint in Eqn. 2 between transmitter i and receiver j is comprised of $d_i d_j$ equations, while each transmitter and receiver gives rise to $d_i(M-d_i)$ and $d_j(N-d_j)$ variables respectively [20]. We refer to this condition as the dimension counting argument.

4.2 Distributed FD Interference Channel

In the HD interference channel (FIG. 26(a)), the DoF (used synonymously with number of data streams) are defined on a per-link basis, with every receiver (receiving desired streams) being subject to interference from the transmitters of the other links. Such an interference network (graph) captures even FD networks in the peer-peer mode. However, the case of distributed FD networks (i.e. in a single cell) is quite different for two reasons. (1) Here, all the desired streams either originate or terminate at a single common node, namely the AP (see FIG. 26(d)), which does not receive interference from any other node in the network (other than self-interference during FD, for which we assume ideal suppression in analysis). This results in an interference network (called full-duplex interference channel, FDIC) that is fully bipartite and decoupled from the desired/communication stream network as shown in FIGS. 26(c) and 26(d). (2) Further, with no desired streams exchanged between the nodes in the interference network (i.e. clients), this allows for the DoF notion to be applied on a per-node basis, with the uplink and downlink clients potentially operating on different DoF. Thus, the IA constraints for FDIC are as follows:

$$U_j H_{ji} V_i = 0, \forall i,j$$

$$\text{Rank}(U_j H_{j0} V_0) = d_j^R, \forall j \in \{\text{DL clients}\}$$

$$\text{Rank}(U_0 H_{0i} V_i) = d_i^T, \forall i \in \{\text{UL clients}\} \quad \text{(a5)}$$

where, index 0 represents the AP. While the first constraint ensures elimination of interference between "all" pairs of UL and DL clients, the last two constraints allow for varied DoF at each node, with $d_j^R$ and $d_i^T$ being the DoF for the downlink client (receiver) j and uplink client (transmitter) i respectively. As we will show subsequently (Section 3.6), the unique nature of interference in distributed FD networks, makes IA much more valuable in these networks than in HD networks.

4.3 Necessary Conditions for FDIC

Figure 27:
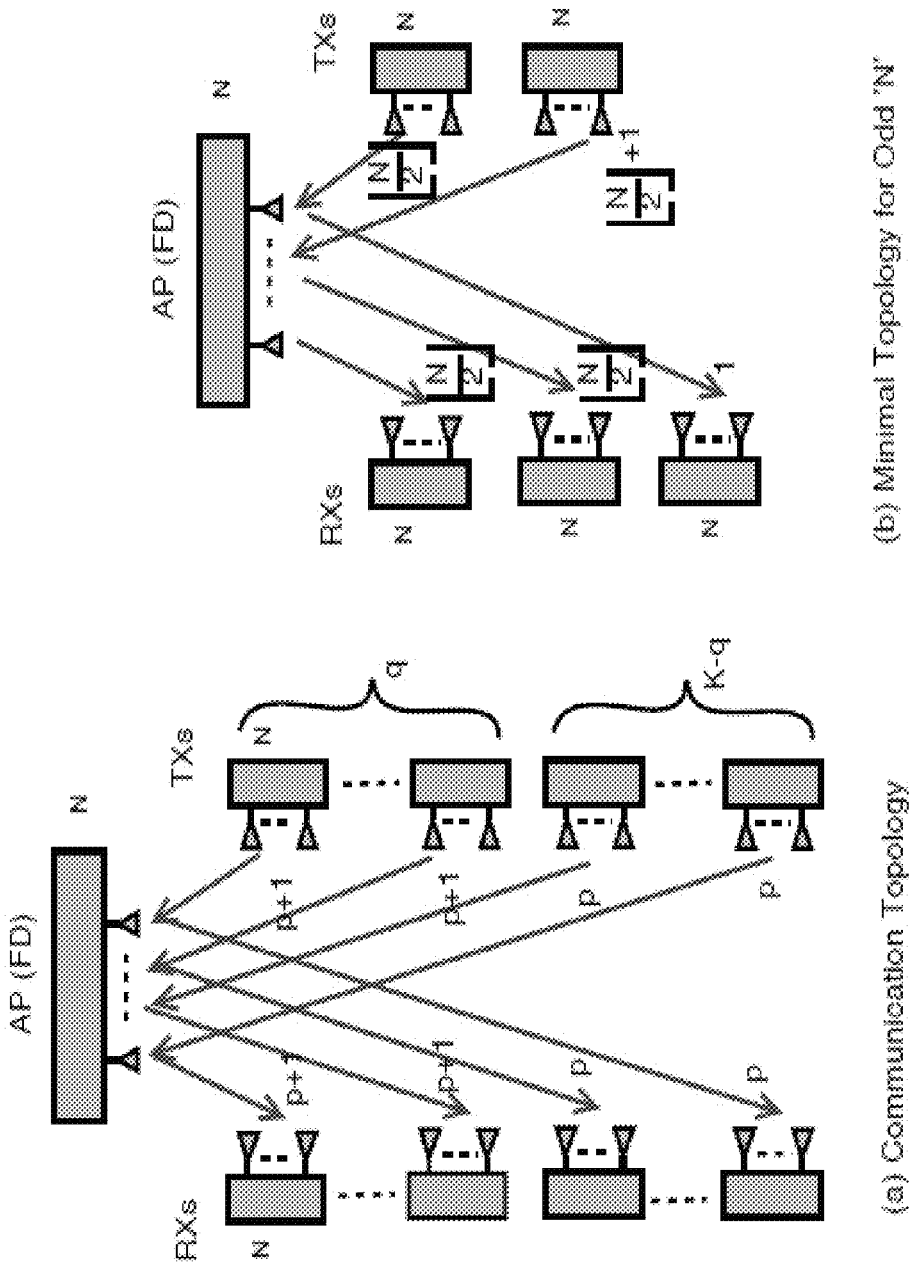
FIG. 27 depicts symmetric FDIC

With IA in HD and peer-peer FD networks, the goal is to typically determine the maximum DoF that can be achieved over the interference network. In contrast, with the AP controlling (originating/terminating) all the desired streams in distributed FD networks, the maximum number of streams that can be enabled in a single cell by an N transceiver AP is 2N streams. We assume N antennas are sufficient to generate 2N streams in FD [4]. However, our results and solution apply even if additional antennas (e.g. 2N [7]) are needed. Hence, we are interested in the alternate question: how many clients are needed for the IA solution to help address the UDI problem and help realize the 2N streams in FD? Answering this question will help us understand how to control the overhead incurred from IA (due to additional CSI estimation) in our solution. Further, given N antenna HD clients and a limit of N streams in either direction in FD, we are primarily interested in enabling 2N streams in symmetric FDIC. Here, the number of antennas at each client is the same (N) and the aggregate 2N streams (DoF) are uniformly distributed across the K clients in either direction as shown in FIG. 27(a) (i.e. p or p+1 streams at each client, where $$p = \left\lfloor \frac{N}{K} \right\rfloor;$$

i.e. N=pK+q; p, q$\in \mathcal{Z}^+$; q<K). Clients with asymmetric antennas and DoF on DL and UL are considered in Section 4.4. We now have the following encouraging result:

Lemma 1

For N antenna HD clients, only four clients are necessary for IA to enable 2N streams in symmetric FDIC, if N is even. If N is odd, six clients are necessary, which reduces to five (FIG. 27(b)) in an asymmetric FDIC.

Proof.

We first consider the case of N being even. With an upper bound of N DoF in either direction of FD, we consider K clients each on the DL and UL such that the N DoF are divided uniformly among the K clients with q clients obtaining p+1 DoF and the remaining K−q clients obtaining p DoF (where N=pK+q, p, q$\in \mathcal{Z}$;

$$p = \left\lfloor \frac{N}{K} \right\rfloor;$$

q<K). With two types of clients (requiring p or p+1 DoF) in either direction, we have four types of interference pairs between clients, resulting in the following number of interference constraints (equation):

$$|\epsilon| = p(p+1)(K-q)q + (p+1)^2 q^2 + p^2(K-q)^2 + p(p+1)(K-q)$$
$$q = ((p+1)q + p(K-1)) = N^2 \quad \text{(a6)}$$

Counting the number of variables per client, we obtain the aggregate number of variables (A) as, $$A = (p+1)(N-p-1)2q + p(N-p)2(K-q) = 2N^2 - 2Np - 2q(p+1)\% \text{ on simplification}$$

Now, for the dimension counting argument to hold, we need A≥|ϵ|, i.e.

$$2N^2-2Np-2q(p+1) \geq N^2$$

Applying N=pK+q and simplifying, the constraint reduces to, $$K(K-2)p^2+2(K-2)pq+q(q-2) \geq 0 \quad (a7)$$

When N is even, the above constraint holds for K≥2 (where q=0 when K=2). However, when N is odd, K=2 results in q=1, which does not satisfy the constraint. However, with K≥3, the constraint is satisfied for N being odd.

Thus, when N is even, we need at least two clients on both DL and UL (four in total) to remove UDI through IA and hence enable 2N streams. One might wonder if assuming an asymmetric number of clients on DL and UL can help realize 2N streams with lesser clients. Note that with three clients, one of the directions has a single client that must send/receive N streams, thereby becoming the bottleneck for IA. Hence 2N streams is not possible with three clients. Further, there is no notion of IA for two clients.

When N is odd, we need at least three clients in either direction (six in total) for the symmetric FDIC. However, with an asymmetric set-up, five clients may be sufficient with three clients in only one of the directions as shown in FIG. 27(b). Specifically, we have the number of variables $$\left(4\left\lfloor\frac{N}{2}\right\rfloor^2 + 6\left\lfloor\frac{N}{2}\right\rfloor\right)$$

to be greater than the number of equations $$\left(4\left\lfloor\frac{N}{2}\right\rfloor^2 + 4\left\lfloor\frac{N}{2}\right\rfloor + 1\right)$$

in this case.

4.4 Constructing a Feasible Solution

Note that the condition on the minimum number of clients is only a necessary condition and hence does not guarantee that a feasible IA solution can be found with four clients. Indeed the problem of constructing feasible IA solutions for maximizing the number of streams is a challenging one even in HD networks, where algebraic solutions are available only for small scale networks [5]. In contrast, for our desired objective of eliminating UDI to enable 2N streams, we show that the structure of interference in symmetric FDIC can be intelligently leveraged to construct a generic IA solution. Further, the solution is implementation-friendly, applies to general topologies and can be realized with a small number of clients. First, we introduce the following definition:

Definition 1

An interference alignment network (IAN) is a subset of the original interference network that captures interference only due to transmit streams that need IA at the receivers.

Figure 28:
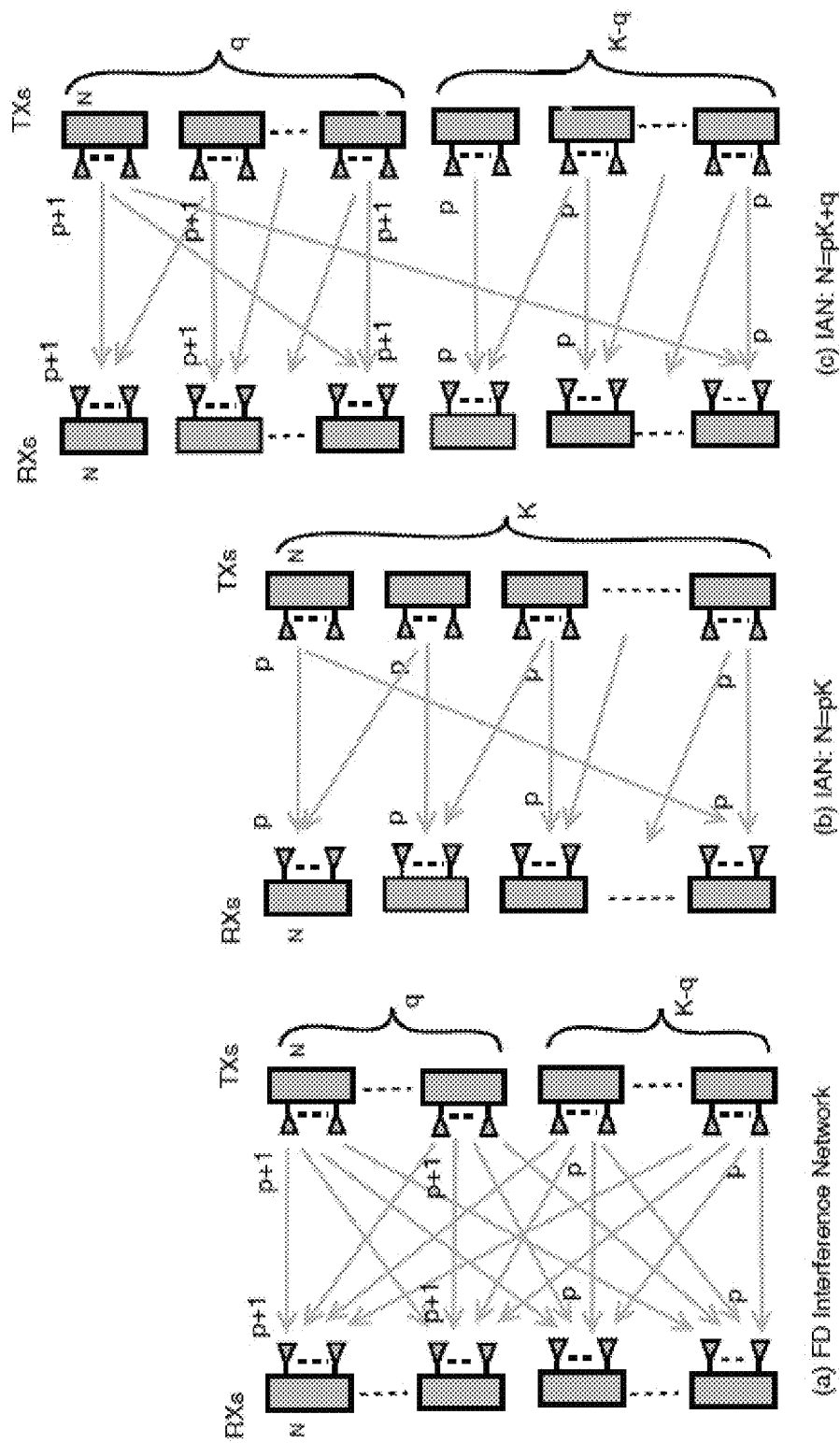
FIG. 28 depicts an interference alignment network.

In other words, IAN discounts those interfering streams that can be suppressed by allocating an equivalent number of DoF at the receivers (i.e. interference suppression), thereby not requiring IA for handling those streams. In the example in FIG. 28(a) (with q=0), say, we have four clients (K=4) each on the DL and UL in FDIC, each equipped with N=4 antennas (AP has 4 antennas as well) and transmits/receives only a single stream (p=1) to generate a total of 8 streams through FD. Note that all interfering streams do not need to be aligned in this example given the requirement of a single stream with four available dimensions (4 DoF) at each client. Hence, while the interference network is a fully bipartite graph as shown in FIG. 28(a), the resulting IAN is as shown in FIG. 28(b) (with K=4). Here, the IAN requires only two of the UL clients' streams to be aligned (using one DoF) at a DL client, while the other two UL streams are handled directly through interference suppression (using two DoF), thereby leaving behind one DoF for receiving the desired DL stream.

Lemma 2

For N antenna HD clients, if the necessary conditions are satisfied, there exists a feasible IAN with at most one (un-directed) cycle that can enable 2N streams in symmetric FDIC.

The proof is by means of providing a construction for a feasible IA solution.

IAN Construction:

In symmetric FDIC, q clients require to send or receive p+1 streams, while the remaining K-q clients require p streams. The necessary conditions have been shown to be satisfied for this interference network earlier. We now construct the following IAN with a single un-directed cycle involving 2K clients as shown in FIG. 28(c). This IAN has three types of DL clients: (i) q of them receiving p+1 desired streams and interference from 2(p+1) streams from two UL clients; (ii) K-q-1 of them receiving p streams and interference from 2p streams from two UL clients; and (iii) one DL client receiving p streams and interference from 2p+1 streams from two UL clients.

Feasibility:

Consider a DL client receiving p+1 desired streams. $d_{IA}$=p+1 dimensions are used to align interference from a net 2 (p+1) streams from the two UL clients (two edges in IAN). Further, (K-2) edges, i.e. (K-q) edges with p streams each and (q-2) edges with p+1 streams each, are removed at the DL client (compared to original interference network). This requires that $d_{IS}$=(K-q)p+(q-2)(p+1) dimensions are set aside at the client to handle these streams through interference suppression. This eventually leaves N-$d_{IA}$-$d_{IS}$=p+1 remaining dimensions, which is sufficient to receive the desired (p+1) streams at the client. Similarly, the desired streams at the other types of DL clients can also be shown to be supported by this IAN. Hence, the IAN is feasible and can support 2N streams through FD.

IA Solution:

The construction is as follows: The individual IA conditions for this IAN can be given separately for the cyclic (top 2q nodes) and the non-cyclic (bottom 2(K-q) nodes) part as, $$H_{ii}V_i \overset{s}{=} H_{ik}V_k, \forall i \in [1, q], k = (i+1)(\text{mod})q \quad (a8)$$

$$H_{ii}V_i \overset{s}{=} H_{ik}V_k, \forall i \in [q+1, K], k = (i+1)(\text{mod})K$$

Substituting back in the cyclic part, we get, $$V_1 \overset{s}{=} \left(\prod_{i=q}^{1} H_{ik_i}^{-1} H_{ii}\right) V_1, k_i = (i+1)(\text{mod})q \quad (a9)$$

(i) Thus, $V_1$ can be composed of any p+1 Eigen vectors of the matrix $\Pi_{i=q}^{1} H_{ik_i}^{-1} H_{ii}$ to provide the required N×(p+1) matrix. The rest of the precoding matrices in the cycle ($V_i$, i∈[2, q]) can then be computed sequentially from the first set of constraints in Eqns. 7.

(ii) Since, the second set of constraints couple the rest of the precoding matrices ($V_i$, i∈[q+1, K]) to $V_1$ through DL client K (i.e. $V_K$), once $V_1$ is computed, they can be determined as well. However, these K−q precoding matrices are N×p in size compared to $V_1$ that is N×(p+1) in size. Hence, we first obtain $V_K$ as an N×(p+1) precoding matrix from $V_K = H_{K1}^{-1} H_{KK} V_1$. Since only p streams are transmitted by the UL client K, we then pick p out of the p+1 vectors in $V_K$ to make it N×p in size.

(iii) Thereafter, the remaining precoding matrices $V_i$, i∈[q+1, K−1] of size N×p can be sequentially obtained from $V_K$ from the second set of constraints in Eqns. 7.

(iv) The corresponding receive filters ($U_i$) of dimensions N×(p+1) or N×p are obtained orthogonal to the sub-space spanned by $H_{ii} V_i$.

When N=Kp, i.e. q=0, the IAN consists of a single Hamiltonian cycle, with all clients requiring the same p streams as shown in FIG. 28(b). This simplifies the solution to only the cyclic part of the generic N=Kp+q case, and would require only the first step of the construction, albeit applied over all the clients.

Corollary 1.

The necessary conditions in Eqns. 4 are also sufficient for a symmetric FDIC.

Since symmetric FDIC automatically results in IANs with at most a single cycle, this indicates that a feasible IA solution always exists for these networks. Hence, the necessary conditions for IA in symmetric FDIC also serve as sufficient conditions.

4.5 FDoS Solution

While we can construct a feasible IA solution for any symmetric FDIC with 2K clients, to minimize the overhead of CSI from IA, our solution enables FD with exactly four clients (two DL and two UL clients) with $$\frac{N}{2}$$

screams each. Recall that this is the smallest number of clients needed to realize 2N streams when N is even (here q=0). The IA construction is as follows:

(i) $V_1$ is composed of $$\frac{N}{2}$$

Eigen vectors of the N×N matrix $H_{21}^{-1} H_{22} H_{12}^{-1} H_{11}$ to result in $$N \times \frac{N}{2}$$

precoding matrix for UL client 1.

(ii) $V_2$ is again a $$N \times \frac{N}{2}$$

precoding matrix for UL client 2 that is given by $$V_2 \stackrel{s}{=} H_{12}^{-1} H_{11} V_1.$$

(iii) From $V_1$ and $V_2$, the $$\frac{N}{2}$$

dimensional receive niters for the two DL clients, namely $U_1$ and $U_2$ $$\left(\text{matrices of size } \frac{N}{2} \times N\right)$$

are obtained orthogonal to the sub-space spanned by $H_{11} V_1$ and $H_{22} V_2$ respectively.

Figure 29:
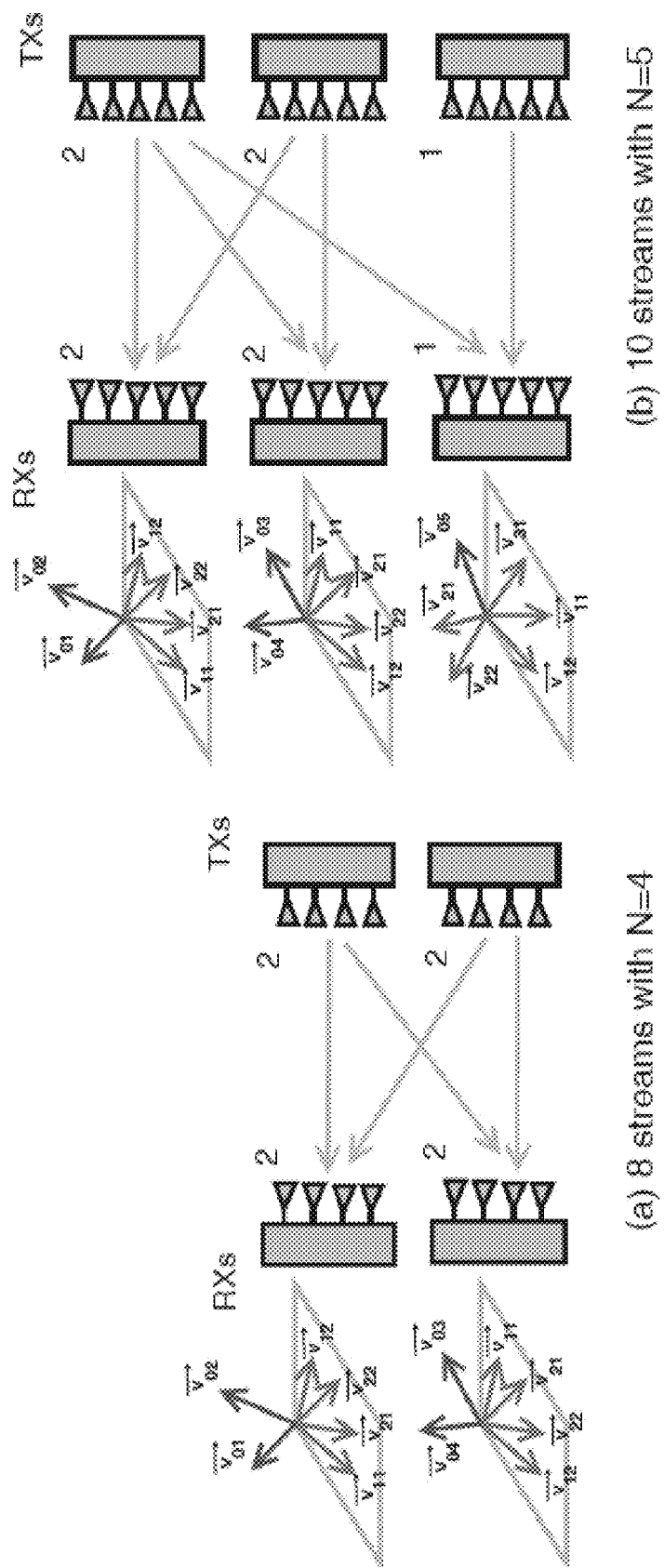
FIG. 29 depicts examples of IA construction.

Similarly, when N is odd, our construction would require six clients (K=3) and would follow the appropriate procedure in Section 3.4 depending on whether N is a multiple of 3 or not. FIG. 29 illustrates the IAN and IA construction pictorially for N=4 and N=5 respectively.

4.6 The Result in Perspective

To put our result in perspective, we consider two relevant and recent results from IA in the spatial (MIMO) domain for HD systems [5, 11]. Recently, [5] showed that in a HD MIMO interference channel with K communication links containing N antenna nodes, one can potentially achieve $$\frac{2NK}{K+1}$$

streams, i.e. 2(N−1) streams (when K=N−1) with IA alone, while requiring $O(N^2)$ transceivers and $O(N^2)$ CSI estimations of N×N links. When clients are allowed to receive from multiple APs, [11] showed that 2(N−1) streams are possible with IA alone, but with N−1 APs and two clients, thereby requiring O(N) CSI estimations and $O(N^2)$ transceivers. In contrast, we have shown that IA in FD systems can help generate 2N streams with O(N) transceivers and just four HD clients (and one FD AP), restricting the CSI estimations to just 8 links (4 with respect to AP, and 4 between clients) that is independent of N. One can attribute this interesting result specifically to the structure of FDIC, wherein half the interfering streams are those that are generated by the AP (intended for DL clients), which are automatically available for self-interference cancellation during its reception of half the desired streams (from UL clients). Hence, IA is needed only for the other half of the interference streams that are generated by the UL clients on the DL clients.

Another interesting point to note is that in HD systems, one can scale the number of concurrent streams (with number of APs) or equivalently achieve 2N streams with lesser number of APs by allowing for AP cooperation (i.e sharing data streams between APs, e.g. network MIMO). However, the role of IA vanishes in such scenarios, where AP cooperation/processing handles all the interference between APs. In contrast, even if APs are allowed to cooperate, the UDI problem (being specific to clients) will continue to pose a challenge for FD systems. Hence, we believe that IA plays a key role in handling the UDI problem in FD networks. Further, the nature of FDIC, makes IA an ideal solution to address UDI and enable 2N streams in an efficient manner (with low, fixed overhead) with just four HD clients.

5 FDoS: Design Components

We now present the various MAC layer design components that aim to leverage our results from the previous section to build a practical solution for FD with half-duplex clients in a single cell.

5.1 Client Selection

In any closed-loop MIMO transmission from/to an AP (e.g. multi-user MIMO), the net rate (throughput) depends on the channels of the set of clients (and their mutual interference) involved in the transmission. If the CSI is available for all clients, then the best subset of clients can be selected for the transmission. However, collecting the CSI estimates not only constitutes overhead but also incurs latency, which could render the CSI estimates invalid/stale (depending on the channel coherence time) during operation. For this reason, 802.11ac decouples client selection from the MU-MIMO transmission process—clients are first chosen based on QoS/scheduling policies, CSI is estimated only for the chosen clients, and then MU-MIMO transmission is optimized (through precoding) for the chosen clients. In the case of FD with IA, the rate of the FD session not only depends on individual client channels with respect to AP but also on the channels between the clients. The latter amplifies the CSI estimation problem in FD systems with IA, thereby prompting us to decouple client selection from precoder optimization in a manner similar to 802.11 ac systems.

5.2 Maximizing Throughput

While our solution from Section 3 eliminates the UDI between the chosen clients through IA, it does not directly contribute to improving the throughput of the desired streams. Hence, once the four clients (two on DL and two on UL) are chosen by the AP scheduler based on priorities/weights, queue occupancy, etc. (we pick proportional fairness), FDoS focuses on optimizing the rate of the FD session for the chosen set of clients.

Recall that in addition to the precoders and receive filters at the clients, we also need to design a precoder and receive filter for the AP ($V_0$, $U_0$). The core problem to address is as follows: we need to construct precoders ($V_i$) at the UL clients and the receive filter at the AP ($U_0$) for the UL streams, while also constructing the precoder ($V_0$) at the AP and the receive filters ($U_j$) at the DL clients for the DL streams in FD. These two MU-MIMO problems in both directions are coupled through the interference between the UL and DL streams at the AP as well as the DL clients. While the former is addressed through self-interference cancellation, the latter is addressed through IA. Here, we assume ideal self-interference cancellation.

FDoS adopts a modular approach to determining the precoders and receiver filters for the AP and clients through a two-step procedure as follows: Since the UDI problem is responsible for coupling the two MU-MIMO problems, FDoS first determines the IA solution for UDI (Section 3). Then, leveraging the flexibility of the precoders and receive filters already designed at the clients from the IA process, FDoS optimizes the receive filter and precoder at the AP in the UL and DL directions to maximize the rate of the UL and DL streams respectively. The key steps are as follows:

(1) Optimize the precoders ($V_1$ and $V_2$) at the UL clients and receive filter ($U_0$) at the AP to maximize the rate of the UL streams. Note that, the design of $V_1$ (to remove UDI) allows the flexibility of picking $$\frac{N}{2}$$

eigen vectors (out of N) of the matrix $H_{21}^{-1}H_{22}H_{12}^{-1}H_{11}$. These $$\frac{N}{2}$$

vectors that form $V_1$ are chosen appropriately to maximize the rate of the N UL streams to the AP as follows:

Let $V_1 = [\bar{v}_{11}\bar{v}_{12}\ldots\bar{v}_{1N}]$. For every $\bar{v}_{1i}$, the corresponding vector in $V_{2'}$ is given as $\bar{v}_{2i} = H_{12}^{-1}H_{11}\bar{v}_{1i}$. Pair the eigen vectors from $V_{1'}$ and $V_{2'}$ as $\{(\bar{v}_{1i},\bar{v}_{2i})\}$, $\forall i \in [1,N]$.

Compute the rate metric for the UL streams corresponding to every pair of their eigen vectors as, $$R_{i,UL} = \text{Rate}(\vec{u}_{0i}^{1}H_{01}^{U}\vec{v}_{1i}) + \text{Rate}(\vec{u}_{0i}^{2}H_{02}^{U}\vec{v}_{2i}) \tag{a10}$$

where $\vec{u}_{0i}^{1}$ and $\vec{u}_{0i}^{2}$ are the receive filter vectors (e.g. LMMSE filters) at the AP (total of N vectors) corresponding to the precoding vectors at UL clients 1 and 2 respectively. Given $\vec{v}_{1i}$ and $\vec{v}_{2i}$, $\vec{u}_{0i}^{1}$ and $\vec{u}_{0i}^{2}$ can be easily computed to maximize the individual rate terms in the above equation. We employ the Shannon formula for the rate function[19].

Arrange the pair of eigen vectors in descending order of their uplink rate metric. Then, pick the top $$\frac{N}{2}$$

pairs to construct me corresponding precoding matrices $V_1$ and $V_2$ of size $$N \times \frac{N}{2}$$

for me two UL clients. Similarly, use the corresponding $$\frac{N}{2}$$

receive filter vectors ($\vec{u}_{0i}^{1}, \vec{u}_{0i}^{2}$) (computed above) for the AP to construct the $$\frac{N}{2} \times N$$

receive filter matrices $U_0^1$ and $U_0^2$, and hence its final N×N receive filter matrix $U_0 = [U_0^{1T}U_0^{2T}]^T$.

(2) Compute receive filters ($U_1$ and $U_2$) for DL clients to remove UDI. Given $V_1$ and $V_2$, the receive filters $U_1$ and $U_2$ of size $$\frac{N}{2} \times N$$

at DL clients 1 and 2 are obtained orthogonal to the sub-space spanned by $H_{11}V_1$ and $H_{22}V_2$ respectively, wherein the interference from both UL clients have been aligned.

(3) Determine the precoding matrix ($V_0$) for the AP to maximize the rate of the DL streams. Having computed the receive filters $U_1$ and $U_2$ based on IA, the precoding matrix for the AP $V_0$ is computed to maximize the rate of the N downlink streams, $$R_{DL} = \text{Rate}(U_1 H_{10}^{D} V_0^{1}) + \text{Rate}(U_2 H_{20}^{D} V_0^{2}) \tag{a11}$$

where $V_0^1$ and $V_0^2$ are the two N×N/2 precoding matrices with respect to the two DL clients, that together form the N×N precoding matrix $V_0$ at the AP, i.e. $V_0 = [V_0^1 V_0^2]$.

Note that FDoS optimizes the UL precoders first. However, one could also start by optimizing the DL precoders. While one can envision to jointly address the UL and DL MU-MIMO problems (along with IA) through a very complex optimization problem, this will not favor implementation. In contrast, we will now show how our modular approach allows for a distributed implementation, thereby reducing overhead.

5.3 Reducing Overhead

A straight-forward implementation of the above solution will consist of the following steps:

(i) AP sends pilots for channel estimation at DL clients, followed by UL clients 1 and 2 for channel estimation at the AP ($H_{01}^U$, $H_{02}^U$) as well as at the DL clients.

(ii) DL clients 1 and 2 estimate and feedback DL CSI $H_{10}^D$ and $H_{20}^D$ respectively to the AP.

(iii) In addition, DL client 1 estimates and feeds back UL-DL CSI $H_{11}$ and $H_{12}$ to the AP for IA. Similarly, DL client 2 feeds back $H_{21}$ and $H_{22}$ to the AP.

(iv) With all the required CSI, the AP computes all the desired precoders and receive filters, $V_0$, $V_1$, $V_2$, $U_0$, $U_1$, $U_2$. AP then transmits $V_1$, $V_2$ to the UL clients, which the DL clients overhear and use to compute their own receive filters $U_1$ and $U_2$.

Note that the transmission of pilots from the AP (step 1) and feedback of CSI from the DL clients (step 2) are common to a HD MU-MIMO (downlink) system. However, the pilots from the UL clients (step 1), feedback of inter-client CSI (step 3) and precoders for the UL clients (step 4) are specific to our FD system, thereby constituting additional (albeit fixed) overhead. With the pilots constituting negligible overhead relative to the CSI and precoder feedback, the bulk of the overhead is incurred in steps 3 and 4.

We propose an alternate approach that leverages the distributed nature of our solution to reduce the overhead incurred by half. While steps 1 and 2 are the same, the remaining steps are as follows:

(iii) DL client 1 feeds back only $H_{12}^{-1}H_{11}$ to AP for IA. Similarly, DL client 2 feeds back only $H_{21}^{-1}H_{22}$ to AP.

(iv) AP then transmits only $V_1$ to the UL clients, which UL client 2 and DL clients use to compute their precoder $V_2$ and receiver filters $U_1$, $U_2$ respectively.

Thus, the overhead of four N×N CSI matrices and two $$N \times \frac{N}{2}$$

precoder matrices is reduced to two N×N CSI matrices and a single $$N \times \frac{N}{2}$$

precoder matrix, brining about an overhead reduction of half

We now show how the above approach with reduced feedback information is sufficient to execute our entire solution. Note that the aggregated CSI information provided by the DL clients is sufficient for the AP to execute Step 1 of our Algorithm in Section 4.2 and hence obtain $V_1$, $V_2$, $U_0$. The AP then provides only $V_1$ as feedback to the UL and DL clients. UL client 2 uses this information along with $H_{12}^{-1}H_{11}$ (overhead during feed back from DL client 1) to compute its own precoder $V_2$ locally as in Step 1, i.e. $V_2 = H_{12}^{-1}H_{11}V_1$. Similarly, DL clients 1 and 2 also locally compute $V_2$. Now, with access to both $V_1$ and $V_2$ and their local CSI, i.e. ($H_{11}$, $H_{12}$) for DL client 1 and ($H_{21}$, $H_{22}$) for DL client 2, both the DL clients can compute their respective receive filters $U_1$ and $U_2$ locally as in Step 2. The AP also has all the necessary information to compute the same receive filters $U_1$ and $U_2$ that will be used at the DL clients and hence its corresponding precoder $V_0$ as in Step 3.

5.4 Handling Heterogeneity

In reality, one might encounter scenarios, where clients have varied number of antennas. We consider such cases to understand when and how FDoS and more generally full-duplex can be applied.

Case 1: All Clients have M=1 Antenna

Although the AP has N antennas, if the HD clients are all restricted to a single antenna, no spatial IA is possible. Hence, UDI will have to be addressed by relying on client separation, side channels [3], etc. However, it is hard to scale such approaches from single stream (in either direction) to MIMO FD systems. Consequently, it might be beneficial to operate the system in half-duplex in such cases (especially for large N), where MU-MIMO can be applied to generate N streams in a single direction.

Case 2: All Clients have M (1<M≤N) Antennas

Here IA is possible and FDoS can be applied to deliver 2M streams in FD. However, depending on how 2M compares to N, one still needs to decide whether to operate the system in FD or HD.

Case 3: Some Clients have M (1<M≤N) Antennas and Others have N Antennas

This is a practical scenario that can arise often. For e.g. smartphones/tablets with two antennas and laptops, smart TVs with more antennas. We show that the performance of FDoS is not restricted by clients with lesser antennas (i.e. 2M streams), but provides a graceful performance (M+N streams) utilizing all the available antennas in the system effectively.

Theorem 1

FDoS delivers M+N streams with four HD clients, two each with M and N antennas respectively (M, N being even).

Proof.

We provide a proof for the case that M and N are both even integers. Without loss of generality let us assume that M≤N. We use the following construction to achieve M+N streams: Each of two clients with M antennas as the UL clients transmit $$\frac{M}{2}$$

desired streams to the AP on UL and the other two clients with N antennas serve as the DL clients receiving $$\frac{M}{2}$$

streams each from the AP on the DL. Thus, there are M streams on the UL interfering with N streams on the DL.

Based on the dimension counting argument, the number of variables is $$\frac{N^2 + M^2}{2}$$

is greater than the number of interference constraints MN. Hence, the necessary conditions are satisfied for this topology.

In the following we provide a construction that shows that in fact it is possible to have DoF per node that is half of the number of antennas at each node. First we note that the precoders and receiver filters at each node denote a subspace of the vector space defined by the number of antennas at each node. At a transmitter node this vector space is used for the transmission and at a receiver node this space is free of interference from the transmission performed in the uplink and can be used for reception of the signal from AP. If we have two vector spaces of size M in the uplink their image in each of the receiver node has an intersection that is of size 2M−N if the channels between the uplink and downlink nodes are generic. In order to find this intersection we consider the channels from the uplink nodes to a downlink node, e.g., $H_{12}$ and $H_{11}$. Let us denote the column of these two matrices by $h_1, \ldots, h_M$ and $g_1, \ldots, g_M$, respectively. The matrix $A=[h_1, \ldots, h_M, g_1, \ldots, g_{N-M}]$ is full rank by the assumption of the channels being generic. Therefore, we can write the 2M−N vectors $g_{N-M+1}, \ldots, g_M$ in terms of the columns of A, e.g., $$g_{N-M+k} = \sum_{i=1}^{M} \alpha_1^k h_i + \sum_{i=1}^{N-M} \beta_1^k g_i \qquad (a12)$$

By rearranging the above equation we find the vectors that are in the intersection of the images of the transmit vector spaces at this receiver. We have the following:

$$w_k = \sum_{i=1}^{M} \alpha_1^k h_i = g_{N-M+k} - \sum_{i=1}^{N-M} \beta_1^k g_i \qquad (a13)$$

Under the condition of the channel being generic, it can be shown that the collection of the vectors $w_k$ generates a full rank matrix $C=[w_1, \ldots, w_{2M-N}]$. The inverse image of the matrix C in the vector spaces of the two transmitting nodes defines the subspaces that intersect at the receiver node and we denote them by $C_1$ and $C_2$ for the two transmitting nodes 1 and 2, respectively. We call these vector spaces the common vector spaces. The orthogonal subspaces with these vector spaces at the transmitting nodes 1 and 2 and the receiving point are called the disjoint vector spaces and denoted by $D_1$, $D_2$ and D, respectively.

The property of these vector spaces is as follows:

(1) For generic channel condition, the size of C is N×(2M−N), (2) For generic channel condition, the size of $C_1$ and $C_2$ is equal to M×(2M−N), (3) For generic channel condition, the size of D is N×2(N−M), (4) For generic channel condition, the size of $D_1$ and $D_2$ is equal to M×(N−M), (5) Any precoding vector that lies in the spaces defined by $D_1$ or $D_2$ will be received in the spaces defined by D, (6) Any precoding vector that lies in the spaces defined by $C_1$ or $C_2$ will be received in the spaces defined by C, (7) Any two streams transmitted from two transmitters by using two precoding vector that lies in the spaces defined by $D_1$ and $D_2$, respectively, will be received in disjoint subspaces of the vector spaces defined by D, (8) Any streams received in a vector space that lies within the vector space defined by C can be mapped to a transmission that has happened from either transmitting node 1 or 2 where the precoding matrix defines a subspace of the vector space $D_1$ or $D_2$, respectively.

Given the above property, it is simple to see that the disjoint vector spaces do not require any interference alignment and we can freely choose any subspace of size $$\frac{N-M}{2}$$

at the transmitter and they will take away at most $$2 * \frac{N-M}{2}$$

at each of the receiving nodes. On the other hand, in the common vector spaces, one can apply the same construction used for the symmetric FDIC to generate additional $$\frac{2M-N}{2}$$

degrees of freedom per node.

5.5 Putting it all Together

Figure 30:
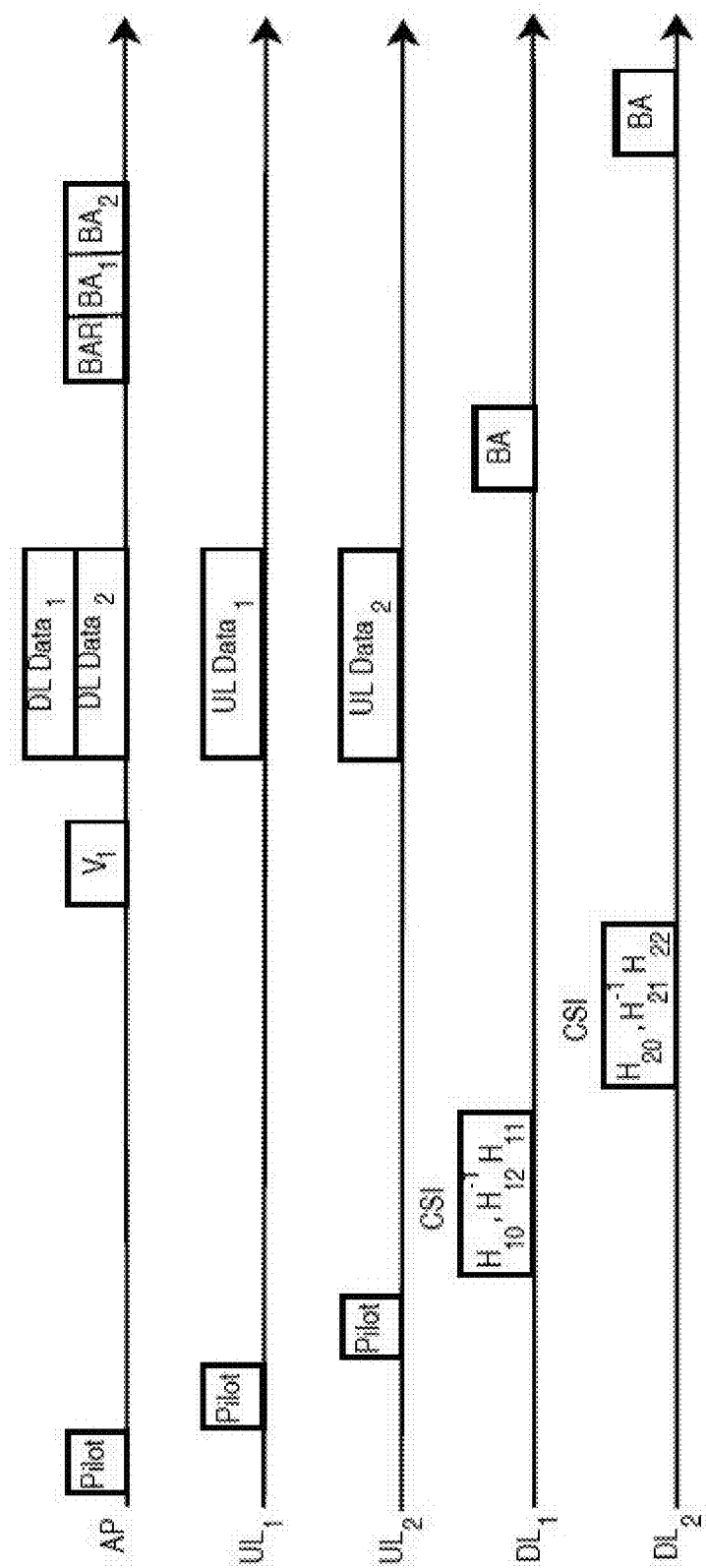
FIG. 30 depicts an FDoS Operation Timeline.

We now outline the complete sequence of steps in executing an FD session in FDoS (see FIG. 30 for illustration).

(1) Decide FD vs. HD:

Based on desired scheduling/QoS policies (proportional fairness in our case), the four clients for a FD session in FDoS are chosen by the AP. Based on the number of antennas available at the clients, the total number of streams possible through FD is determined (Section 5.4) and compared against N streams possible with HD. FD is enabled only if it can enable a larger number of streams (than in HD). Scheduling decisions can also incorporate information on number of client antennas.

(2) Channel Estimation and Feedback:

Once FD is chosen, the clients in the session are notified. The channels between AP and the four clients as well as between the clients themselves are estimated, followed by the intelligent (reduced) feedback procedure as outlined in Section 5.3.

(3) Distributed Computation of Solution:

In addition to determining its own precoder and receive filter, the AP disseminates the precoder for one of the UL clients. Using this, the rest of the precoder and receiver filters are computed locally at each of the clients (Sections 5.2, 5.3).

(4) Executing FD Session:

The FD session is then enabled by the AP between the four clients in the symmetric (2M or 2N streams) or asymmetric (M+N streams) mode as appropriate. The AP serves as the point coordinator (e.g. cellular BS, PCF mode in 802.11) for the FD session.

(5) ACK Delivery:

The delivery of ACKs follows a procedure similar to downlink MU-MIMO operation 802.11ac, wherein the AP solicits block ACKs (BA) from each of the MU-MIMO clients (except the first client) sequentially. In our case, in addition to a block ACK request (BAR) for the second DL client, the AP also needs to send back two ACKs to the two UL clients. This is achieved by piggybacking the two ACKs for the UL clients onto the ACK-request for the second DL client as shown in FIG. 30, thereby not having to incur additional transmissions.

6. Implementation

We prototype FDoS using WARPLab in a 6-node WARP tested that uses a combination of v2 and v3 WARP boards. We use a 802.11-compatible 10 MHz OFDM PHY with 64 sub-carriers for UL and DL transmissions. The key implementation details are as follows:

Full Duplex.

We implement a simple 2-antenna MIMO full-duplex platform (similar to MIDU [1]) for the FD AP. We employ two WARP nodes for the AP, one for transmission and other for reception simultaneously, and synchronize their clocks. Our platform achieves up to a 28 dB of analog signal cancellation over a 1 MHz OFDM channel. Note that the impact of UDI is independent of the amount of self-interference (SI) cancelled at the FD node. Even though our FD implementation does not sufficiently cancel all self-interference, it suffices to illustrate the benefits that can be achieved by eliminating UDI using FDoS. Further, one can employ more sophisticated techniques for SI cancellation as well [4].

Antenna Configuration.

We evaluate FDoS under homogeneous and heterogeneous antenna configurations. Under the homogenous setting, each HD (UL, DL) and FD (AP) node has either 2 or 4 antennas. Under the heterogeneous configuration, UL and FD nodes have 4 antennas while DL nodes have only 2 antennas. These configurations are representative of real-world wireless networks: mobile devices (e.g. tablets and cellphones) can be expected to have up to 2 antennas while larger devices (e.g. laptops, desktops) can easily hold 4 or more.

Clock Synchronization.

While it is convenient to maintain clock and phase synchronization between all nodes in a testbed via a wired back-channel, such an approach may not be realistic in all scenarios. Current wireless devices cannot be expected to have such fine-grained clock synchronization. Hence, we do not maintain wired clock synchronization between our nodes. Our experiments will show that FDoS will still be able to eliminate UDI under such conditions.

CSI Measurement.

We measure all UL and DL CSI using separate probe packets. The precoders and receiver filters computed from these CSIs based on FDoS's design are then used in subsequent data frames. Due to the high latency involved in WARPLab, the delay between the CSI measurements and data transmissions is larger than that found in typical WiFi transmissions. Even so, FDoS can eliminate a significant fraction of UDI under such conditions of high CSI variability. This points the fact that FDoS can eliminate UDI even under realistic mobility found in real-world networks.

7. Performance Evaluation 7.1 Set-up

Test-Bed:

The experiments are conducted in a typical indoor office environment. Two WARP nodes jointly serve as the FD AP, while the remaining four nodes serve as four HD clients. The WARP radio boards/antennas are distributed throughout this environment to create different topologies. Our results are averaged over several topologies as well as over multiple runs.

Baselines and Metrics:

We evaluate FDoS against two baselines: (i) FDoS without the IA components, i.e. DL and UL operate independently without alleviating their mutual interference, and (ii) a half-duplex MU-MIMO system employing conventional ZFBF for its DL and UL. CSI are estimated on each of the 64 sub-carriers precoding is carried out on a sub-carrier basis in our experiments. Since the CSI cannot be ensured to be static across different schemes, each of our experiment involves sending about 500-1000 frames back-back to generate enough samples for a confident comparison. We use SINR measured from the experiments as our primary metric and translate it to rate using the Shannon capacity formula wherever appropriate.

7.2 Benchmarking IA

Figure 31:
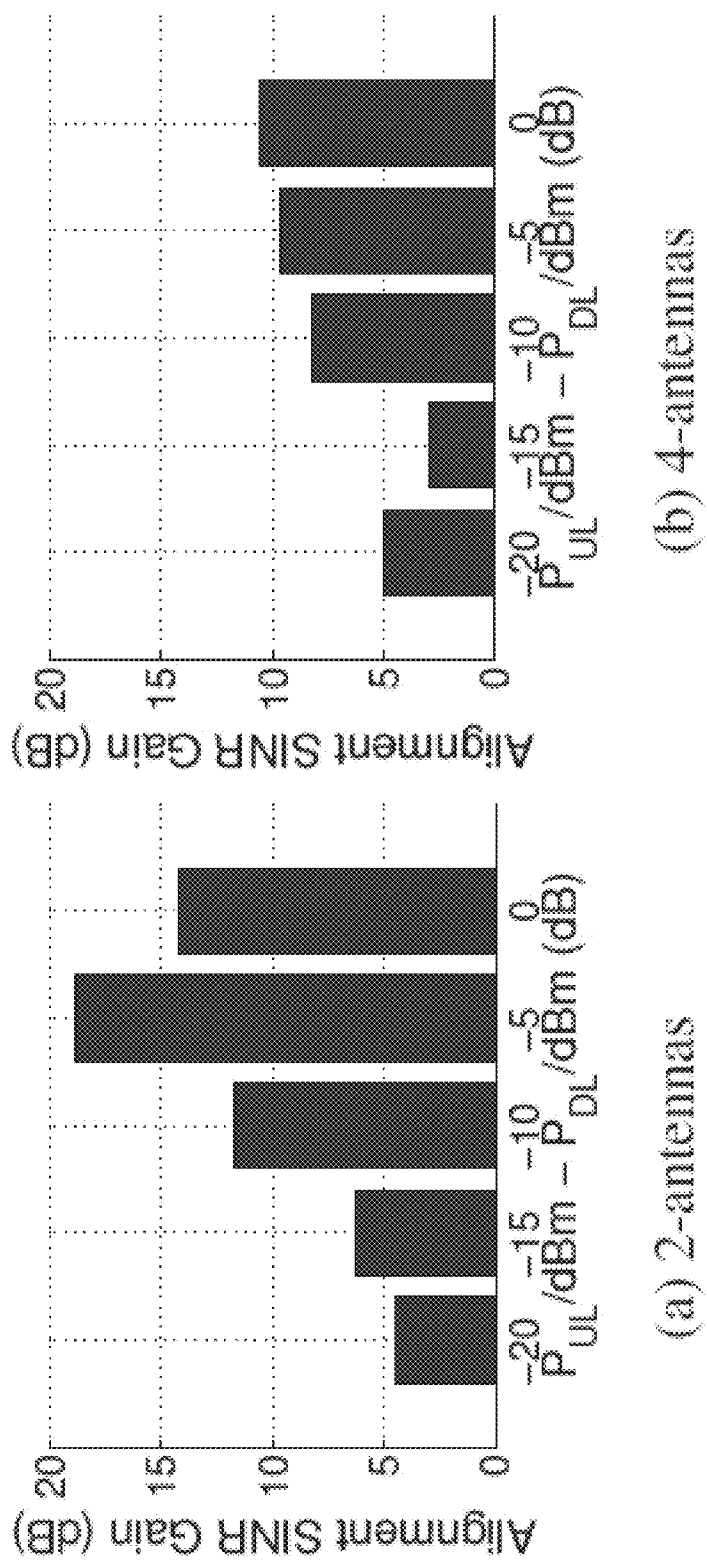
FIG. 31 depicts an SINR increase at the DL nodes due to interference alignment.

We first evaluate the performance of the IA delivered by FDoS in practice. We consider both a 2 and 4 antenna setup, wherein all nodes are equipped with 2 and 4 antennas respectively, and generate 2 and 4 streams respectively on the UL and DL simultaneously. The impact of FDoS in alleviating UDI during FD is captured in FIG. 31. It can be seen that FDoS provides a large UDI suppression of about 15-20 dB in the 2 antenna case even without any clock sync between the nodes. In the 4 antenna case, the lack of clock sync FDoS's has a larger impact and limits the UDI suppression in FDoS to 10 dB, which is still promising to enable effective communication on the DL as we will see in the rate results. This clearly indicates FDoS's ability to handle UDI effectively, and hence enable 2N streams (4 and 8 streams in our experiments) in a distributed FD network.

7.3 FDoS Performance

Figure 32:
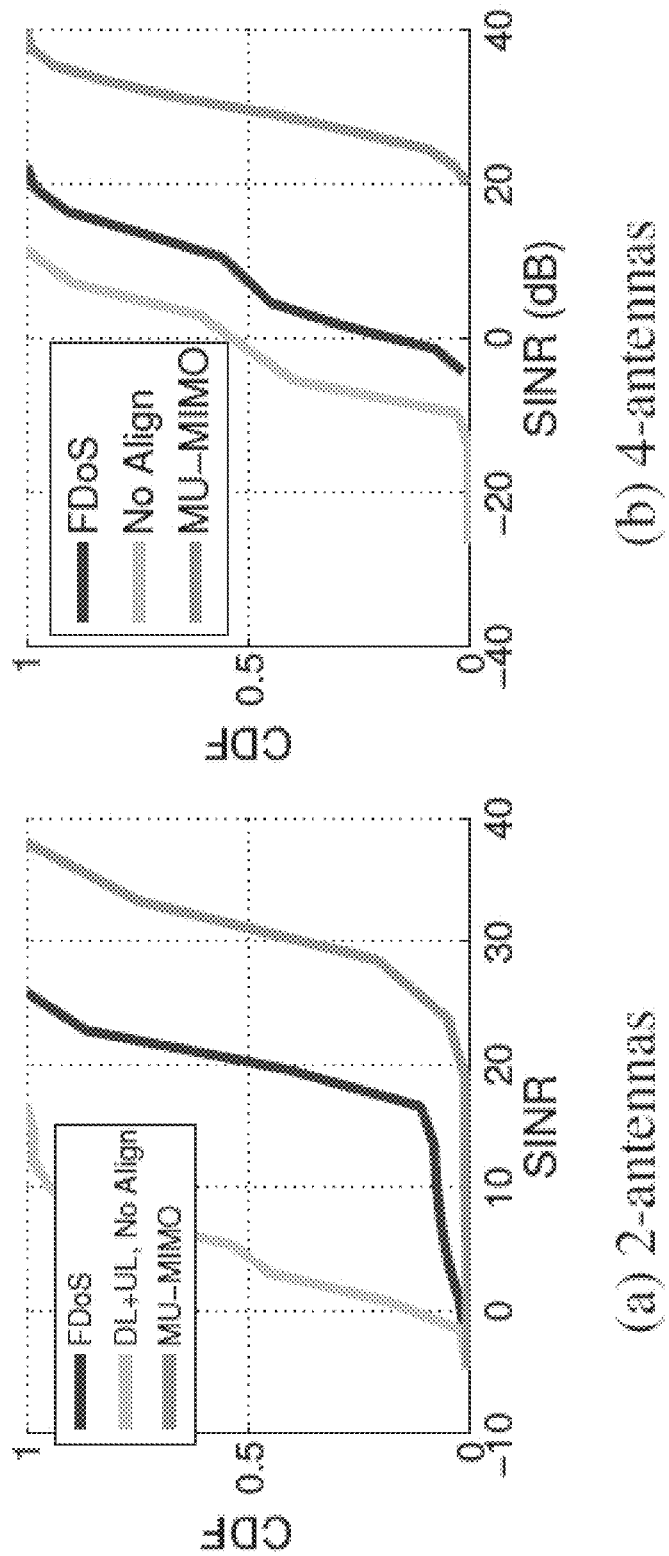
FIG. 32 depicts CDF of the SINR improvements due to FDoS.
Figure 33:
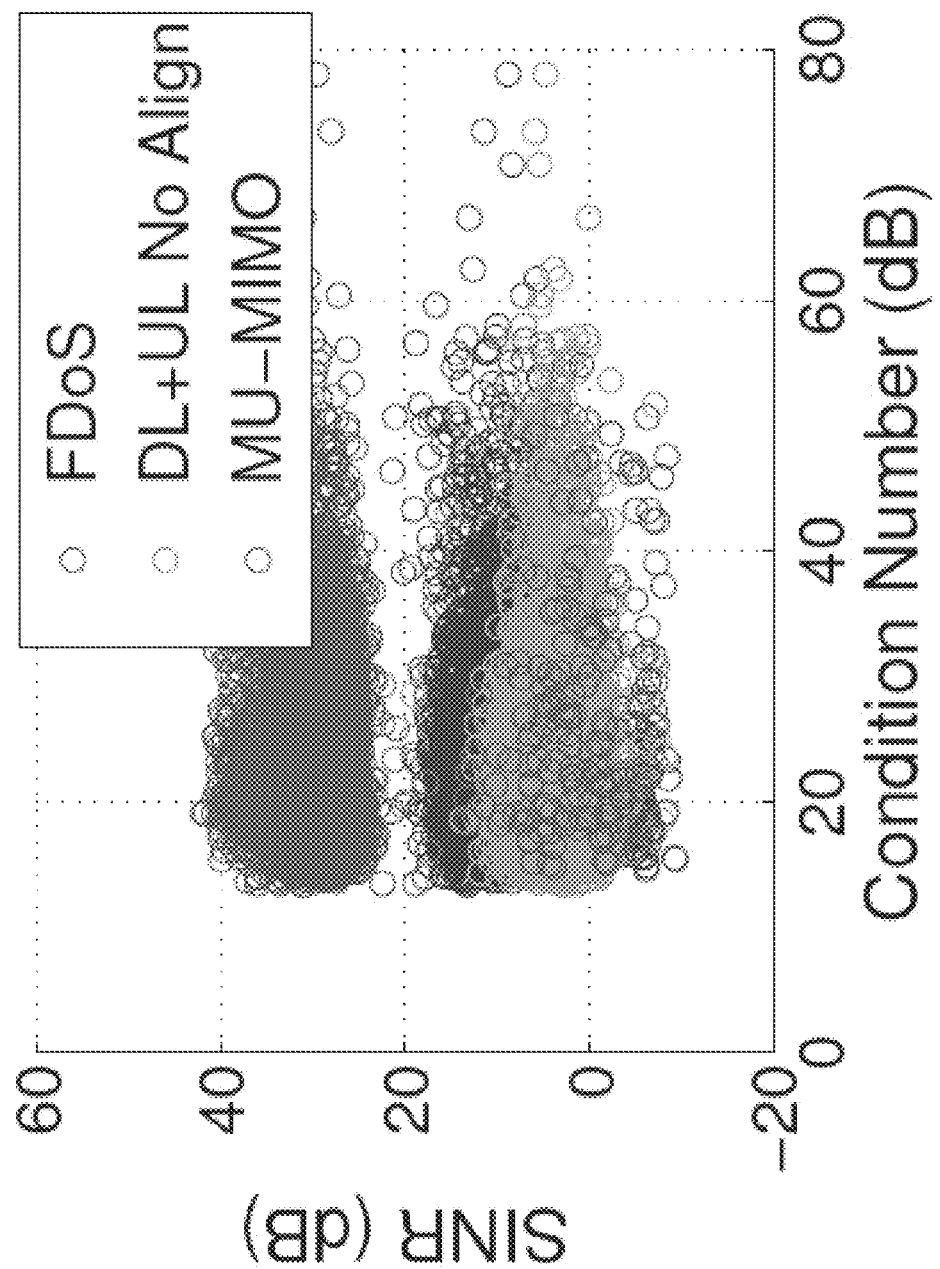
FIG. 33 depicts the performance of FDoS as a function of the condition number of the channel matrices.
Figure 34:
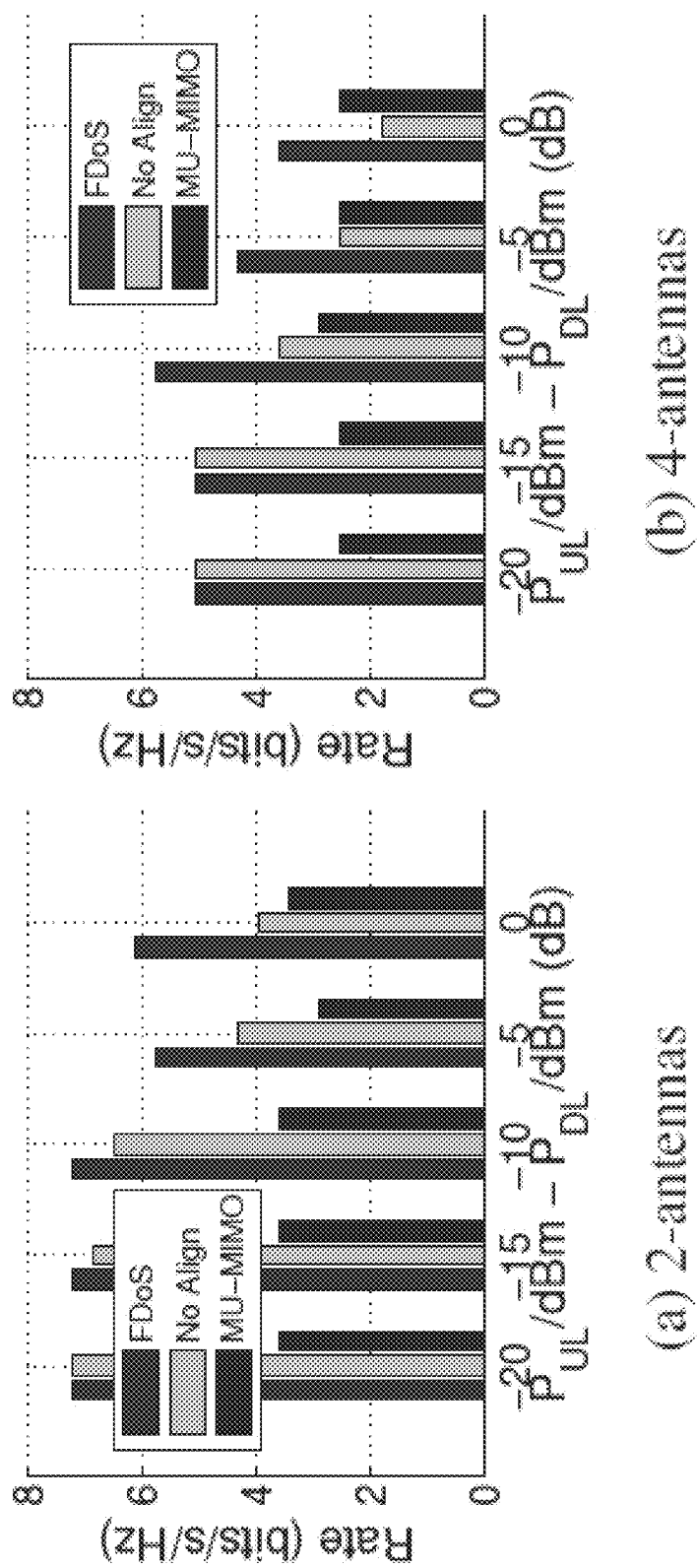
FIG. 34 Shows FDoS achieves the same rate as a clean MUMIMO transmission, even under strong UL interference.

We now evaluate FDoS by measuring the performance delivered to the DL streams in the presence of UDI (FIG. 32) and the resulting net rate (FIGS. 32, 34($a$), and 34($b$)). The UL clients operate at 3-5 dB lower power than the FD AP node. FIG. 32 presents the CDF (over topologies and runs) of the DL SINR (averaged over the streams). FIG. 32($a$) shows that UDI can significantly hurt performance in the 2 antenna case, bringing down the median HD SINR (i.e. without any UDI) by about 30 dB. It is very promising that FDoS can suppress almost 20 dB of the UDI to suffer only a 10 dB loss in SINR, which would be more than compensated by the additional streams that it enables on the downlink. In the 4 antenna case in FIG. 32($b$), lack of clock sync limits median UDI suppression to 10 dB, which turns out to be sufficient to still provide a FD gain over HD as we show subsequently.

We present the rate results in FIGS. 34($a$) and 34($b$) as a function of increasing transmit power on the UL clients. Several observations can be made: (i) The aggregate HD MU-MIMO rate does not scale well for the 4 antenna case (compared to the 2 antenna case).

8. Conclusions

We consider and address the challenging problem of uplink-downlink interference (UDI) in distributed FD networks by leveraging spatial interference alignment in an efficient, practical and scalable manner. We build the theory and design of applying IA to distributed FD networks and show that four HD clients are sufficient to enable the multiplexing gain of two possible with FD. We present our system FDoS that leverages the structure of interference in these networks to construct elegant IA solutions, while incorporating several MAC layer design elements to translate our solution into reality. A prototype evaluation of FDoS using WARP radios shows significant promise for FDoS in addressing UDI and truly enabling FD with HD clients.

Embodiment 4

Enabling wireless full-duplex (from an AP) with multiple half-duplex (HD) clients is key to widespread adoption of full-duplex (FD) in commercial networks. However, enabling FD in such networks is fundamentally challenged by a new form of uplink-downlink interference (UDI), arising between HD clients operating simultaneously in the uplink and downlink directions of FD. In this context, we first show that spatial interference alignment (IA) between clients is an effective and scalable technique to address UDI and hence enable FD in these networks, especially in the presence of MIMO.

The bulk of the system works on FD have focused on addressing self-interference through antenna, RF and digital cancellation. Some recent work has tried to effectively leverage exposed terminals along with FD transmissions in a network. The focus of these works has been on the peer-peer FD model. The importance of distributed FD with HD clients and hence the need to address UDI was only recently considered in [3]. The focus of [3] has been to information-theoretically characterize the benefits of having a side-channel to distributed FD in a three-node, two stream FD network. The cost of the side-channel as well as scalability to multiple streams in FD (i.e. MIMO in either direction of FD) was not considered. FD+IA: some work have proposed the use of IA in the time domain (through symbol extension) for addressing UDI in FD networks, albeit with FD capability at both the AP and (single-antenna) clients. The focus of these work is characterizing DoF from an information-theoretic perspective. Being based on time alignment, it requires either non-causal CSI or interference to deterministically repeat itself (in future) to eliminate UDI and is not conducive for a practical realization. Our focus in this work is to propose and leverage spatial IA as a practical, bandwidth-efficient and scalable approach to address the UDI problem and hence enable full-duplex in distributed FD networks with HD clients. More importantly, we intend to develop the theory and design behind applying IA in these networks, while also addressing the challenges that arise in realizing a practical system.

We then present our solution and system FDoS: Full-Duplex without Strings that incorporates this notion. We build the theory of applying spatial IA to full-duplex networks in general and present elegant, implementation-friendly constructions for generating feasible IA solutions that leverage the structure of interference specific to these networks. In the process, FDoS shows that four HD clients are both necessary and sufficient to eliminate UDI through IA and enable 2N streams at an N transceiver AP. FDoS also includes an efficient MAC design at the AP to handle clients with heterogeneous antenna capabilities, maximize the throughput of the enabled streams in the FD session as well as reduce the overhead incurred in FDoS by half by facilitating a distributed implementation.

Our solution can be used to scale the full duplex gain in multi-user scenario. The current work on full duplex communication lack a reasonable solution in multi-user systems, e.g., cellular systems and our solution is the first and most efficient known scheme to date.

A key idea of the invention is to realize full duplex communication between multiple users that are in the same interference domain. This feature allows the gain of full duplex technology to scale with the increasing number of users. The above key feature is realized through an interference alignment that is the enabling feature. There are several novel ideas related to this enabling feature that can be categorized into:

(1) Finding the number of streams and scheduling clients based on their channels and number of antennas that can be used in the full duplex system and interference alignment between them is possible.

(2) Constructing a solution for interference alignment problem by finding linear precoder and linear receiver filters that can be used in succession with other processing at the transmitter and receiver.

Constructing low complexity and algebraic solutions for interference alignment in a bipartite network wherein nodes are divided into two sets (1) the transmitting nodes and (2) the receiving nodes.

Generating interference alignment solution by using uplink downlink duality.

Providing an interference alignment in multiple nodes by using the idea of generating loops in the connecting graph of the network.

(3) Providing a means and simplified feedback and feedforward signaling which enables interference alignment in a typical system. Also optimizing the estimation, feedback, and feedforward overhead.

(4) Optimizing the transmission rate (in the downlink) and reception rate (in the uplink) in conjunction with the interference alignment solution.

Selecting a partial number of virtual antennas or interference free dimensions (degrees of freedom per node) in order to optimize the rate with respect to selecting a precoder that belong to a subspace of the space defined by the degrees of freedom per node.

Selecting the best interference alignment solution out of a finite set of solutions (where the solution set of interference alignment problem has finite number of solutions) that maximizes the throughput in the network (or partial throughput, e.g., the uplink throughput or the downlink throughput).

Optimizing the precoders e.g., to maximize the throughput or a capacity measure (based on joint decoding or stream by stream decoding,e.g., by using MMSE filters for each streams) when the solution set of the interference alignment problem has infinite solutions.

(5) Using a novel concept of degrees of freedom per node. Defining virtual antennas at each node based on the degrees of freedom per node.

Defining the precoders and receiver filters that correspond to a set of virtual antennas at each node.

(6) Providing techniques to deal with communication problem in a network in two steps. First step to define an interference network where the sources of interference in the network and their effect on receivers are considered and the interference is mitigated though interference alignment. The result of the first step is a simplified network in which the interference links are removed and the network of the desired channel between the communication node is updated with transformed channel characteristics and updated number of antennas (or virtual antennas) at each node. The second step is to address the communication problem in a network in which the interference (or part of interference) is removed.

An aspect includes a method of interference management between two sets of communication points comprising a set of communication point consisting at least one communication point that are transmitting a signal, a second set of communication point consisting at least one communication point that are receiving data, a transmitting node employs virtual antennas for transmissions, a receiving node employs virtual antennas for reception, wherein, the signal of each antenna is obtained through linear processing of the signals at virtual antennas. The received signal at a virtual antenna of a receiving node may not affected by the transmission from virtual antennas at a transmitting node. The linear processing may be used to minimize the received signal power at a virtual antenna of a receiving node when a transmitting node is active.

Another aspect includes a method of mitigating interference received at a downlink user from the uplink transmission in order to achieve full duplex uplink and downlink communication between an access point and a plurality of user equipments. The interference may be mitigated by using precoding at the transmitting nodes. The interference may be mitigated by using receiver filters at the receiving nodes. The precoder and receiver filters may be designed to minimize the interference at the receiving node from the transmitting nodes.

Still another aspect includes a method of interference mitigation comprising interference alignment in common signal dimension. Common signal dimension may be defined in spatial dimension.

Still another aspect includes a method of interference mitigation comprising interference alignment in disjoint and/or individual signal dimension. Disjoint and individual signal dimensions are defined in spatial dimension.

Still another aspect includes a method of finding the common spatial dimension of plurality of transmitters and a receiver. The common spatial dimension may be denoted by precoding matrices at the transmitting point and receiver filters at the receiving nodes. The transmission from plurality of transmitters may be aligned in the common signal space. The transmission from plurality of transmitters may be received in different dimensions in disjoint signal space.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method implemented in a wireless communications system including a first uplink (UL) client device, a second UL client device, a first downlink (DL) client device, and an access point (AP), the method comprising the following steps in this order:
   a) determining interference alignment (IA) solution between the first and second UL client devices and the first device;
   b) determining, according to the IA solution, receive filter $U_0$ for the AP and precoder $V_0$ for the AP to improve a UL stream rate and a DL stream rate;
   wherein the wireless communications system further includes a second DL client device, and
   wherein step b) comprises the following steps in this order:
   c) determining first precoder $V_1$ for the first UL client device, second precoder $V_2$ for the second UL client device, and receive filter $U_0$ for the AP to improve the UL stream rate;
   d) determining first receive filter $U_1$ for the first DL client device and second receive filter $U_2$ for the second DL client device to mitigate uplink-downlink interference (UDI); and
   e) determining precoder $V_0$ for the AP to improve the DL stream rate; and
   wherein step c) further comprises:
   f) letting $\dot{V}_1 = [\vec{v}_{11}\ \vec{v}_{12}\ \ldots\ \vec{v}_{1N}]$;
   g) for every $\vec{V}_{1i}$, letting corresponding vector $V'_2$ be given as $\vec{V}_{2i} = H_{12}^{-1} H_{11} \vec{V}_{1i}$, where $\dot{V}_2 = [\vec{v}_{21}\ \vec{v}_{22}\ \ldots\ \vec{v}_{2N}]$, $H_{11}$ is a channel from the first UL client device to the first DL client device, $H_{12}$ is a channel from the second UL client device to the first DL client device;
   h) pairing eigenvectors from $V'_1$ and $V'_2$ as $\{(\vec{v}_{1i}, \vec{v}_{2i})\}$, $\forall i \in 1, N]$
   i) computing UL stream rate metric for UL streams corresponding to every pair of eigenvectors as $R_{i,UL}$ comprising Rate $(\vec{u}_{0i}^1 H_{01}^U \vec{v}_{1i})$ and Rate $(\vec{u}_{0i}^2 H_{02}^U \vec{v}_{2i})$, where $H_{01}^U$ is a channel from the first UL client device to the AP, $H_{02}^U$ is a channel from the second UL client device to the AP, $\vec{u}_{0i}^1$ and $\vec{u}_{0i}^2$ are receive filter vectors (N in total) at the AP corresponding to precoding vectors at the first UL client device and the second UL client device, respectively;
   j) arranging the pair of eigenvectors in descending order of the UL stream rate metric;
   k) picking up top $$\frac{N}{2}$$

pairs to construct first precoder $V_1$ and second precoder $V_2$ of size $$N \times \frac{N}{2};$$

l) using $$\frac{N}{2}$$

receive niter vectors $(\vec{u}_{0i}^1, \vec{u}_{0i}^2)$ to construct $$\frac{N}{2} \times N$$

receive filter matrices $U_0^1$ and $U_0^2$ and N×N receive filter $U_0 = [U_0^{1^T}\ U_0^{2^T}]$;
   and delivering streams using the UL steam rate and the DL steam rate.

2. The method as in claim 1, wherein the IA solution is performed as an inner precoder at the AP and an inner receive filter at the first DL client device.

3. The method as in claim 2, wherein space-time precoding is performed by an outer precoder over the inner precoder, and receive filtering is performed by an outer receive filter over the inner receive filter.

4. The method as in claim 1, wherein the AP is operable in a full duplex mode.

5. The method as in claim 1, wherein the AP receives from the first and second UL client devices and transmits to the first DL client device in the same frequency band simultaneously.

6. The method as in claim 1, wherein the first and second UL clients and the first DL client work in a half duplex mode.

7. The method as in claim 1, wherein the IA solution is determined such that $V_1 = M V_2$, where $V_1$ is a first precoder for the first UL client device, M is a transformation matrix, and $V_2$ is a second precoder for the second UL client device.

8. The method as in claim 7, wherein transformation matrix M is a product of an inverse of a second channel matrix and a first channel matrix.

9. The method as in claim 1, wherein step i) comprises: given $\vec{v}_{1i}$ and $\vec{v}_{2i}$, computing $\vec{u}_{0i}^1$ and $\vec{u}_{0i}^2$ to improve individual rate terms Rate $(\vec{u}_{0i}^1 H_{01}{}^U \vec{v}_{1i})$ and Rate $(\vec{u}_{0i}^2 H_{02}{}^U \vec{v}_{2i})$.

10. The method as in claim 1, wherein a rate function comprises a Shannon rate formula for a linear minimum mean square error (MMSE) filter.

11. The method as in claim 1, wherein step d) comprises: given first precoder $V_1$ and second precoder $V_2$, obtaining first receive filter $U_1$ and second receive filter $U_2$ of size $$\frac{N}{2} \times N$$

orthogonal to a sub-space spanned by $H_{11}V_1$ and $H_{22}V_2$, respectively, where $H_{11}$ is a channel from the first UL client device to the first DL client device, and $H_{22}$ is a channel from the second UL client device to the second DL client device.

12. The method as in claim 1, wherein step d) comprises: obtaining first receive filter $U_1$ and second receive filter $U_2$ of size $$\frac{N}{2} \times N$$

so that interference from the first and second UL client devices is aligned.

13. The method as in claim 1, wherein the DL stream rate in step e) is expressed as $R_{DL}$ comprising Rate $(U_1 H_{10}{}^D V_0^1)$ and Rate $(U_2 H_{20}{}^D V_0^2)$, where $V_0^1$ and $V_0^2$ are two $$N \times \frac{N}{2}$$

precoding matrices for the first and second DL client devices and form N×N precoder $V_0 = [V_0^1 \ V_0^2]$.

14. The method as in claim 1, wherein the IA solution is performed in common vector spaces.

15. A method implemented in an access point (AP) used in a wireless communications system including a first uplink (UL) client device, a second UL client device, and a first downlink (DL) client device, the method comprising the following steps in this order:

a) determining interference alignment (IA) solution between the first and second UL client devices and the first DL client device;

b) determining, according to the IA solution, receive filter $U_0$ for the AP and precoder $V_0$ for the AP to improve a UL stream rate and a DL stream rate;

wherein the wireless communications system further includes a second DL client device, and wherein step b) comprises the following steps in this order:

c) determining first precoder $V_1$ for the first UL client device, second precoder $V_2$ for the second UL client device, and receive filter $U_0$ for the AP to improve the UL stream rate;

d) determining first receive filter $U_1$ for the first DL client device and second receive filter $U_2$ for the second DL client device to mitigate uplink-downlink interference (UDI); and e) determining precoder $V_0$ for the AP to improve the DL stream rate; and wherein step c) further comprises:

f) letting $\dot{V}_1 = [\vec{v}_{11} \ \vec{v}_{12} \ \ldots \ \vec{v}_{1N}]$;

g) for every $\vec{v}_{1i}$, letting corresponding vector $V'_2$ be given as $\vec{V}_{2i} = H_{12}^{-1} H_{11} \vec{V}_{1i}$, where $\dot{V}_2 = [\vec{v}_{21} \ \vec{v}_{22} \ \ldots \ \vec{v}_{2N}]$, $H_{11}$ is a channel from the first UL client device to the first DL client device, $H_{12}$ is a channel from the second UL client device to the first DL client device;

h) pairing eigenvectors from $V'_1$ and $V'_2$ as $\{(\vec{v}_{1i}, \vec{v}_{2i})\}$, $\forall i \in 1, N]$ i) computing UL stream rate metric for UL streams corresponding to every pair of eigenvectors as $R_{i,UL}$ comprising Rate $(\vec{u}_{0i}^1 H_{01}{}^U \vec{v}_{1i})$ and Rate $(\vec{u}_{0i}^2 H_{02}{}^U \vec{v}_{2i})$, where $H_{01}{}^U$ is a channel from the first UL client device to the AP, $H_{02}{}^U$ is a channel from the second UL client device to the AP, $\vec{u}_{0i}^1$ and $\vec{u}_{0i}^2$ are receive filter vectors (N in total) at the AP corresponding to precoding vectors at the first UL client device and the second UL client device, respectively;

j) arranging the pair of eigenvectors in descending order of the UL stream rate metric;

k) picking up top N/2 pairs to construct first precoder $V_1$ and second precoder $V_2$ of size $$N \times \frac{N}{2};$$

l) using N/2 receive filter vectors $(\vec{u}_{0i}^1, \vec{u}_{0i}^2)$ to construct $$\frac{N}{2} \times N$$

receive filter matrices $U_0^1$ and $U_0^2$ and N×N receive filter $U_0 = [U_0^1{}^T U_0^2{}^T]$;

and delivering streams using the UL steam rate and the DL steam rate.

* * * * *